(12) United States Patent
Nito et al.

(10) Patent No.: US 6,804,037 B1
(45) Date of Patent: Oct. 12, 2004

(54) LIGHT MODULATION APPARATUS AND IMAGE PICKUP APPARATUS, AND DRIVE METHOD THEREOF

(75) Inventors: Keiichi Nito, Tokyo (JP); Toru Udaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 171 days.

(21) Appl. No.: 09/711,651

(22) Filed: Nov. 13, 2000

(30) Foreign Application Priority Data

| Nov. 12, 1999 | (JP) | 11-322184 |
| Nov. 12, 1999 | (JP) | 11-322185 |
| Nov. 12, 1999 | (JP) | 11-322186 |
| Nov. 12, 1999 | (JP) | 11-322187 |
| Oct. 19, 2000 | (JP) | 2000-319879 |

(51) Int. Cl.$^7$ .............. G02F 1/07; G09G 5/10
(52) U.S. Cl. .......... 359/253; 359/264; 345/691
(58) Field of Search .............. 359/245, 252, 359/253, 264, 322; 345/89, 94, 690, 691, 207

(56) References Cited

U.S. PATENT DOCUMENTS

| 4,818,077 A | * | 4/1989 | Ohwada et al. | 349/34 |
| 5,333,075 A | * | 7/1994 | Harada et al. | 349/163 |
| 5,669,022 A | | 9/1997 | Kadohara et al. | 396/111 |
| 5,854,879 A | * | 12/1998 | Inuzuka et al. | 345/89 |
| 6,016,133 A | * | 1/2000 | Nito et al. | 345/89 |
| 6,201,588 B1 | | 3/2001 | Walton et al. | 349/123 |
| 6,407,727 B1 | * | 6/2002 | Plangger | 345/87 |
| 6,411,576 B1 | * | 6/2002 | Furukawa et al. | 369/53.19 |
| 6,430,137 B1 | * | 8/2002 | Saimi et al. | 369/112.1 |
| 6,456,345 B1 | | 9/2002 | Ise | 349/96 |

FOREIGN PATENT DOCUMENTS

| JP | 10-268318 A | 10/1998 |
| JP | 11-326894 A | 11/1999 |

OTHER PUBLICATIONS

Dwight W. Berreman, Alignment of Liquid Crystals by Grooved Surfaces, *Molecular Crystals and Liquid Crystals*, 1973, vol. 23, pp. 215–231.

* cited by examiner

*Primary Examiner*—Ricky Mack
*Assistant Examiner*—William Choi
(74) *Attorney, Agent, or Firm*—Sonnenschein, Nath & Rosenthal LLP

(57) ABSTRACT

Disclosed are a light modulation apparatus including a liquid crystal device; and a polarizing plate disposed in an optical path of light made incident on said liquid crystal device; wherein said liquid crystal device is of a guest-host type using a negative type liquid crystal as a host material, an image pickup apparatus using the light modulation apparatus, and methods of driving the light modulation apparatus and image pickup apparatus.

43 Claims, 39 Drawing Sheets

FIG. 1A  APPLICATION OF NO VOLTAGE
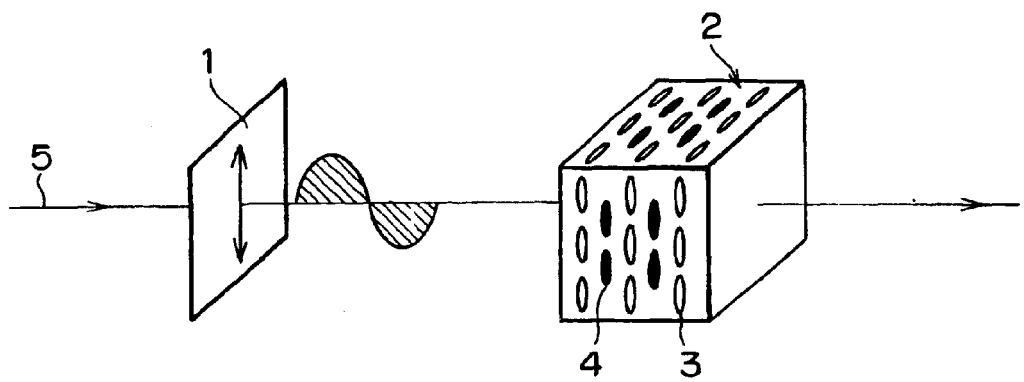
FIG. 1B  APPLICATION OF VOLTAGE
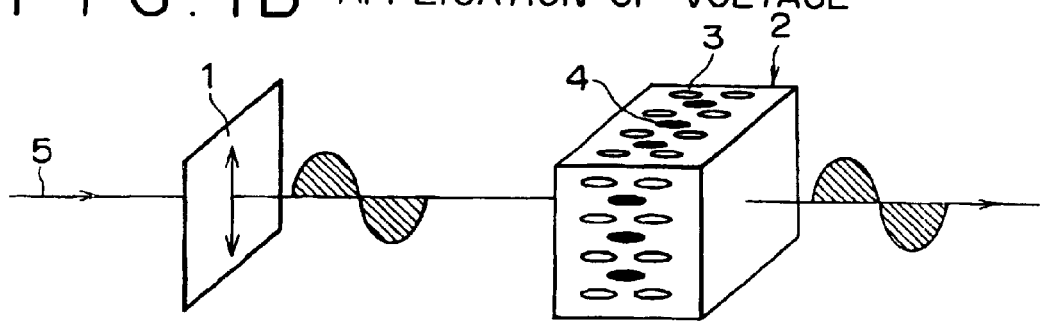
FIG. 1C  DRIVE WAVEFORM OF RECTANGULAR WAVE
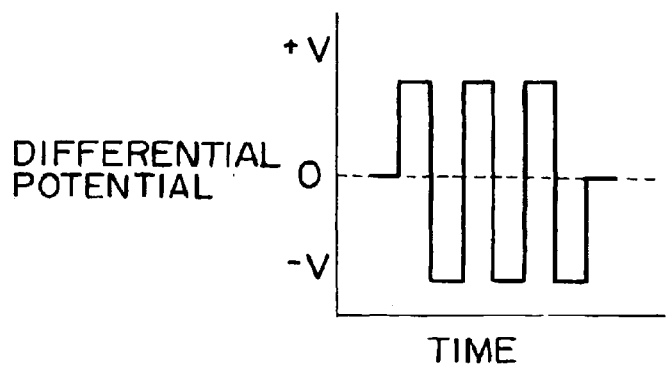

POSITIVE LIQUID CRYSTAL

POSITIVE LIQUID CRYSTAL

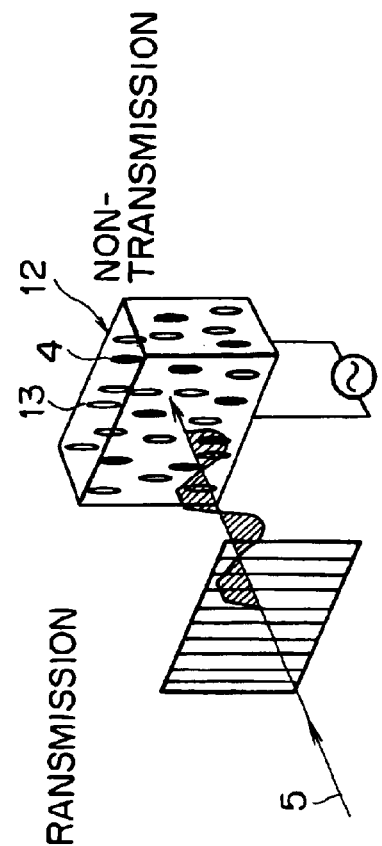
FIG. 3A APPLICATION OF NO VOLTAGE
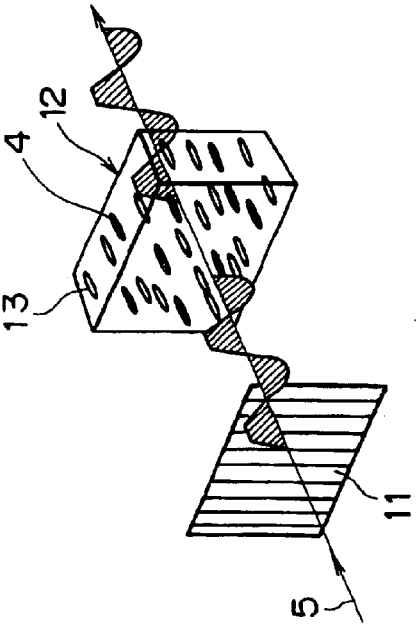
FIG. 3B APPLICATION OF VOLTAGE
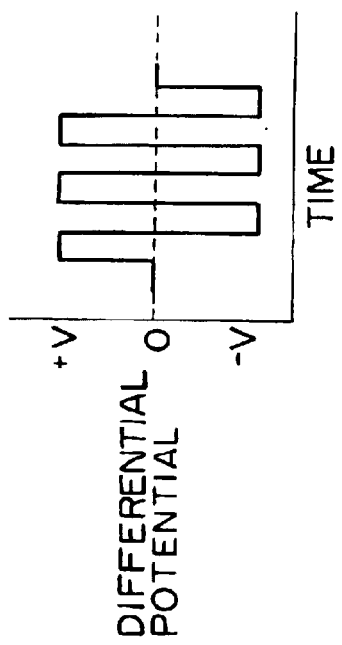
FIG. 3C DRIVE WAVEFORM OF RECTANGULAR WAVE

NEGATIVE LIQUID CRYSTAL

NEGATIVE LIQUID CRYSTAL

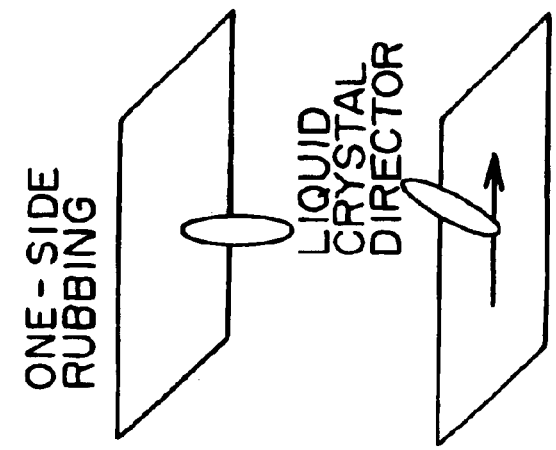
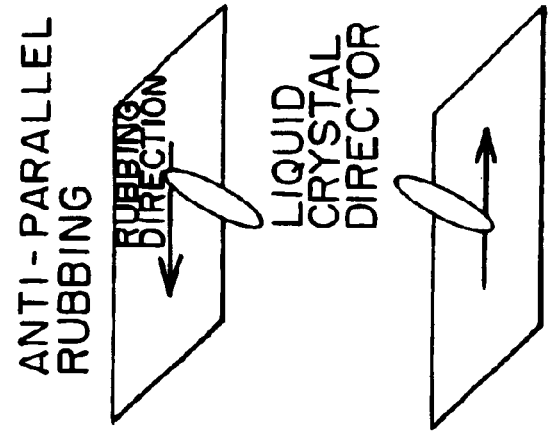
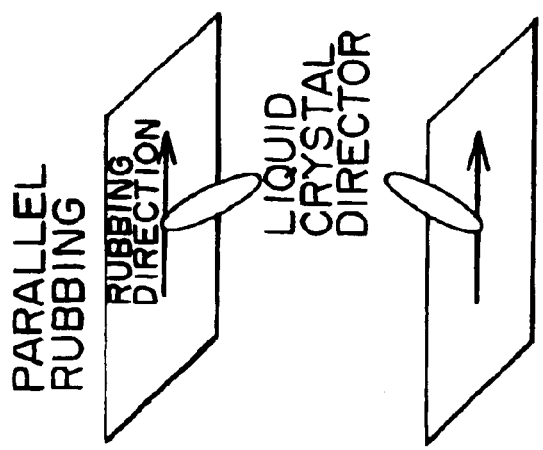

PARALLEL RUBBING CELL

ANTI-PARALLEL RUBBING CELL

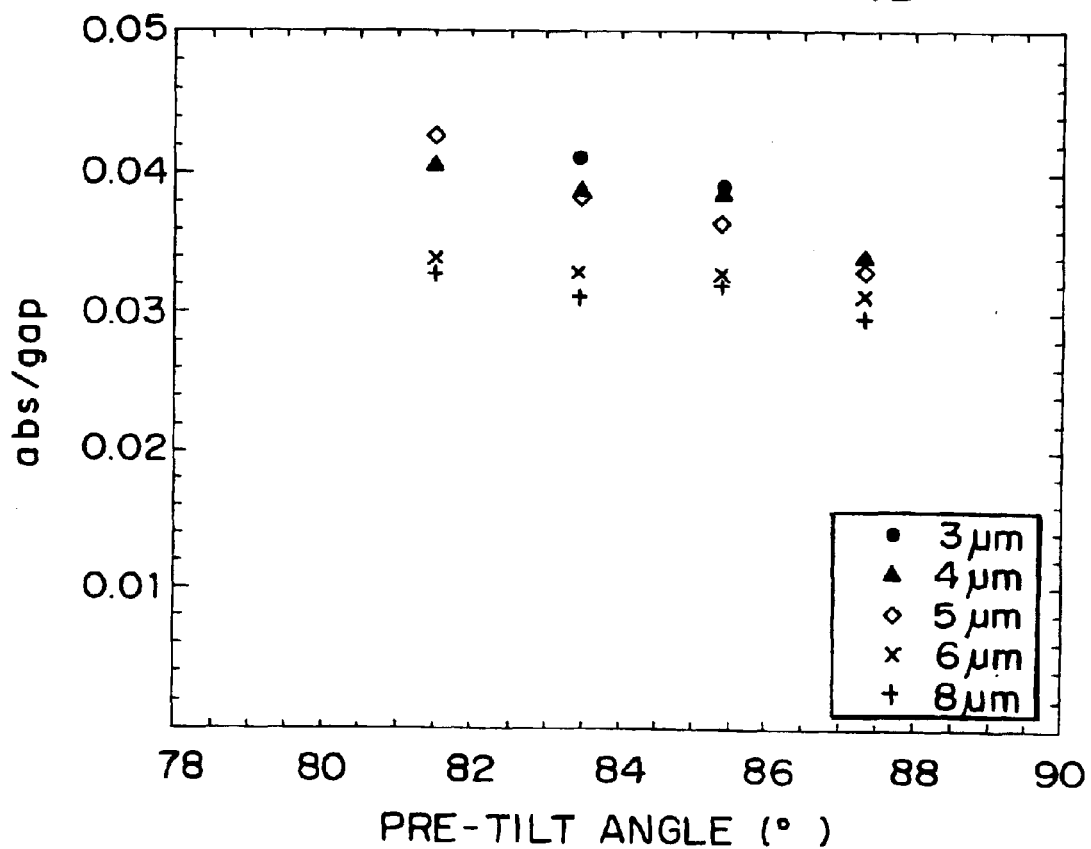

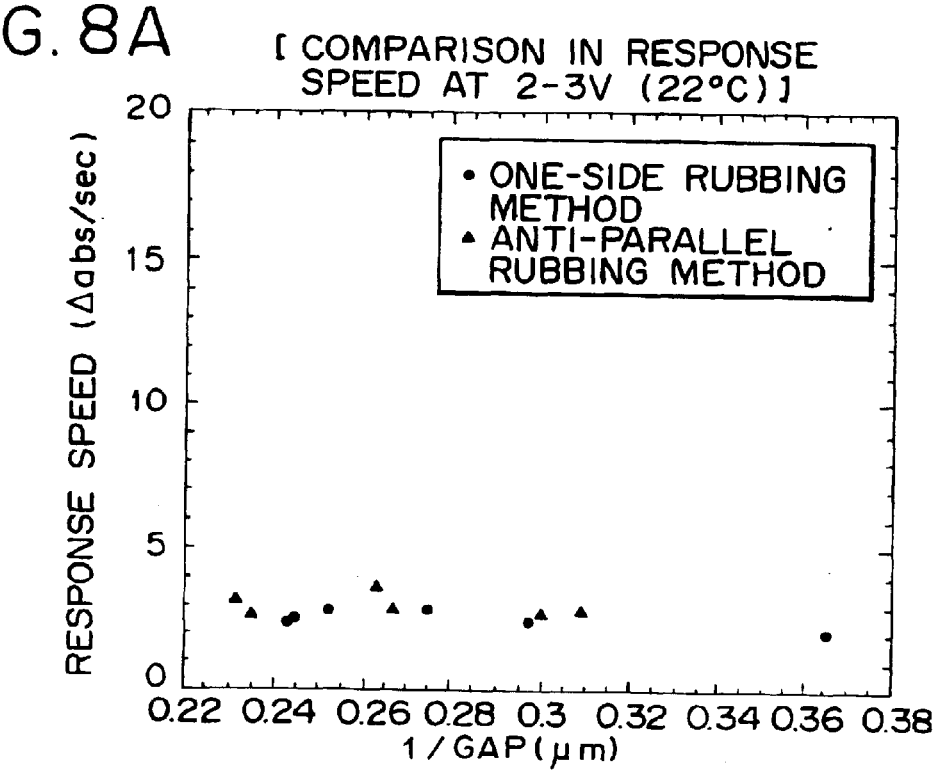
FIG. 8A [COMPARISON IN RESPONSE SPEED AT 2-3V (22°C)]
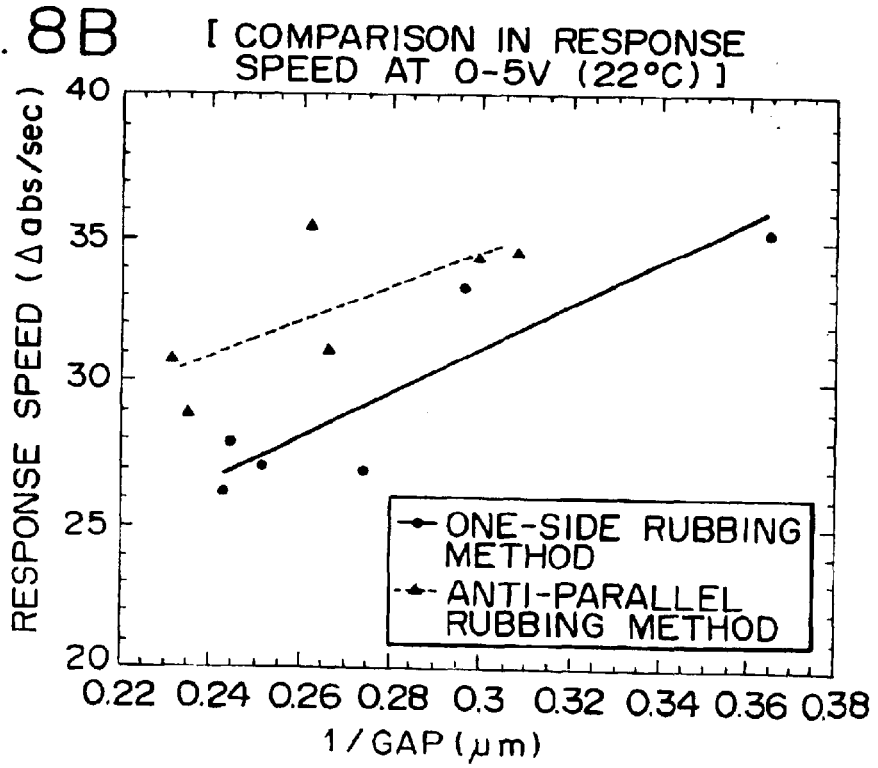
FIG. 8B [COMPARISON IN RESPONSE SPEED AT 0-5V (22°C)]

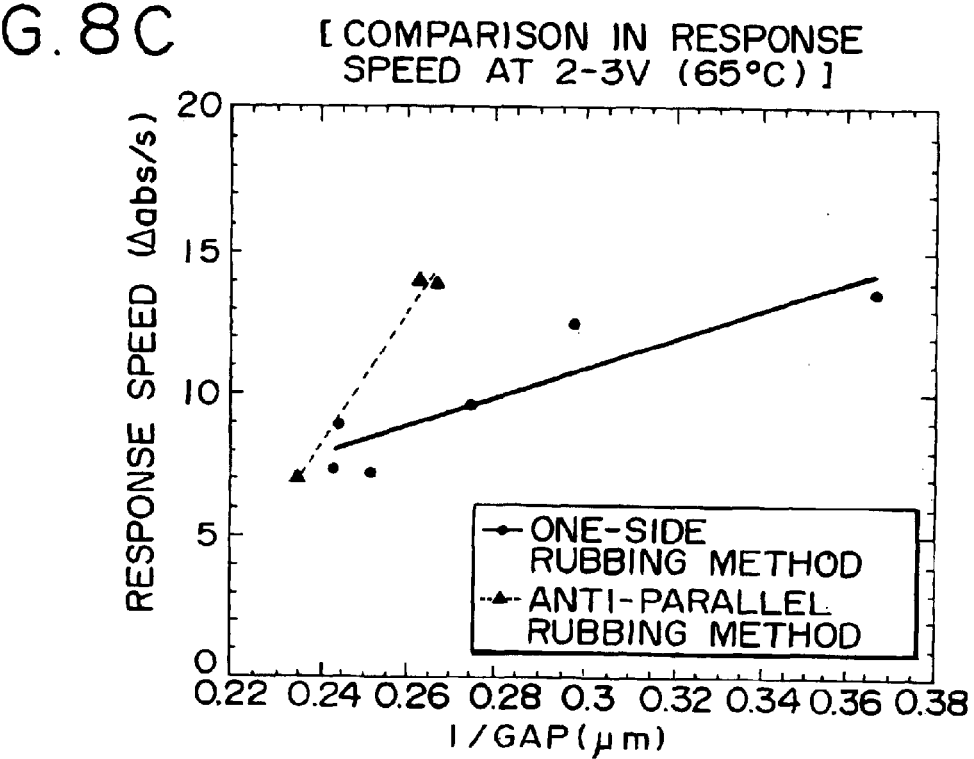
FIG. 8C [COMPARISON IN RESPONSE SPEED AT 2-3V (65°C)]
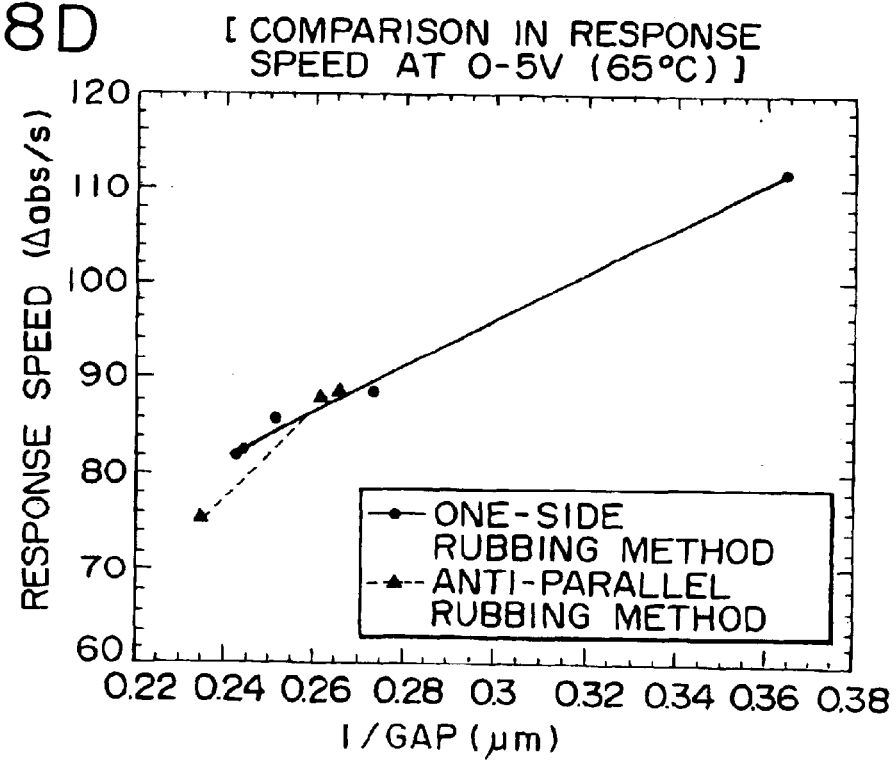
FIG. 8D [COMPARISON IN RESPONSE SPEED AT 0-5V (65°C)]

F I G. 10
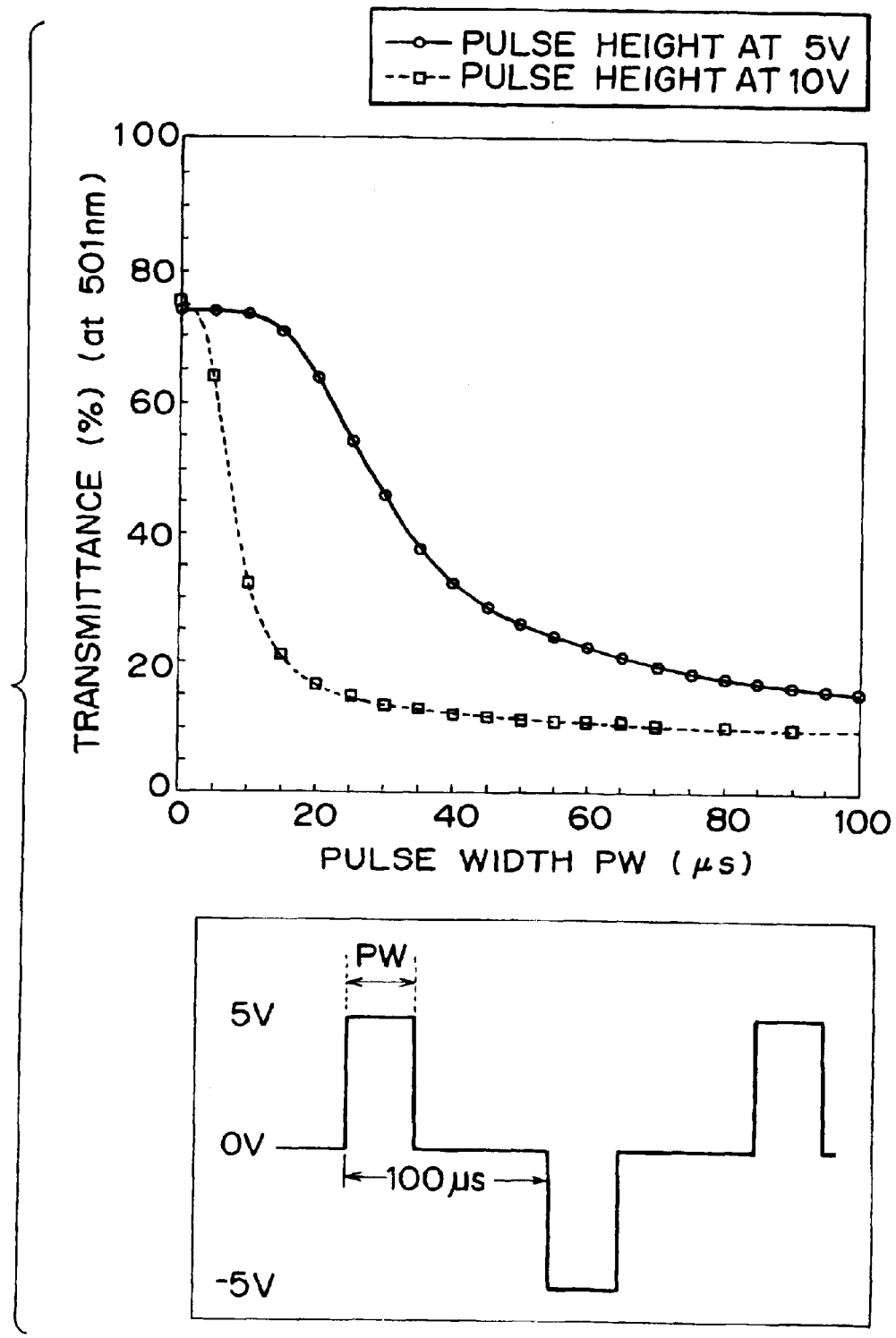

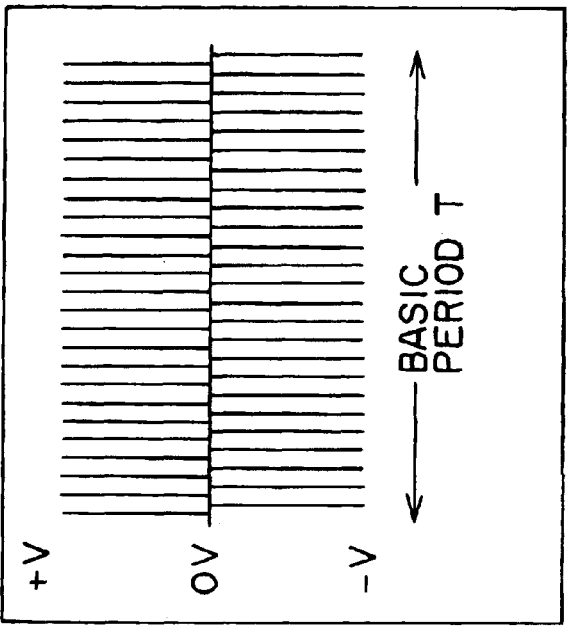
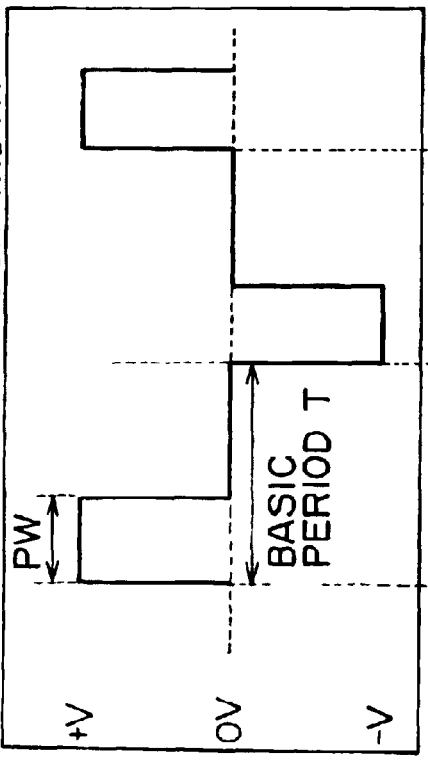
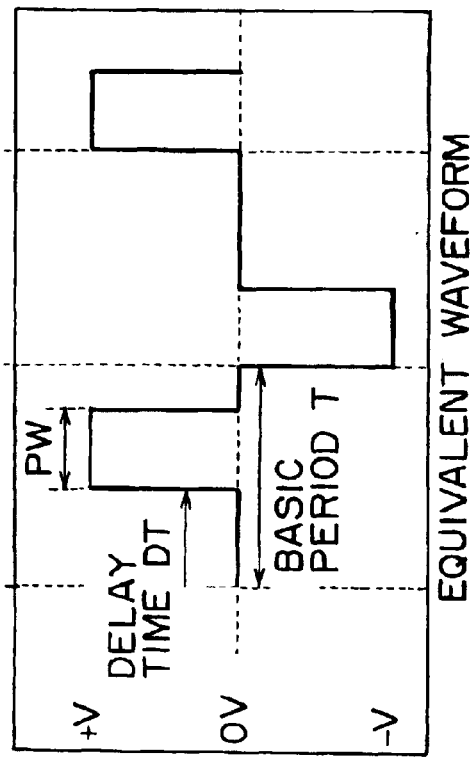

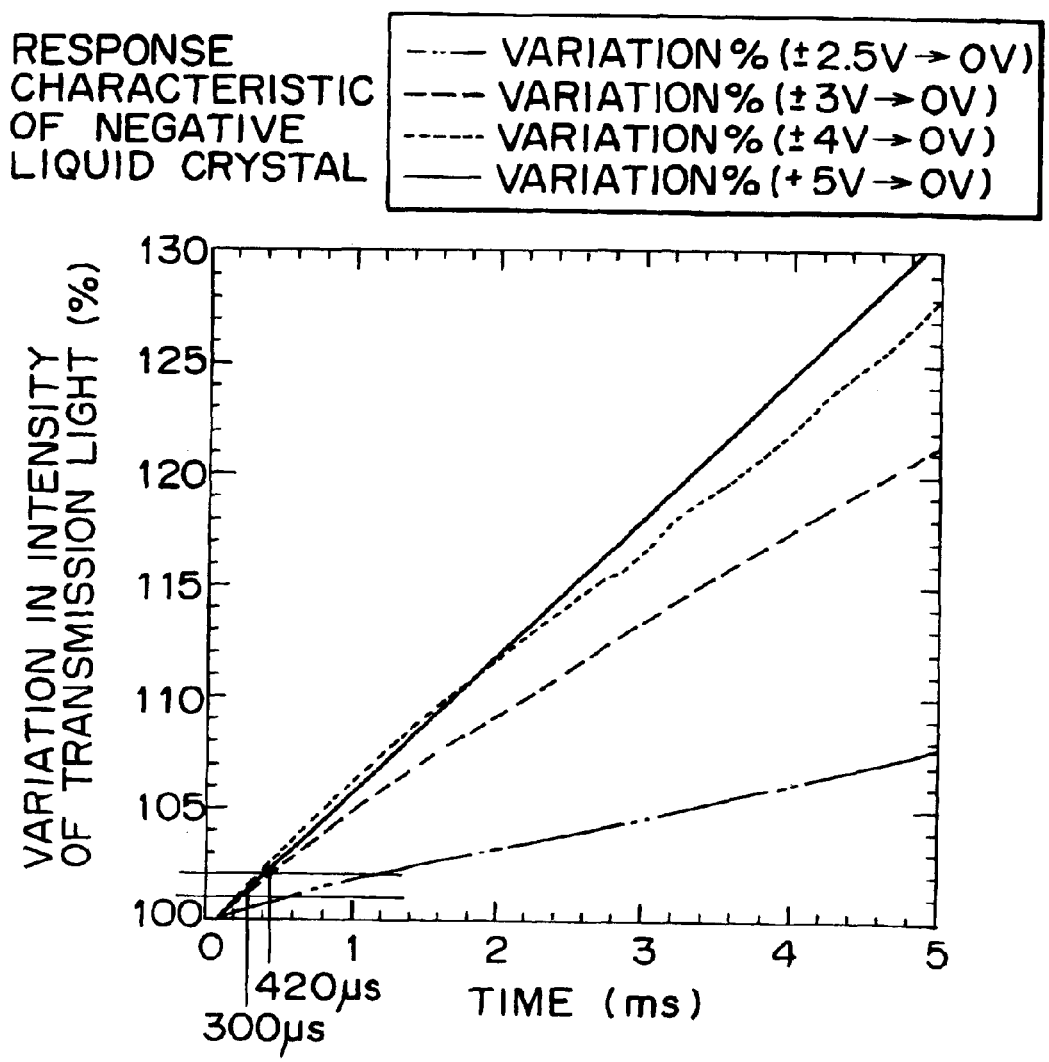

F I G. 15
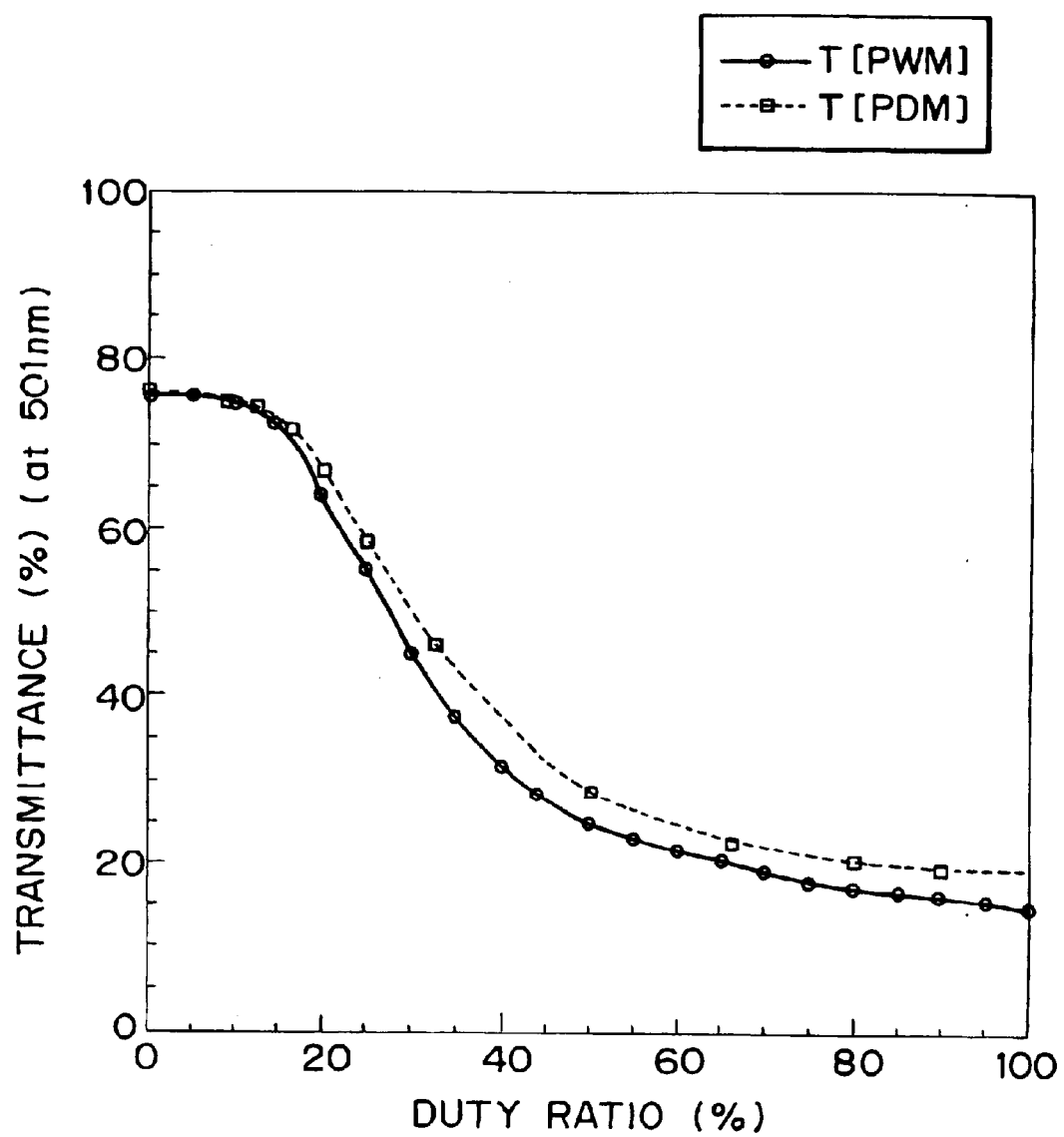

FIG.17
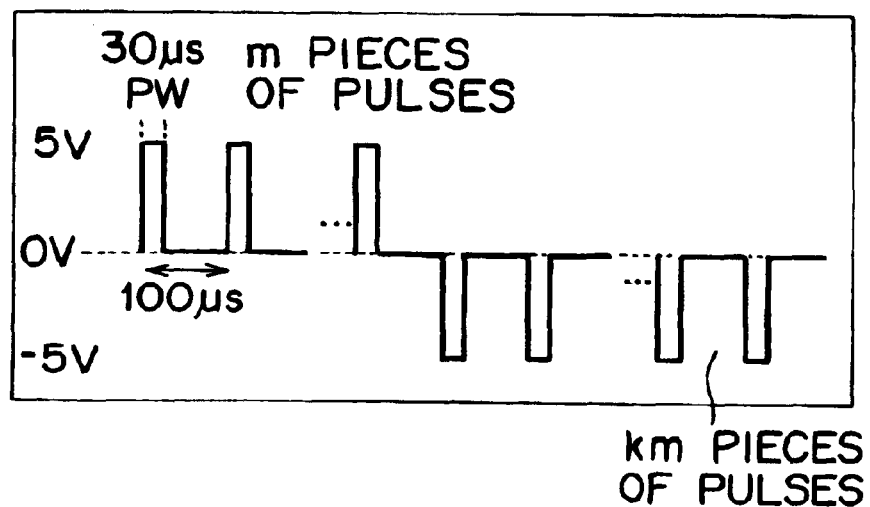
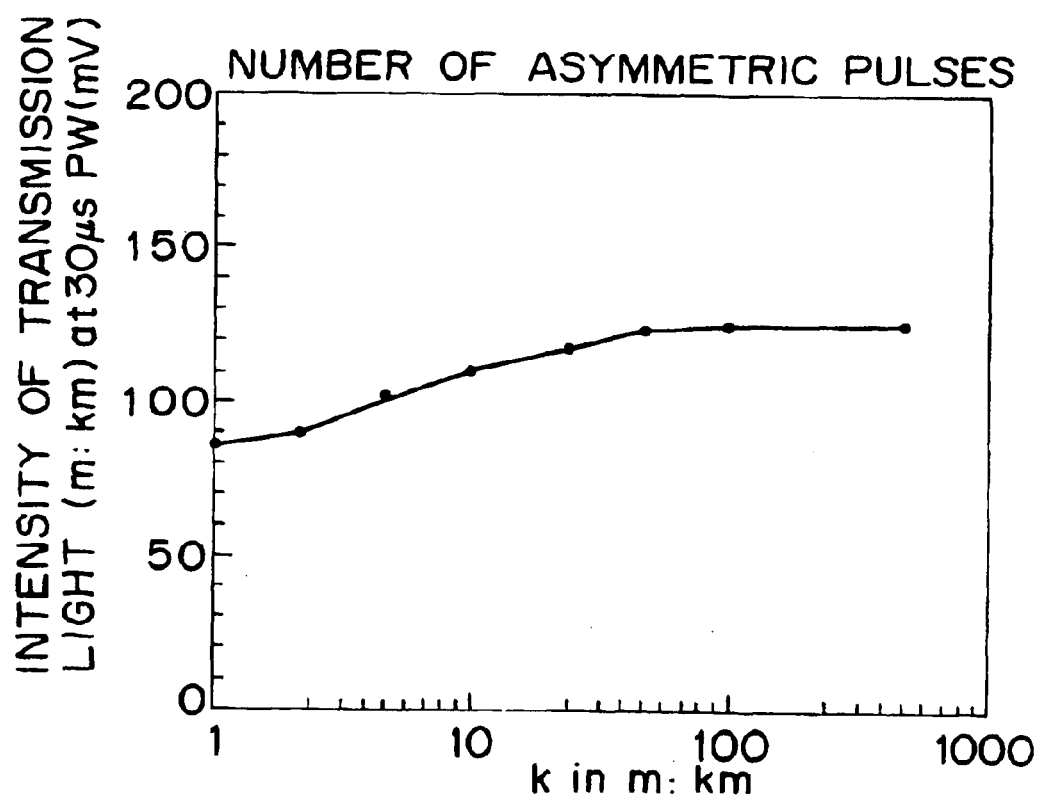

FIG. 19
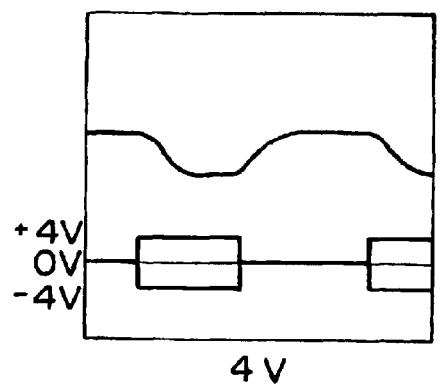
4 V
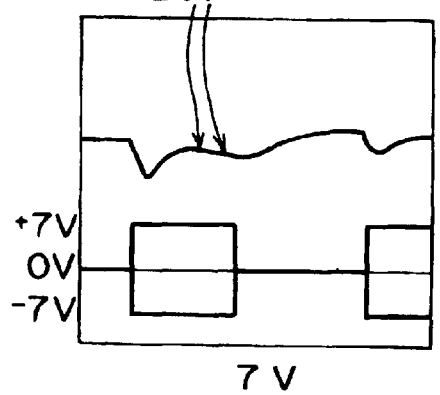
NO REDUCTION IN TRANSMITTANCE DUE TO ALIGNMENT DEFECT
7 V
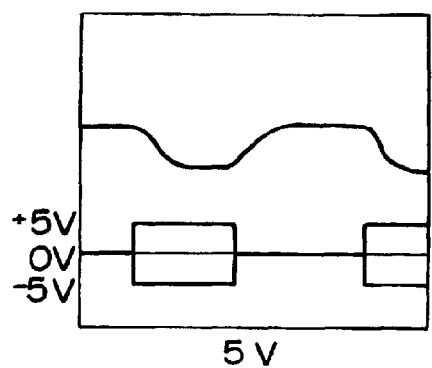
5 V
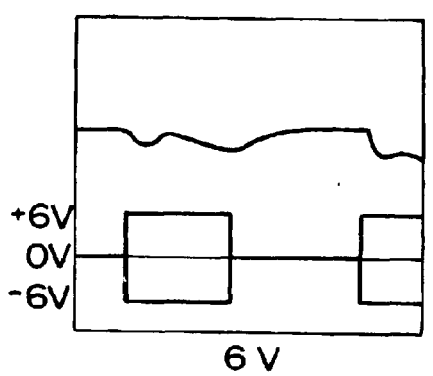
6 V
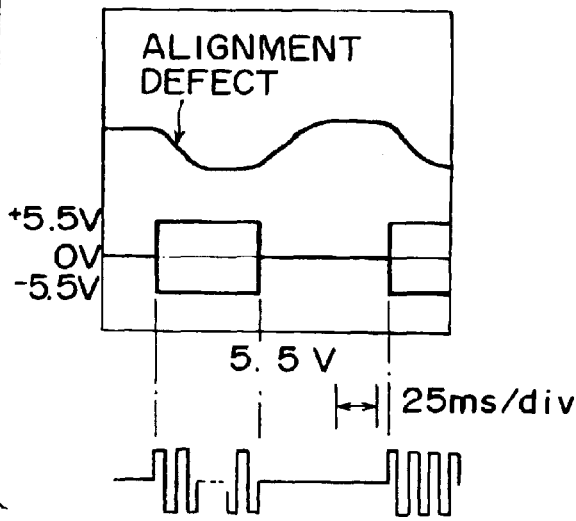
ALIGNMENT DEFECT
5.5 V
25ms/div
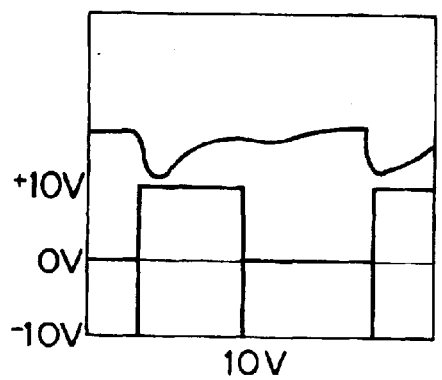
10 V

LIGHT MODULATION APPARATUS AND IMAGE PICKUP APPARATUS, AND DRIVE METHOD THEREOF

RELATED APPLICATION DATA

The present application claims priority to Japanese Applications Nos. P11-322184 filed Nov. 12, 1999, P11-322185 filed Nov. 12, 1999, P11-322186 filed Nov. 12, 1999, P11-322187 filed Nov. 12, 1999 and P2000-319879 filed Oct. 19, 2000, which applications are incorporated herein by reference to the extent permitted by law.

BACKGROUND OF THE INVENTION

The present invention relates to a light modulation apparatus for modulating the quantity of incident light and outputting the modulated light and an image pickup apparatus using the light modulation apparatus, and methods of driving the light modulation apparatus and the image pickup apparatus.

Light modulation apparatuses have been known of a type including a liquid crystal cell, typically, a twisted nematic (TN) type liquid crystal cell or a guest-host type liquid crystal cell (GH cell), and a polarizing plate.

FIGS. 1A and 1B are schematic views showing an operational principal of a related art light modulation apparatus mainly including a polarizing plate 1 and a GH cell 2, and FIG. 1C is a graph showing a rectangular waveform of a drive voltage to be applied to the GH cell 2. In the figures, for an easy understanding of description, components of a liquid crystal device other than the GH cell 2, for example, two grass substrates between which the GH cell 2 is held, operational electrodes, and liquid crystal alignment films formed on the substrates are omitted. The GH cell 2 contains liquid crystal molecules 3 and dichroic dye molecules 4. The dichroic dye molecules 4 have a positive type (p-type) light absorption anisotropy capable of absorbing light in the alignment direction of major axes of the molecules, and the liquid crystal molecules 3 have a positive type (p-type) dielectric constant anisotropy.

FIG. 1A shows a state of the GH cell 2 when no voltage is applied thereto. Incident light 5, which passes through the polarizing plate 1, is linearly polarized by the polarizing plate 1. In this related art light modulation apparatus, since the polarization direction of the linearly polarized light corresponds to the alignment direction of the major axes of the dichroic dye molecules 4, the light is absorbed in the dichroic dye molecules 4, with a result that the transmittance of the GH cell 2 is reduced.

When a voltage having a rectangular waveform shown in FIG. 1C is applied to the GH cell 2 as shown in FIG. 1B, the alignment direction of the major axes of the dichroic dye molecules 4 becomes perpendicular to the polarization direction of the linearly polarized light, with a result that the light is little absorbed in the GH cell 2, that is, most of the light passes through the GH cell 2.

In the case of using a GH cell including a negative type (n-type) dichroic dye molecules capable of absorbing light in the alignment direction of minor axes of the molecules, the relationship between light absorption and light transmission of the GH cell is reversed to that of the GH cell 2 including the positive type dichroic dye molecules 4. To be more specific, the light is not absorbed in the GH cell including the negative type dichroic dye molecules when no voltage is applied thereto, and light is absorbed in the GH cell including the negative type dichroic dye molecules when a voltage is applied thereto.

An optical density (absorbance) ratio of the light modulation apparatus shown in FIGS. 1A to 1C, that is, a ratio of an optical density of the apparatus upon application of a voltage to an optical density thereof upon application of no voltage is about 10. This optical density ratio of the apparatus shown in the figures is as large as about twice an optical density ratio of a light modulation apparatus including only the GH cell 2 without use of the polarizing plate 1.

The related art light modulation apparatus shown in the figures has a problem. Since the polarizing plate 1 is fixed in an effective optical path of light, part of light, for example, 50% of light is usually absorbed in the polarizing plate 1, and further light may be reflected from the surface of the polarizing plate 1. As a result, the maximum transmittance of light passing through the polarizing plate 1 cannot exceed a certain value, for example, 50%, and accordingly, the quantity of light passing through the light modulation apparatus is significantly reduced by light absorption of the polarizing plate 1. This problem is one of factors which make it difficult to put a light modulation apparatus using a liquid crystal cell into practical use.

On the other hand, various kinds of light modulation apparatuses using no polarizing plate have been proposed. Examples of these apparatuses include a type using a stack of two GH cells in which the GH cell at the first layer absorbs a polarization component in the direction identical to that of polarized light and the GH cell at the second layer absorbs a polarization component in the direction perpendicular to the polarized light; a type making use of a phase transition between a cholesteric phase and a nematic phase of a liquid crystal cell; and a high polymer scattering type making use of scattering of liquid crystal.

These light modulation apparatuses using no polarizing plate have a problem. Since the optical density (absorbance) ratio between upon application of no voltage and upon application of a voltage is, as described above, as small as only 5, the contrast ratio of the apparatus is too small to normally carry out modulation of light at any location in a wide range from a bright location to a dark location. The light modulation apparatus of the high polymer scattering type has another problem in significantly degrading, when the apparatus is used for an image pickup apparatus, the image formation performance of an optical system of the image pickup apparatus.

The related art light modulation apparatus presents a further problem. Since the transmittance in a transparent state may become dark depending on the kind of a liquid crystal device used for the apparatus, if an image pickup apparatus provided with the light modulation apparatus is intended to pickup image with a sufficient light quantity in such a transparent state, the light modulation apparatus is required to be removed from an optical system of the image pickup apparatus.

The related art light modulation apparatus has the following problem associated with the drive thereof. To drive the related art light modulation apparatus, the transmittance has been controlled by modulating a magnitude of a DC voltage or AC voltage applied to the apparatus; however, for the light modulation apparatus at a consumer level, it is difficult to accurately perform voltage control and to obtain a characteristic having a low threshold value; a limitation lies in the number of gradation of the transmittance level; and D/A conversion is required for voltage control based on the intensity of transmission light, to raise a circuit cost.

The drive of the related art light modulation apparatus, particularly, of a type including a negative type liquid crystal having a negative dielectric constant anisotropy has another problem. In the related art light modulation apparatus, the transmittance has been changed with a large step from a current transmittance into a target transmittance; however, upon such a change in transmittance with a large step, particularly, from a transmittance in a transparent state into a transmittance in a light shield state, there occurs a defect in alignment of liquid crystal molecules, resulting in unstable optical characteristics, for example, in-plane non-uniformity in transmittance (which will be described later).

To be more specific, when a voltage applied to the liquid crystal is changed with a large step for changing the transmittance with a large step, there occurs a transient state in which liquid crystal molecules are aligned in different directions, and if such a transient state continues for a time being long enough to exert an effect on the transmittance, there appears in-plane non-uniformity in transmittance. In general, the transient state disappears after an elapse of a certain time required for re-alignment of liquid crystal molecules and pigment molecules; however, in the worst case, the transient state may partially remain even after an elapse of a long time.

A further problem of the drive of the related art light modulation apparatus is that even in a state in which drive pulses with a specific control waveform are applied to a liquid crystal device of the light modulation apparatus, there occurs a variation in transmittance due to a change in temperature of the environment in which the apparatus is disposed.

SUMMARY OF THE INVENTION

A first object of the present invention is to provide a light modulation apparatus capable of improving the transmittance, enhancing the contrast ratio, and keeping constant the quantity of light.

To achieve the first object, according to a first invention, there are provided a light modulation apparatus including a liquid crystal device and a polarizing plate disposed in an optical path of light made incident on the liquid crystal device, wherein the liquid crystal device is a guest-host type liquid crystal device using a negative type liquid crystal as a host material, and an image pickup apparatus including the light modulation apparatus disposed in an optical path of an optical system of the image pickup system.

The negative type liquid crystal of the liquid crystal device may have a negative dielectric constant anisotropy, and the guest material may be a positive type or negative type dichroic dye molecular material.

With the above configurations of the first invention, a negative type liquid crystal having a negative type dielectric constant anisotropy ($\Delta\varepsilon$) is used as the host material constituting part of the liquid crystal device disposed on the optical path, and accordingly, the transmittance upon light transmission, particularly, in a transparent state can be largely improved as compared with a light modulation device including a liquid crystal device using a positive type liquid crystal ($\Delta\varepsilon > 0$), and thereby the light modulation apparatus can be fixedly positioned in an optical system of the image pickup apparatus.

The light modulation apparatus of the first invention, in which the polarizing plate is disposed in the optical path of light made incident on the above-described unique liquid crystal device, is further advantageous in that an optical density (absorbance) ratio of the apparatus between upon application of no voltage and upon application of a voltage is improved, to increase the contrast ratio of the apparatus, thereby normally carrying out modulation of light at any location in a wide range from a bright location to a dark location.

A second object of the present invention is to provide a light modulation apparatus capable of easily, accurately controlling the transmittance, reducing a threshold value, improving the number of gradation, simplifying a drive circuit, and lowering the cost, an image pickup apparatus using the light modulation apparatus, and methods of driving the light modulation apparatus and the image pickup apparatus.

To achieve the second object, according to a second invention, there are provided a light modulation apparatus including a liquid crystal device, a drive pulse generation unit for driving the liquid crystal device, and a pulse width control unit for modulating a pulse width of each drive pulse thereby controlling the transmittance of light made incident on the liquid crystal device, and an image pickup apparatus including the light modulation apparatus disposed in an optical path of an optical system of the image pickup apparatus.

The pulse width of each drive pulse may be modulated with its pulse height kept constant. An average per unit time of positive and negative pulse heights of drive pulses applied between drive electrodes of the liquid crystal device upon modulation of the pulse width of each drive pulse may be preferably nearly zero for eliminating a bias action due to a DC component which is one of causes of flicker.

The modulation of the pulse width of each drive pulse may be performed in such a manner that the waveform of each drive pulse is present in a period of a basic frequency. The basic frequency and the modulated pulse width may be adjusted in such a manner as to prevent the occurrence of flicker in stationary drive of the light modulation apparatus. The light modulation apparatus may further include a drive circuit unit, and each drive pulse whose waveform is present in the period of the basic frequency may be generated in synchronization with a clock generated by the drive circuit unit.

The light modulation apparatus may further include a control circuit unit, and may be configured such that luminance information of the light emerged from the liquid crystal device is fed back to the control circuit unit, and the pulse width of each drive pulse is modulated in synchronization with a clock generated by the drive circuit unit on the basis of a control signal supplied from the control circuit unit. The image pickup apparatus including the light modulation apparatus may further include an image pickup device disposed on the light outgoing side of the light modulation apparatus, and may be configured such that the drive circuit unit is provided in the image pickup device, and an output signal from the image pickup device is fed back as luminance information to the control circuit unit of the light modulation apparatus and the pulse width of each drive pulse is modulated in synchronization with a clock generated by the drive circuit unit on the basis of a control signal supplied from the control circuit unit.

With the above configurations of the second invention, the transmittance is controlled by modulating the pulse width of each drive pulse applied to the liquid crystal device for light modulation, and accordingly, as compared with control of the transmittance by modulating the magnitude of a voltage, the transmittance can be easily, accurately controlled because the pulse width can be easily, accurately modulated in synchronization with a clock generated by the pulse width control unit; the change in transmittance by modulation of the pulse width is allowed to occur at a low threshold value; the transmittance can be easily, accurately controlled because the change in transmittance by modulation of the pulse width is relatively moderate; the number of gradation can be increased; and the need of D/A conversion can be eliminated to thereby reduce a circuit cost.

In particular, for a light modulation apparatus at a consumer level, the modulation of the pulse width of each drive pulse is advantageous in terms of its accuracy and easiness, and more particularly, in the case of mounting the light modulation apparatus in a recent digital control type equipment, the control of the pulse width on the time axis can be expected to realize a highly accurate control system of the equipment at a low cost.

To achieve the second object, according to the second invention, there are also provided methods of driving a light modulation apparatus and an image pickup apparatus, each method including the step of driving a liquid crystal device by modulating the pulse width of each drive pulse applied to the liquid crystal device thereby controlling the transmittance of light made incident on the liquid crystal device.

The methods of driving the light modulation apparatus and image pickup apparatus according to the second invention are each advantageous in driving the light modulation apparatus and image pickup apparatus with a good controllability.

In this way, according to the second invention, it is very important that the unique means of modulating the pulse width of each drive pulse, whose waveform is selected for improving and stabilizing the optical characteristics of the liquid crystal device of the light modulation apparatus, is used for the drive of the liquid crystal device of the light modulation apparatus.

A third object of the present invention is to provide a light modulation apparatus capable of stably controlling the transmittance without occurrence of a defect in alignment of liquid crystal molecules, an image pickup apparatus using the light modulation apparatus, and methods of driving the light modulation apparatus and the image pickup apparatus.

To achieve the third object, according to a third invention, there are provided a light modulation apparatus including a liquid crystal device, and a pulse control unit for changing the transmittance of light made incident on the liquid crystal device from a current transmittance into a target transmittance by applying drive pulses controlled with at least two-steps to the liquid crystal device, and an image pickup apparatus including the light modulation apparatus disposed in an optical path of an optical system of the image pickup apparatus.

The pulse height or pulse width of each drive pulse may be controlled with at least two-steps.

The light modulation apparatus may further include a drive circuit unit, and may be configured such that the drive pulse may be generated in synchronization with a clock generated by the drive circuit unit.

The light modulation apparatus may further include a control circuit unit, and may be configured such that luminance information of the light emerged from the liquid crystal device is fed back to the control circuit unit, and each drive pulse is generated in synchronization with a clock generated by the drive circuit unit on the basis of a control signal supplied from the control circuit unit. The image pickup apparatus including the light modulation apparatus may further include an image pickup device disposed on the light outgoing side of the light modulation apparatus, and may be configured such that the drive circuit unit is provided in the image pickup device, and an output signal from the image pickup device is fed back as luminance information to the control circuit unit of the light modulation apparatus and each drive pulse is generated in synchronization with a clock generated by the drive circuit unit on the basis of a control signal supplied from the control circuit unit.

With the above configurations of the third invention, the drive pulses to be applied to the liquid crystal device for light modulation are controlled with at least two-steps (from a low voltage to a high voltage), and accordingly, as compared with the related art light modulation apparatus in which the voltage is steeply changed, the transmittance can be controlled to be uniform over the entire plane of the liquid crystal device by applying a preparation pulse, whose height is low enough to prevent occurrence of a defect in alignment of liquid crystal molecules, thereby tilting the liquid crystal molecules to some extent, and then applying a final pulse required for achieving a desired transmittance.

To achieve the third object, according to the third invention, there are also provide methods of driving a light modulation apparatus and an image pickup apparatus, each method including the step of changing the transmittance of light made incident on a liquid crystal device from a current transmittance into a target transmittance by applying drive pulses controlled with at least two-steps to the liquid crystal device.

The methods of driving the light modulation apparatus and image pickup apparatus according to the third invention are each advantageous in driving the light modulation apparatus and image pickup apparatus with a good controllability.

A fourth object of the present invention is to provide a light modulation apparatus capable of stably controlling the transmittance, an image pickup apparatus using the light modulation apparatus, and methods of driving the light modulation apparatus and the image pickup apparatus.

To achieve the fourth object, according to a fourth invention, there are provided a light modulation apparatus including a liquid crystal device, a detection unit for detecting the intensity of transmission light having passed through the liquid crystal device or an environmental temperature of the liquid crystal device, a control circuit unit for setting a target intensity of the transmission light depending on the environmental temperature of the liquid crystal device on the basis of a detection value supplied from the detection unit, and a drive signal generation unit for generating a drive signal used for generating the target intensity of the transmission light by the control circuit unit, and an image pickup apparatus including the light modulation apparatus disposed on an optical path of an optical system of the image pickup apparatus.

The light modulation apparatus may further include a control circuit unit, and may be configured such that the transmittance may be controlled by monitoring the transmission light, feeding back the detection information to the control circuit unit, and adjusting the intensity of the transmission light at a constant value, or monitoring an environmental temperature of the liquid crystal device, feeding back the detection information to the control circuit unit, comparing the detection information with a predetermined characteristic value, and adjusting the intensity of the transmission light at a constant value.

The control circuit unit may generate each drive pulse having an AC waveform, whose pulse height is modulated, or each drive pulse whose pulse width or pulse density is modulated.

The light modulation apparatus may be configured such that the pulse width of each drive pulse having a basic waveform is modulated and the pulse height of the drive pulse is controlled depending on the environmental temperature of the liquid crystal device, or the pulse height of each drive pulse having a basic waveform is modulated and the pulse width of the drive pulse is modulated depending on the environmental temperature of the liquid crystal device.

The light modulation apparatus may further include a drive circuit unit, and may be configured such that each drive pulse may be generated in synchronization of a clock generated by the drive circuit unit.

With the above configurations of the fourth invention, an intensity of transmission light of the liquid crystal device for light modulation or an environmental temperature of the liquid crystal device is detected, a target intensity of transmission light depending on the environmental temperature of the liquid crystal device is set on the basis of the detected intensity of the transmission light or environmental temperature, and a specific drive signal for realizing the target intensity of transmission light is generated, and accordingly, it is possible to realize the drive of the liquid crystal device while eliminating the effect of the environmental temperature as much as possible, and to drive the light modulation apparatus in such a manner that a target transmittance can be usually obtained by performing the temperature correction independently from the control of the transmittance.

To achieve the fourth object, according to the present invention, there are also provided methods of controlling a light modulation apparatus and an image pickup apparatus, each including the step of driving a liquid crystal device by detecting the intensity of transmission light having passed through the liquid crystal device or an environmental temperature of the liquid crystal device, setting a target intensity of the transmission light depending on the environmental temperature of the liquid crystal device on the basis of a detection value supplied from the detection unit, and generating a drive signal used for generating the target intensity of the transmission light.

The methods of driving the light modulation apparatus and image pickup apparatus according to the fourth invention are each advantageous in driving the light modulation apparatus and image pickup apparatus with a good controllability.

The above-described first, second, third, and fourth inventions may be further configured as follows:

Each drive electrode of the liquid crystal device may be formed over the entire region of at least an effective light transmission portion. With this configuration, the transmittance over the entire width of an effective optical path can be collectively, accurately controlled by control of the pulse width of each drive pulse to be applied between the drive electrodes thus formed.

In the guest-host type liquid crystal device used for the light modulation apparatus, the host material may be a negative or positive type liquid crystal having a negative or positive type dielectric constant anisotropy, and the guest material may be a positive or negative type dichroic dye molecular material having a positive or negative type light absorption anisotropy.

The polarizing plate may be disposed in a movable portion of a mechanical iris, and may be moved in and from the optical path by operating the movable portion of the mechanical iris.

BRIEF DESCRIPTION OF THE DRAWINGS

FIGS. 1A and 1B are schematic views showing an operational principle of a related art light modulation apparatus using a positive type liquid crystal and FIG. 1C is a graph showing a rectangular waveform of a voltage applied to the liquid crystal;

FIGS. 2A and 2B are graphs showing a relationship between a transmittance of the apparatus shown in FIGS. 1A to 1B and a voltage applied thereto, wherein FIG. 2A shows the relationship in a voltage range of 0 to 10 V and FIG. 2B shows the relationship in a voltage range of 0 to 20 V;

FIG. 3A and 3B are schematic views showing an operational principle of a light modulation apparatus using a negative type guest-host liquid crystal according to the present invention and FIG. 3C is a graph showing a rectangular waveform of a voltage applied to the liquid crystal;

FIGS. 4A and 4B are graphs showing a relationship between a transmittance of the apparatus shown in FIGS. 3A to 3B and a voltage applied thereto, wherein FIG. 4A shows the relationship in a voltage range of 0 to 10 V and FIG. 4B shows the relationship in a voltage range of 0 to 20 V;

FIGS. 5A to 5C are schematic views showing a parallel rubbing process, an anti-parallel rubbing process, and a one-side rubbing process for rubbing a liquid crystal device, respectively;

FIG. 7 is a graph showing a gap dependence on an initial transmittance of the light modulation apparatus including the liquid crystal device shown in FIGS. 3A and 3B, which device is rubbed by the anti-parallel rubbing process;

FIGS. 8A to 8D are graphs each showing a gap dependence on a response speed of the light modulation apparatuses including the liquid crystal device shown in FIGS. 3A and 3B, which device is rubbed by each of the anti-parallel rubbing process and one-side rubbing process;

FIG. 10 is a graph showing a relationship between a transmittance of the light modulation apparatus shown in FIGS. 3A and 3B and a pulse width of a drive pulse applied thereto, which drive pulse has each of pulse heights of 5 V and 10 V;

FIG. 11 is a diagram showing three kinds of modulated waveforms of drive pulses applied to the light modulation apparatus shown in FIGS. 3A and 3B;

FIGS. 13A to 13C are graphs each showing a response characteristic of the light modulation apparatus using the negative type liquid crystal shown in FIGS. 3A and 3B;

FIG. 15 is a graph showing a relationship between a duty ratio and a transmittance of the light modulation apparatus shown in FIGS. 3A and 3C to which each drive pulse modulated in each of pulse width and pulse density is applied;

FIG. 17 is a graph showing an intensity of the transmittance of the light modulation apparatus shown in FIGS. 3A to 3C and the number of positive and negative drive pulses applied thereto;

FIG. 19 is a diagram illustrating a defect in alignment of liquid crystal molecules depending on a relationship between a transmittance of the light modulation apparatus shown in FIGS. 3A to 3C and a voltage applied thereto;

DETAILED DESCRIPTION OF THE PREFERRED EMBODIMENTS

Hereinafter, preferred embodiments of a light modulation apparatus of the present invention will be described with reference to the accompanying drawings.

First Embodiment

Referring to FIGS. 3A to 3C, there is shown a light modulation apparatus according to a first embodiment of the present invention, which apparatus includes a guest-host type liquid crystal cell (GH cell) 12 containing a host material 13 and a guest material 4, and a polarizing plate 11 disposed on the incident side of the GH cell 12.

A negative type liquid crystal having a negative dielectric constant anisotropy ($\Delta\epsilon$), produced by Merck under a trade name of MLC-6608, was used as the host material 13. A positive type dichroic dye having a positive light absorption anisotropy ($\Delta A$), produced by BDH under a trade name of D5, was used as the guest material 4.

With respect to the light modulation apparatus configured as described above, a change in transmittance (expressed in percentage based on the total quantity of light perfectly passing through the liquid crystal cell and the polarizing plate) of the light modulation apparatus was measured in air by applying an operational voltage having a rectangular waveform shown in FIG. 3C to the GH cell 12.

It should be noted that in this measurement, since the negative type liquid crystal is used as the host material 13, light passes through the GH cell 12 when no voltage is applied thereto, and light is absorbed in the GH cell 12 when a voltage is applied thereto.

Figure 4A:
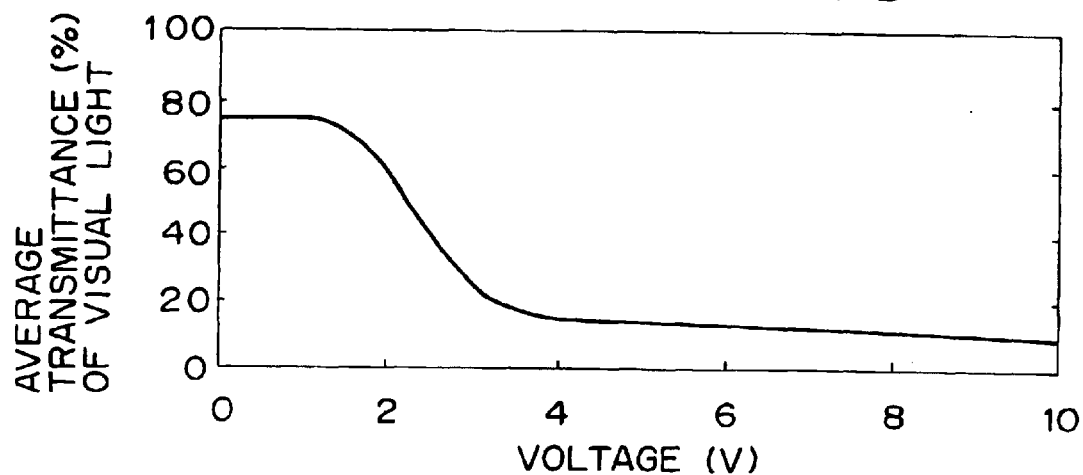
Figure 4B:
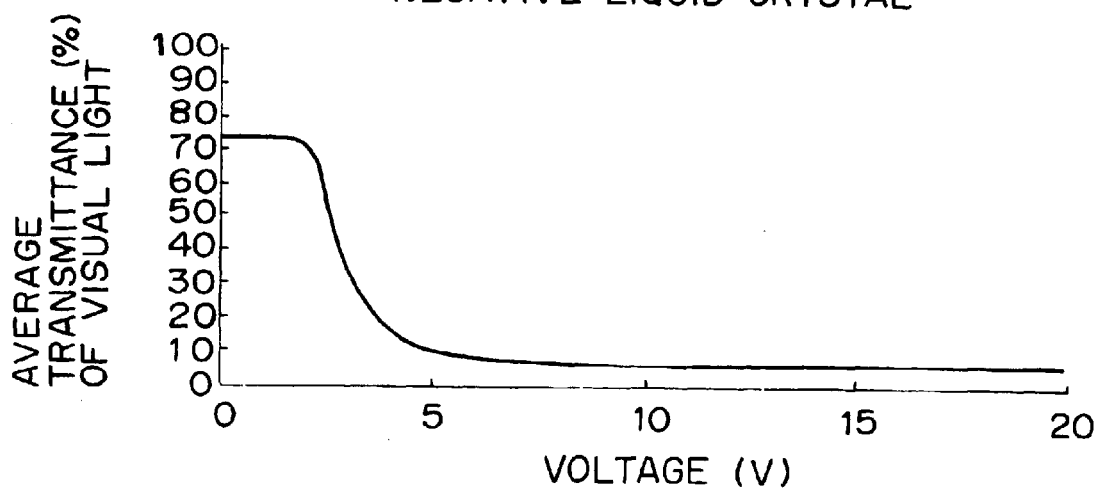

As is apparent from the measured result shown in FIGS. 4A and 4B, an average transmittance (in air) of visual light is steeply changed or reduced from the maximum transmittance (about 75%) to several % with an increase in applied voltage.

The reason why the transmittance of the light modulation apparatus of this embodiment is steely, largely reduced with an increase in applied voltage may be considered as follows: namely, in the case of using the negative type host material, since the interaction of liquid crystal molecules at the boundary between a liquid crystal alignment film of the liquid crystal cell and the liquid crystal molecules is very weak upon application of no voltage, light is easy to pass through the liquid crystal cell when no voltage is applied thereto, and directors (alignment vectors) of the liquid crystal molecules become easy to change when a voltage is applied thereto.

For comparison, a change in transmittance of a light modulation apparatus shown in FIGS. 1A to 1C was measured in the same manner as that described above. As shown in FIGS. 1A to 1C, the light modulation apparatus includes a guest-host type liquid crystal cell (GH cell) 2 containing a host material 3 and a guest material 4, and a polarizing plate 1 disposed on the incident side of the GH cell 2.

A positive type generalized liquid crystal having a positive dielectric constant anisotropy ($\Delta\in$), produced by Merck under a trade name of MLC-6849, was used as the host material 3, and the same positive type dichroic dye D5 (trade name, produced by BDH) as that used in the first embodiment was used as the guest material 4.

With respect to the light modulation apparatus configured as described above, a change in transmittance of the light modulation apparatus was measured by applying an operational voltage having a rectangular waveform shown in FIG. 1C to the GH cell 2.

It should be noted that in this measurement, since the positive type liquid crystal is used as the host material 3, light is absorbed in the GH cell 2 when no voltage is applied thereto, and light passes through the GH cell 2 when a voltage is applied thereto.

Figure 2A:
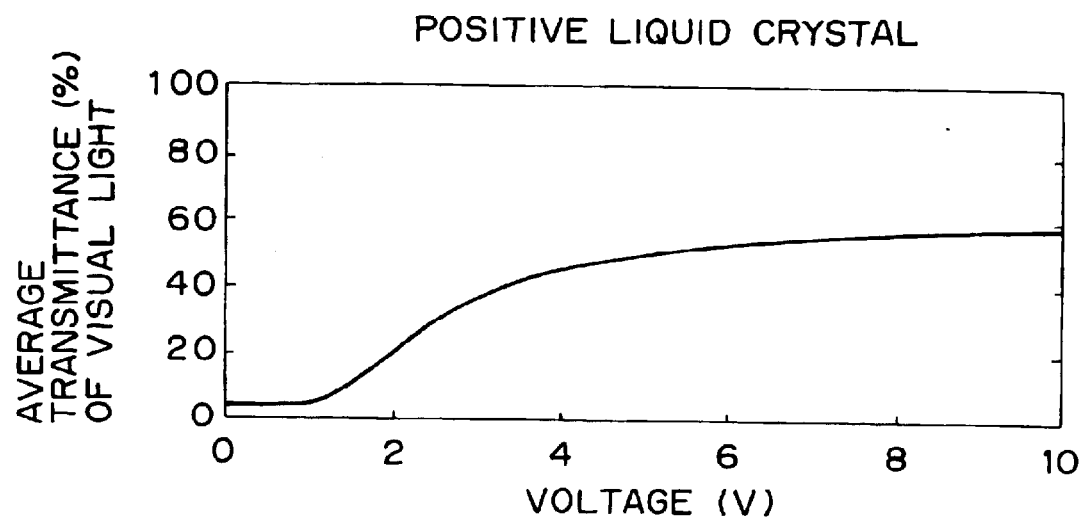
Figure 2B:
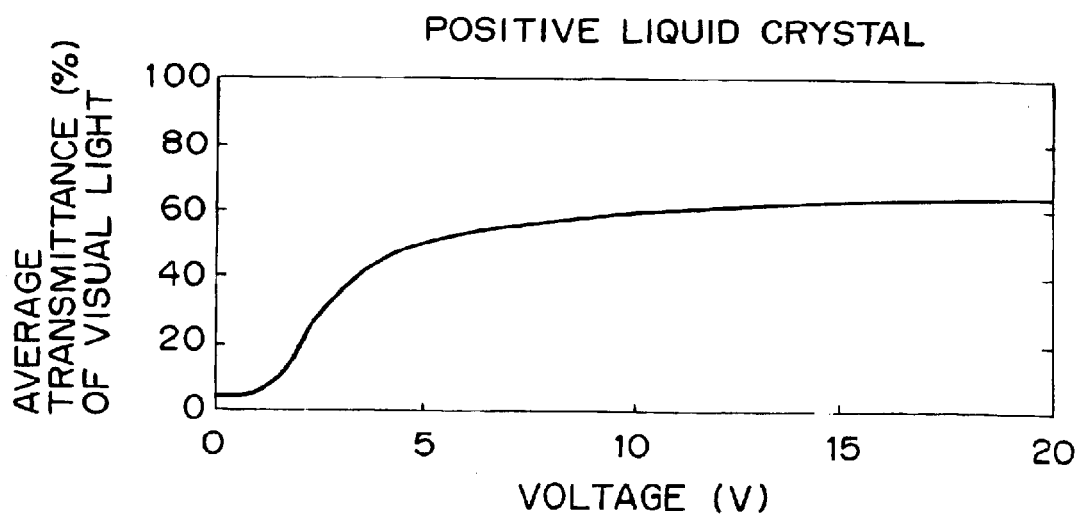

As is apparent from the measured result shown in FIGS. 2A and 2B, an average transmittance of visual light is slowly changed or increased with an increase in applied voltage, and reaches the maximum transmittance (about 60%) when a voltage of 20 V is applied to the liquid crystal cell 2.

The reason why the transmittance of the light modulation apparatus of this comparative example is slowly changed with an increase in applied voltage and the maximum transmittance thereof is relatively small may be considered as follows: namely, in the case of using the positive type host material, since the interaction of liquid crystal molecules at the boundary between a liquid crystal alignment film of the liquid crystal cell and the liquid crystal molecules is strong upon application of no voltage, there may remain those of liquid crystal molecules, whose directors do not change or not easy to change, even when a voltage is applied thereto.

As described above, the light modulation apparatus including GH cell 12 using the negative type host material according to the first embodiment is advantageous in that since the maximum transmittance can be increased up to about 75%, the apparatus can be designed to be operable in a high transmittance region, and since the transmittance can be steeply changed, the apparatus can easily control the transmittance by an operational voltage.

The combination of the host material and guest material constituting the GH cell 12 can be variously changed, the examples of which may include a combination of a negative host material ($\Delta\in<0$) and a positive type guest material ($\Delta A>0$); a combination of a negative host material ($\Delta\in<0$) and a negative type guest material ($\Delta A<0$); a combination of a positive type host material ($\Delta\in>0$) and a positive type guest material ($\Delta A>0$); and a combination of a positive type host material ($\Delta\in>0$) and a negative type guest material ($\Delta A<0$).

Although in the GH cell 12, a drive electrode, typically an ITO (Indium Tin Oxide: Indium Oxide doped with Tin) electrode is provided in solid on a substrate surface, it may be divided to be used in a segment mode or a matrix mode.

Examples of negative host materials ($\Delta\in<0$) usable for the light modulation apparatus according to the present invention may include compounds having the following molecular structures:

Example 1

| Molecular structure | $\Delta\epsilon$ | C | N | I |
|---|---|---|---|---|
| $C_5H_{11}$—⟨benzene⟩—⟨benzene⟩—COO—⟨benzene(CN)⟩—$C_7H_{15}$ | −4.0 | +45 | +101 | + |
| $C_3H_7$—⟨cyclohexane⟩—⟨benzene⟩—COO—⟨benzene(CN)⟩—$C_4H_9$ | −4.2 | +56 | +113 | + |
| $C_4H_9$—⟨cyclohexane⟩—COO—⟨benzene(CN)(CN)⟩—O—$C_4H_9$ | −22 | +85.8 | SA (+52.0) | + |
| $C_5H_{11}$—⟨cyclohexane⟩—⟨benzene⟩—COO—⟨benzene(CN)(CN)⟩—O—$C_5H_{11}$ | −18 | +133.5 | +143.5 | + |

|    |    |    |    |    |
|---|---|---|---|---|
| -continued | | | | |
| Molecular structure | Δε | C | N | I |
| [structure: two cyclohexyl rings with methyl groups, C5H11 substituents, and CN] | −8 | +24 | 66 | + |
Example 2
<Other basic skeletons>
R, R¹, R², and L express normal chain or branched alkyl group, alkoxy group, alkenyl group, fluoroalkoxy group, fluoroalkenyl group, —CN group, etc.
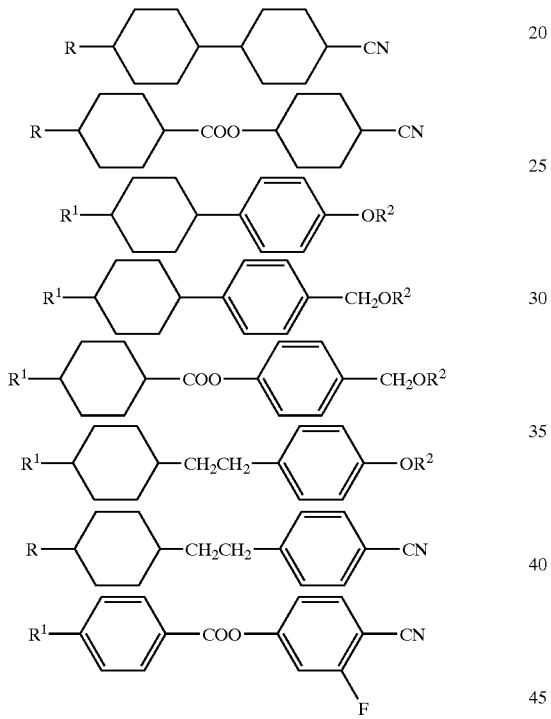
Example 3
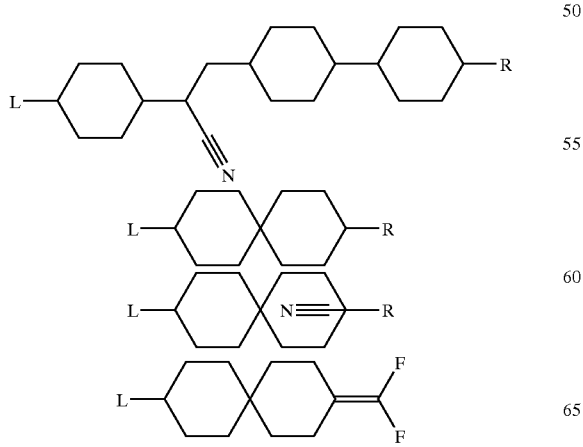
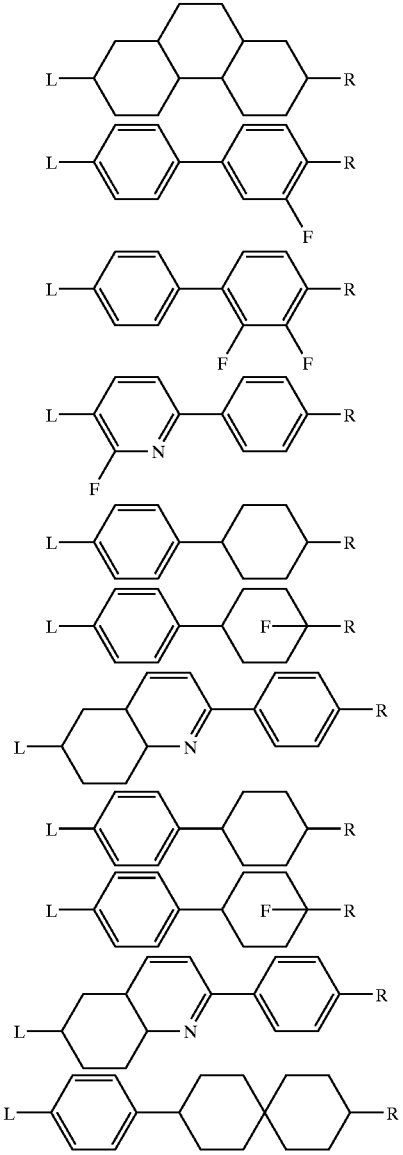
Example 4
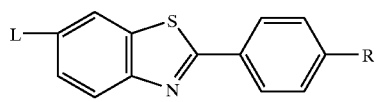

-continued
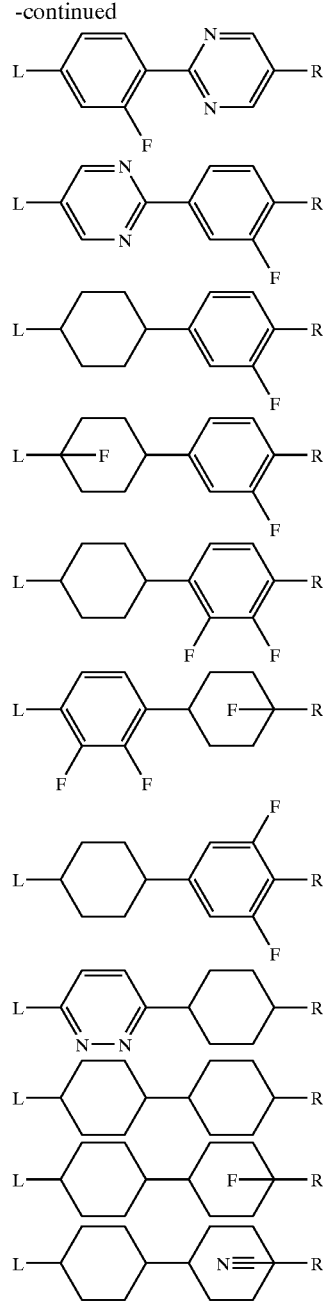
Example 5
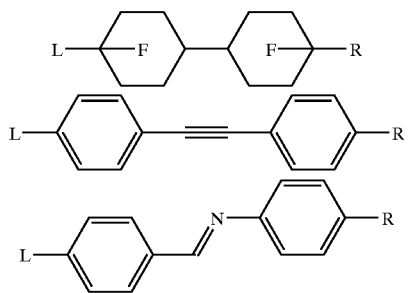
-continued
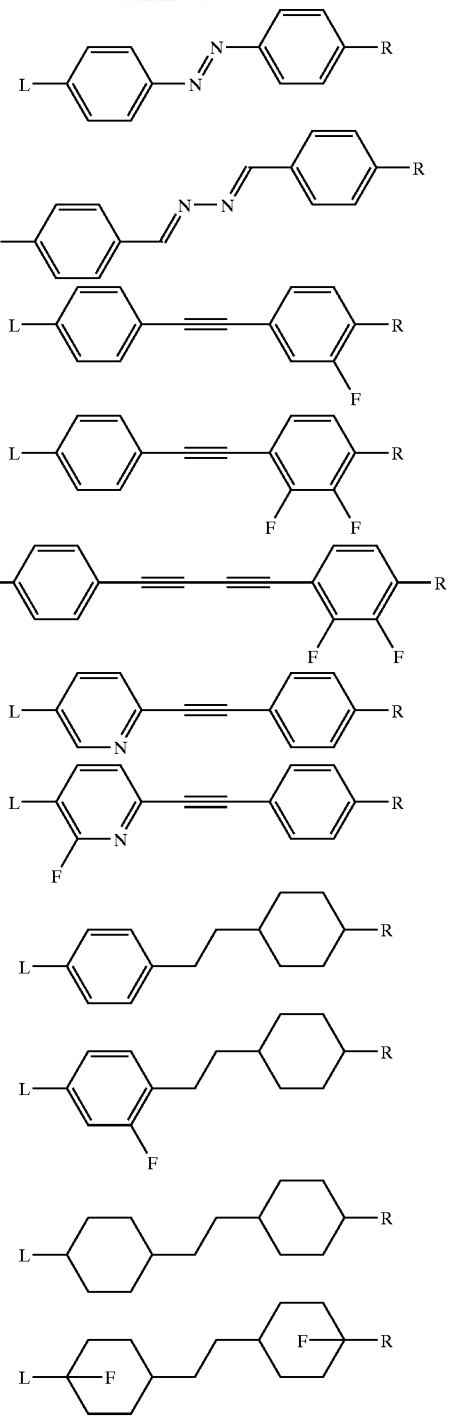
Example 6
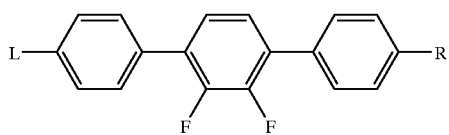

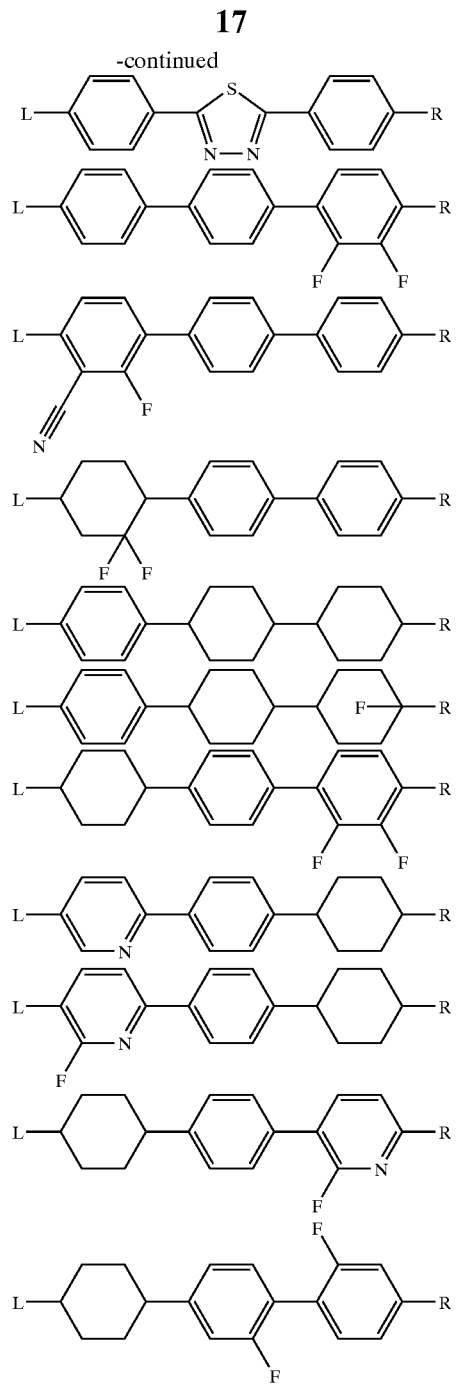

Example 7

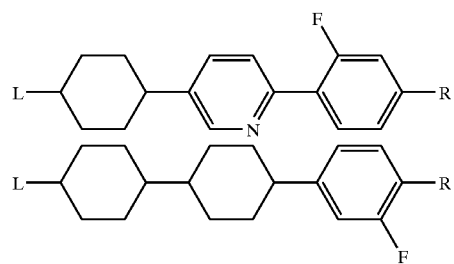

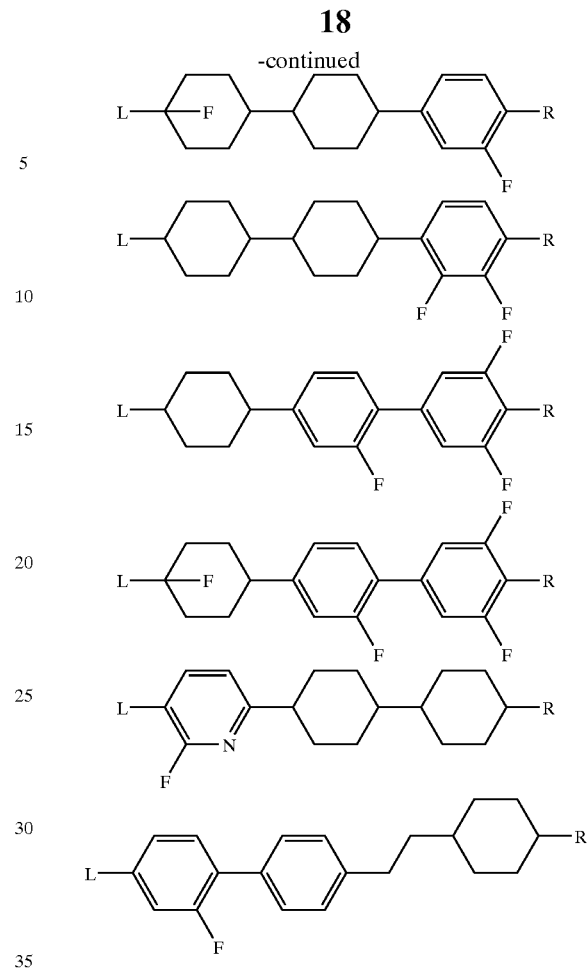

Examples of negative host materials usable for the light modulation apparatus according to the present invention may include the following commercially available compounds:

EXAMPLE 1

| MLC-6608 (produced by Merck) | | | |
|---|---|---|---|
| S-N shift | <−30.0 degree | | |
| Cleaning temperature | +90.0° C. | | |
| Rotational viscosity $v_1$ | 20° C. | 186.0 | mPa·s |
| Optical anisotropy | $\Delta n$ | 0.0830 | |
| +20° C., 589.3 nm | $n_e$ | 1.5586 | |
| | $n_o$ | 1.4756 | |
| Dielectric anisotropy | $\Delta \epsilon$ | −4.2 | |
| +20° C., 1.0 kHz | $\epsilon_\perp$ | 7.8 | |
| | $\epsilon_{//}$ | 3.6 | |
| Elastic constant | $K_{11}$ | 16.7 | pN |
| +20° C. | $K_{33}$ | 18.1 | pN |
| | $K_{33}/K_{11}$ | 1.08 | |
| Stability at low temperature | −30° C. | 1000 | h cr |

EXAMPLE 2

| MLC-2039 (produced by Merck) | | | |
|---|---|---|---|
| Cleaning temperature | +91.0° C. | | |
| Rotational viscosity $v_1$ | 20° C. | 163.0 | mPa·s |
| Optical anisotropy | $\Delta n$ | 0.0821 | |
| +20° C., 589.3 nm | $n_e$ | 1.5575 | |
| | $n_o$ | 1.4754 | |

EXAMPLE 2-continued

MLC-2039 (produced by Merck)
Cleaning temperature +91.0° C.

| Dielectric anisotropy | $\Delta\epsilon$ | −4.1 |
|---|---|---|
| +20° C., 1.0 kHz | $\epsilon\perp$ | 7.6 |
| | $\epsilon//$ | 3.5 |

EXAMPLE 3

MLC-2038 (produced by Merck)
Cleaning temperature +80.0° C.

| Flow viscosity ν | 20° C. | 29 | mm²s⁻¹ |
|---|---|---|---|
| | 0° C. | 128 | $mm^2s^{-1}$ |
| | −20° C. | 1152 | $mm^2s^{-1}$ |
| | −30° C. | 6369 | $mm^2s^{-1}$ |
| Rotational viscosity $v_1$ | 20° C. | 179.0 | mPa·s |
| Optical anisotropy | $\Delta n$ | 0.1032 | |
| +20° C., 589.3 nm | $n_e$ | 1.5848 | |
| | $n_o$ | 1.4816 | |
| Dielectric anisotropy | $\Delta\epsilon$ | −5.0 | |
| +20° C., 1.0 kHz | $\epsilon\perp$ | 9.0 | |
| | $\epsilon//$ | 4.0 | |
| Elastic constant | $K_{11}$ | 13.8 | pN |
| +20° C. | $K_{33}$ | 18.1 | pN |
| | $K_{33}/K_{11}$ | 1.31 | |
| Stability at low | −30° C. | 48 | h cr |
| temperature | −20° C. | 432 | h cr |

EXAMPLE 4

MLC-2037 (produced by Merck)
S-N shift −20.0° C.
Cleaning temperature +71.0° C.

| Rotational viscosity $v_1$ | 20° C. | 132.0 | mPa·s |
|---|---|---|---|
| Optical anisotropy | $\Delta n$ | 0.0649 | |
| +20° C., 589.3 nm | $n_e$ | 1.5371 | |
| | $n_o$ | 1.4722 | |
| Dielectric anisotropy | $\Delta\epsilon$ | −3.1 | |
| −20° C., 1.0 kHz | $\epsilon\perp$ | 6.7 | |
| | $\epsilon//$ | 3.6 | |
| Stability at low temperature | −20° C. | 1000 | h cr |

The above compounds may be used singularly or in combination to exhibit the neumatic property in a real service temperatural range.

Examples of dichroic dye molecular materials usable for the light modulation apparatus of the present invention may include compounds having the following molecular structures:

Example 1

| | molecular structure | λm (nm) | color | degree of dichroism |
|---|---|---|---|---|
| D5 | (1-(4-butylphenylamino)-4-hydroxyanthraquinone) | 590 | B | 5.3 |
| D35 | (1,5-bis(4-ethylphenylamino)anthraquinone) | 553 | P | 6.5 |

-continued

| molecular structure | λm (nm) | color | degree of dichroism |
|---|---|---|---|
| L-dye B | 641 | B | 9.2 |
| G209 | 687 | B | 9.5 |
| G168 | 574 | B | 10.6 |
| G165 | 595 | B | 10.3 |
| G224 | 574 | V | 9.7 |
| G205 | 507 | R | 11.4 |
| G232 | 450 | Y | 12.1 |

B: blue, P: purple, V: violet, R: red, Y: yellow
D5, D35: produced by BDH
L-dye B: produced by Roche
Others: produced by Japan Photosensitive Pigment Laboratory Example 2

| pigment structure | λ<sub>max</sub> (nm) (in liquid crystal) | S (value at λ<sub>max</sub>) |
|---|---|---|
| H$_9$C$_4$O—C$_6$H$_4$—CH=N—C$_6$H$_4$—N=N—(naphthalene)—N=CH—C$_6$H$_4$—OC$_4$H$_9$ | 450 | 0.79 |
| H$_9$C$_4$—C$_6$H$_4$—N=N—(naphthalene)—N=N—C$_6$H$_4$—OCH$_3$—C$_6$H$_4$—OC$_5$H$_{11}$ | 440 | 0.78 |
| H$_9$C$_4$—C$_6$H$_4$—N=N—(naphthalene)—N=N—C$_6$H$_4$—N(pyrrolidine) | 542 | 0.75 |
| H$_{17}$C$_8$—C$_6$H$_4$—OCO—C$_6$H$_4$—N=N—(naphthalene)—N=N—C$_6$H$_4$—N(CH$_3$)$_2$ | 548 | 0.78 |
| H$_9$C$_4$—C$_6$H$_4$—N=N—C$_6$H$_4$—N=N—(naphthalene)—N=N—C$_6$H$_4$—N(C$_2$H$_5$)$_2$ | 573 | 0.77 |
| H$_9$C$_4$—C$_6$H$_4$—CH$_2$NH—(naphthalene)—N=N—C$_6$H$_4$—N=N—(naphthalene)—N=N—(naphthalene)—NHCH$_2$—C$_6$H$_4$—C$_4$H$_9$ | 610 | 0.83 |
| anthraquinone with S—C$_6$H$_4$—C(CH$_3$)$_3$ and S—C$_6$H$_5$ substituents | 464 | 0.80 |

-continued
| pigment structure | λ_max (nm) (in liquid crystal) | S (value at λ_max) |
|---|---|---|
| 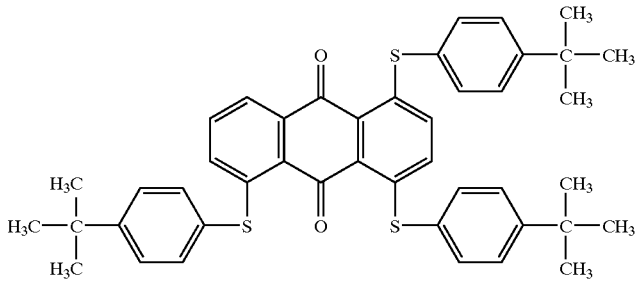 | 520 | 0.77 |
| 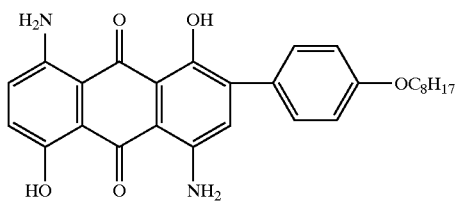 |  | 0.76 |
Example 3
| pigment structure | λ_max (nm) (in liquid crystal) | S (value at λ_max) |
|---|---|---|
| 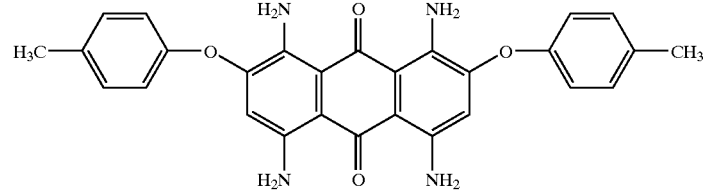 | 638 | 0.78 |
| 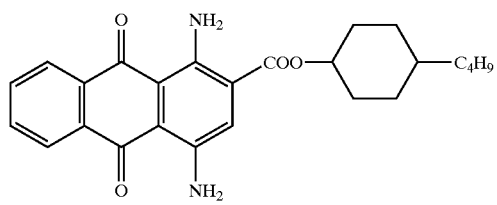 | 638 | 0.77 |
| 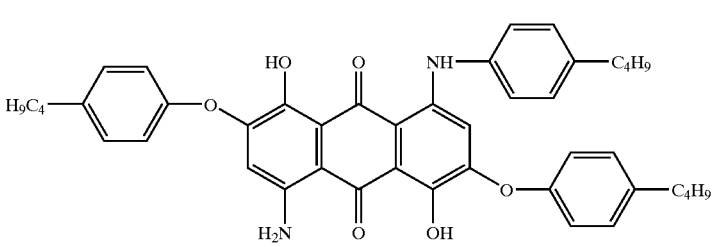 | 627 | 0.76 |

-continued

| pigment structure | λ_max (nm) (in liquid crystal) | S (value at λ_max) |
|---|---|---|
| 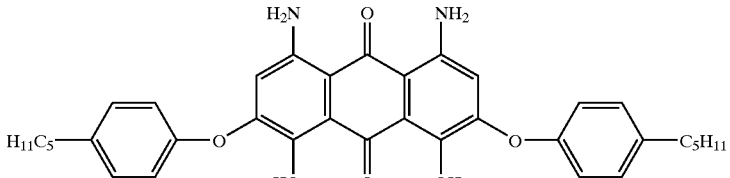 | 640 | 0.77 |
| 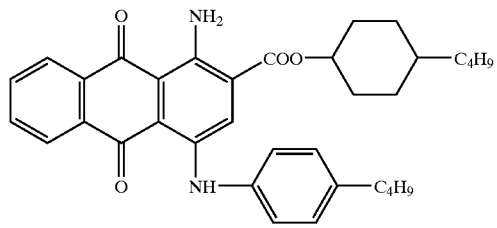 | 668 | 0.74 |
| 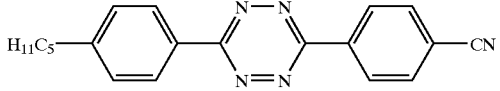 | 565 | −0.377 |
| 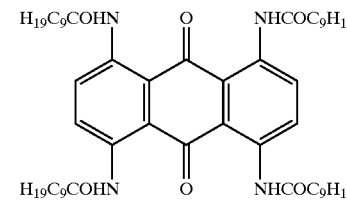 | 548 | −0.33 |

Second Embodiment

In this embodiment, a response speed of a light modulation apparatus upon application of a voltage thereto was examined.

The response speed of a light modulation apparatus upon application of a voltage thereto varies depending on not only the kind of drive of the apparatus but also means used for producing a liquid crystal device, for example, a rubbing process. The rubbing process involves forming a film made from a high polymer such as polyimide or polyvinyl alcohol on a substrate, and rubbing the film with cloth, thereby uniformly aligning liquid crystal molecules in the rubbing direction [D. W. Berrenan, Mol. Cryst. & Liq. Cryst., 23.215(1993)].

Examples of the rubbing processes include a parallel rubbing process, an anti-parallel rubbing process, and a one-side rubbing process. The parallel rubbing process shown in FIG. 5A involves rubbing both alignment films formed on upper and lower substrates in such a manner that the rubbing direction on the upper alignment film is parallel to that on the lower alignment film. The anti-parallel rubbing process shown in FIG. 5B involves rubbing both alignment films formed on upper and lower substrates in such a manner that the rubbing direction on the upper alignment film is anti-parallel to that on the lower alignment film. The one-side rubbing process shown in FIG. 5C involves rubbing only an alignment film formed on one of upper and lower substrates.

Since alignment of liquid crystal molecules largely differs depending on a material of an alignment film and a film formation condition of the alignment film, it is required to select an alignment film material suitable for a liquid crystal material and to examine a film formation condition and a rubbing condition suitable for the liquid crystal material. In this regard, according to the present invention, it is possible to determine conditions, particularly, a rubbing process condition suitable for a liquid crystal composition used for a light modulation apparatus.

At first, a change in transmittance depending on a voltage applied to a light modulation apparatus including a liquid crystal device rubbed by the parallel rubbing process was examined as follows:

A light modulation apparatus having the same basic configuration as that shown in FIGS. 3A to 3C, that is, including a GH cell 12 containing a host material 13 and a guest material 4 and a polarizing plate 11 disposed on the incident side of the GH cell 12, was prepared. In this example, a negative type generalized liquid crystal having a negative dielectric constant anisotropy (Δ∈), produced by Merck Incorporation under a trade name of MLC-2039, was used as the host material 13; the same positive type dichroic dye as that used in the first embodiment, produced by BDH Incorporation under the trade name of D5, was used as the guest material 4; and the GH 12 was rubbed by the parallel rubbing process shown in FIG. 5A. With respect to each of three samples of the light modulation apparatuses thus prepared, a change in transmittance of the sample was measured by applying an operational voltage having a rectangular waveform shown in FIG. 3C to the GH cell 12.

Figure 6A:
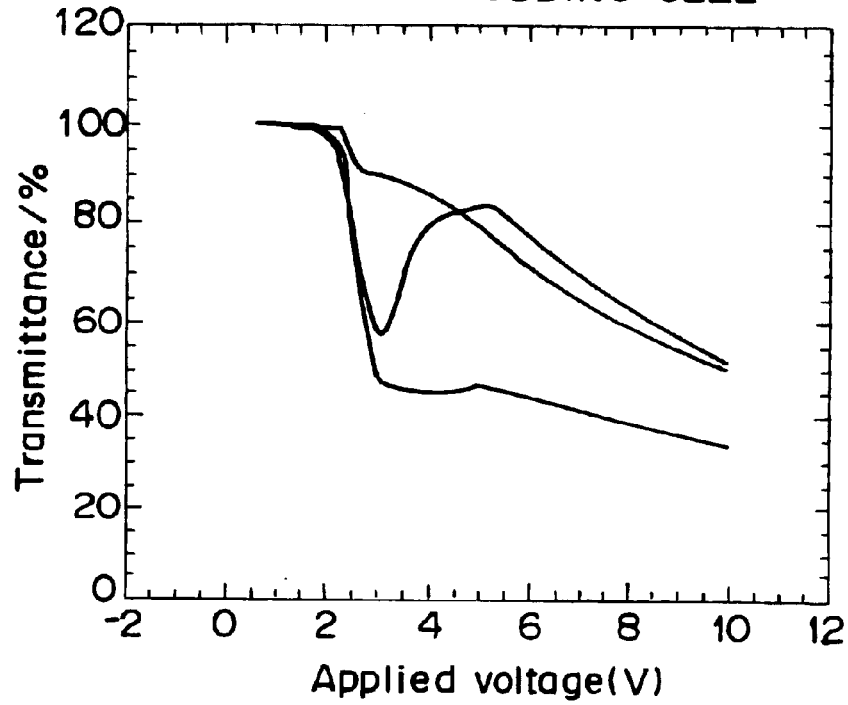
FIGS. 6A to 6C are graphs each showing a relationship between a transmittance of the light modulation apparatus including the liquid crystal device shown in FIGS. 3A to 3C, which device is rubbed by each of the parallel rubbing process, anti-parallel rubbing process, and one-side rubbing process, and a voltage applied to the liquid crystal device, respectively.

From the result shown in FIG. 6A, it becomes apparent that the transmittance is not dependent on the operational voltage, and is not reduced to a specific value. This means that the parallel rubbing process is unsuitable for alignment of the negative type liquid crystal molecules.

At second, a change in transmittance depending on a voltage applied to a light modulation apparatus including a liquid crystal device rubbed by the anti-parallel rubbing process was examined as follows:

A light modulation apparatus having the same basic configuration as that shown in FIGS. 3A to 3C, that is, including a GH cell 12 containing a host material 13 and a guest material 4 and a polarizing plate 11 disposed on the incident side of the GM cell 12, was prepared. In this example, the same negative type liquid crystal as that used in the first embodiment, produced by Merck Incorporation under the trade name of MLC-6608, was used as the host material 13; the same positive type dichroic dye as that used in the first embodiment, produced by BDH Incorporation under the trade name of D5, was used as the guest material 4; and the GM 12 was rubbed by the anti-parallel rubbing process shown in FIG. 5B. With respect to each of three samples of the light modulation apparatuses thus prepared, a change in transmittance of the sample was measured by applying an operational voltage having a rectangular waveform shown in FIG. 3C to the GH cell 12.

Figure 6B:
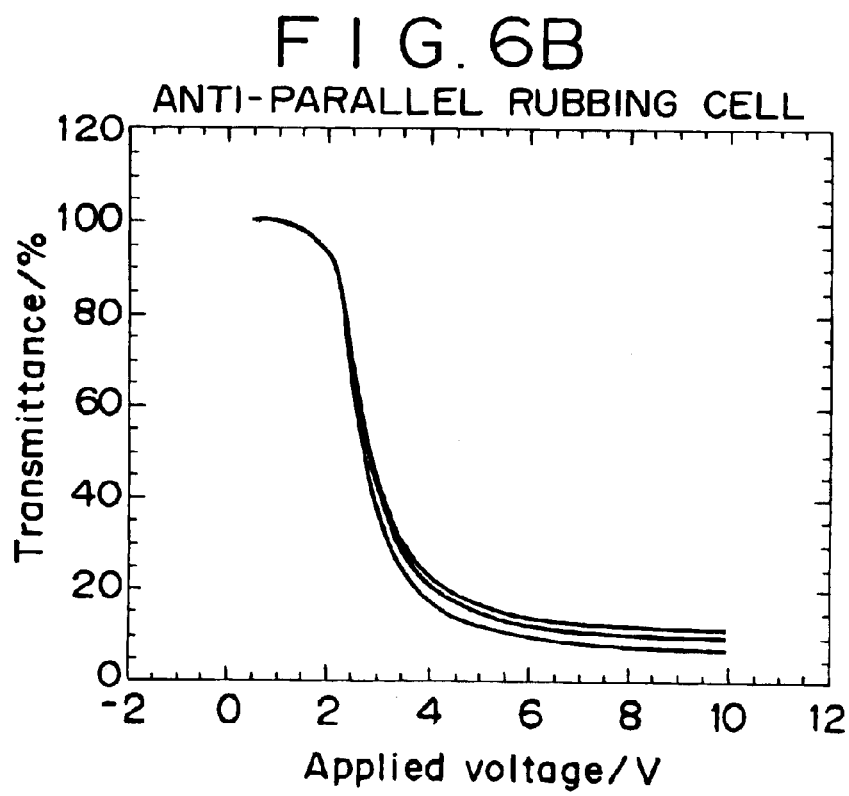

From the result shown in FIG. 6B, it becomes apparent that an average transmittance (in air) of visual light is steeply changed or reduced from a maximum transmittance (75%) to several % with an increase in operational voltage.

In this way, the transmittance of the GH cell rubbed by the anti-parallel rubbing process exhibits a high voltage dependence, that is, it can be controlled on the basis of a voltage applied to the GH cell, and further, the range of the transmittance controllable by a voltage is enlarged. In addition, the reason why the transmittance is steeply reduced with an increase in operational voltage and the maximum transmittance is high in FIG. 6B may be considered as follows: namely, in the case of using the negative type host material, since the interaction of liquid crystal molecules at the boundary between a liquid crystal alignment film of the liquid crystal cell and the liquid crystal molecules is very weak upon application of no voltage, light is easy to pass through the liquid crystal cell when no voltage is applied thereto, and directors of the liquid crystal molecules become easy to change when a voltage is applied thereto.

At third, a change in transmittance depending on a voltage applied to a light modulation apparatus including a liquid crystal device rubbed by the one-side rubbing process was examined as follows:

A light modulation apparatus having the same basic configuration as that shown in FIGS. 3A to 3C, that is, including a GH cell 12 containing a host material 13 and a guest material 4 and a polarizing plate 11 disposed on the incident side of the GH cell 12, was prepared. In this example, the same negative type liquid crystal as that used in the first embodiment, produced by Merck Incorporation under the trade name of MLC-6608, was used as the host material 13; the same positive type dichroic dye as that used in the first embodiment, produced by BDH Incorporation under the trade name of D5, was used as the guest material 4; and the GH 12 was rubbed by the one-side rubbing process shown in FIG. 5C. With respect to each of three samples of the light modulation apparatuses thus prepared, a change in transmittance of the sample was measured by applying an operational voltage having a rectangular waveform shown in FIG. 3C to the GH cell 12.

Figure 6C:
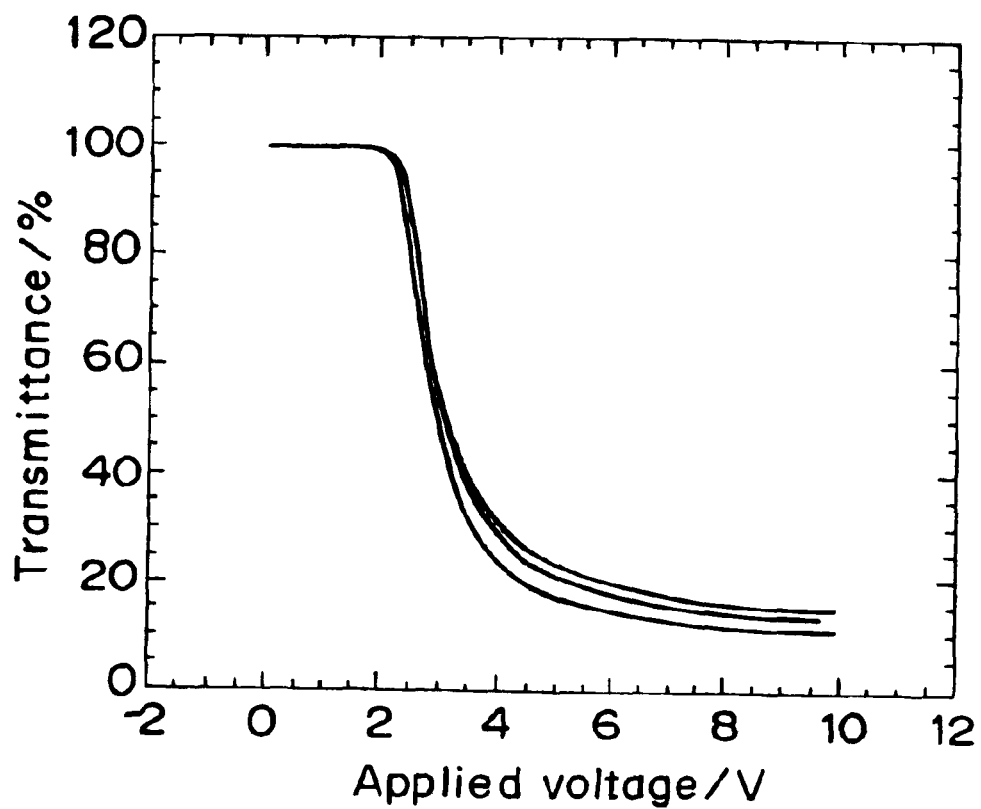

From the result shown in FIG. 6C, it becomes apparent that an average transmittance (in air) of visual light is steeply changed or reduced from a maximum transmittance (about 75%) to several % with an increase in operational voltage.

In this way, the transmittance of the GH cell rubbed by the anti-parallel rubbing process exhibits a high voltage dependence, that is, it can be controlled on the basis of a voltage applied to the GH cell. In addition, the reason why the transmittance is steeply reduced with an increase in operational voltage and the maximum transmittance is high in FIG. 6C may be considered as follows: namely, in the case of using the negative type host material, since the interaction of liquid crystal molecules at the boundary between a liquid crystal alignment film of the liquid crystal cell and the liquid crystal molecules is very weak upon application of no voltage, light is easy to pass through the liquid crystal cell when no voltage is applied thereto, and directors of the liquid crystal molecules become easy to change when a voltage is applied thereto.

Next, a factor typically a pre-tilt angle for determining an initial transmittance (upon application of no voltage) of the GH cell rubbed by the one side rubbing process was examined.

FIG. 7 is a graph showing a pre-tilt angle dependence on an initial transmittance (upon the off state of voltage) of the light modulation apparatus shown in FIGS. 3A to 3C. The pre-tilt angle is defined as an angle at which liquid crystal molecules are tilted along the tilt direction of main chains of a film made from a high polymer such as polyimide or polyvinyl alcohol at the rubbing step. The pre-tilt angle, therefore, has a strong relation with the rubbing process.

From the result shown in FIG. 7, it becomes apparent that when a design cell gap is 6 $\mu$m or more, the initial transmittance is not dependent on the pre-tilt angle. In other words, if the cell gap of the liquid crystal device of the light modulation apparatus is in a range of 5 $\mu$m or less, the transmittance can be adjusted by the alignment process.

In the case of using the GH cell rubbed by the anti-parallel process, a result similar to that shown in FIG. 7 was obtained.

An effect of the anti-parallel rubbing process exerted on a response speed was compared with that of the one-side rubbing process exerted on the response speed, as follows: namely, a relationship between a response speed of the light modulation apparatus including the liquid crystal device rubbed by each of the anti-parallel rubbing process and the one-side rubbing process controllable by a voltage and a cell gap was examined by applying a voltage to the liquid crystal device in each of a large-scale drive mode (drive wave form: 0–5 V at 1 kHz) and an intermediate-scale drive mode (drive waveform: 2–3 V at 1 kHz) at each of 22° C. and 65° C. The results are shown in FIGS. 8A to 8D. In these figures, for easy comparison, the response speed is expressed in an absorbance changed per unit response time.

From the results shown in FIGS. 8A and 8B, it becomes apparent that the gap dependence on the response speed in the intermediate-scale drive mode (2–3 V) does not appear in the low temperature environment, 22° C. (see FIG. 8A) while the gap dependence on the response speed in the large-scale drive mode (0–5 V) appears at 22° C. (see FIG. 8B); and the response speed of the apparatus including the cell rubbed by the anti-parallel rubbing process is higher than that of the apparatus including the cell rubbed by the one-side rubbing process at 22° C., irrespective of the presence or absence of the gap dependence.

From the results shown in FIGS. 8C and 8D, it becomes apparent that the gap dependence on the response speed appears in each of the intermediate-scale drive mode (2–3 V)

and the large-scale drive mode (0–5 V) in the high temperature environment, 65° C.; and the response speed of the apparatus including the cell rubbed by the anti-parallel rubbing process is higher than that of the apparatus including the cell rubbed by the one-side rubbing process in the intermediate-scale drive mode at 65° C. while the response speed of the apparatus in the large-scale drive mode (0–5 V) at 65° C. is not dependent on the kind of rubbing process.

In this way, the response speed of the light modulation apparatus including the liquid crystal device rubbed at a pre-tilt angle, exerting an effect on the initial transmittance, in the range of 5 μm or less by the anti-parallel rubbing process can be made higher than that of the apparatus including the liquid crystal device rubbed at the same pre-tilt angle by the one-side rubbing process. The reason for this may be considered that in the liquid crystal device rubbed by the anti-parallel rubbing process, directors of aligned liquid crystal molecules are easy to change by an electric field applied thereto.

Third Embodiment

In this embodiment, the control of a transmittance of a light modulation apparatus by modulating a pulse width or a pulse density of drive pulses applied to a GH cell of the apparatus was examined.

In particular, the modulation of a pulse width of each drive pulse for controlling a transmittance of the light modulation apparatus is effective to independently perform the control of the transmittance and the compensation of the transmittance. Specifically, the transmittance is normally controlled by modulating the pulse width of each drive pulse on the basis of a normal feedback control signal and the transmittance is compensated by modulating the pulse height of the drive pulse on the basis of a temperature correction feedback signal, or the transmittance is normally controlled by modulating the pulse height of each drive pulse on the basis of a normal feedback control signal and the transmittance is compensated by modulating the pulse width of the drive pulse on the basis of a temperature correction feedback signal.

(1) Basic Rectangular Waveform of Drive Pulse and Flicker of Light Modulation Apparatus The waveform of a voltage to be applied to the GH 12 is a rectangular waveform as shown in FIG. 3C; however, it may be a trapezoidal waveform or sine waveform. When each drive pulse shown in FIG. 3C is applied to a liquid crystal device, directors of liquid crystal molecules are changed depending on a differential potential between both electrodes, to thereby control the transmittance of light. Accordingly, the transmittance is generally controlled on the basis of a pulse height (or pulse voltage) of the drive pulse.

The control of such a pulse height of each drive pulse, however, must be basically subjected to D/A conversion, and further, it is difficult to highly accurately control the pulse height, with a result that the control of the pulse height causes a problem in increasing the circuit cost.

By the way, an electro-optical response of a nematic liquid crystal material is as slow as several ms at minimum and several hundreds ms at maximum. From this viewpoint, the present inventor has examined a suitable basic pulse generation period of drive pulses for stably controlling the transmittance of a material having such a response characteristic by adopting the mode of modulating the pulse width of each drive pulse applied thereto.

Figure 9:
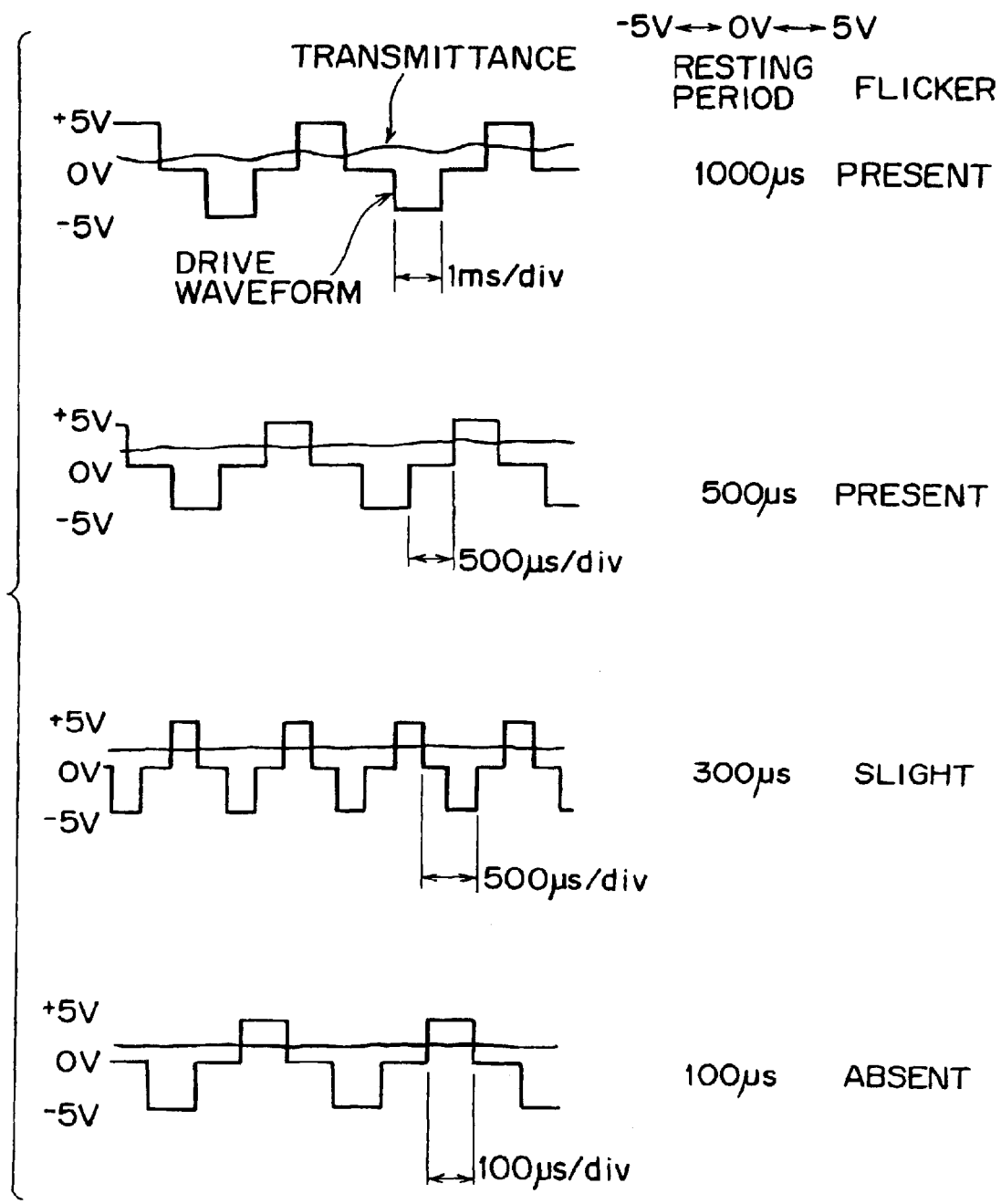
FIG. 9 is a diagram showing four relationships each between a transmittance flicker and a waveform of a drive pulse including each of four kinds of pulse resting periods, which drive pulse is applied to the light modulation apparatus shown in FIGS. 3A and 3B.

A test for determining the basic pulse generation period was performed by applying drive pulses to a liquid crystal device of a light modulation apparatus in the order of 0 V→5 V→0 V→−5 V→0 V . . . as shown in FIG. 9, and a variation in transmittance of the apparatus was observed by changing the width of each pulse, particularly, the width of each resting pulse (0 V).

As is apparent from the results shown in FIG. 9, a flicker of transmittance appears, that is, the transmittance is unstable when the resting pulse period is 300 μs or more, and any flicker of transmittance does not appear when the resting pulse period is 200 μs or less.

Accordingly, the pulse width of each pulse applied to the liquid crystal device of the light modulation apparatus should be modulated in such a manner that the resting pulse period does not exceed about 200 μs. Since the response speed of a liquid crystal is dependent on the kind of the liquid crystal and an environmental temperature, the resting pulse period must be set at such a value as not to cause a flicker of transmittance under service conditions. Further, to obtain stable optical characteristics of a liquid crystal device, it is effective to control the pulse width of each drive pulse on the basis of an environmental temperature feedback signal.

(2) Modulation of Pulse Width

As the result of the above-described examination, the basic pulse generation period was set at 100 μs, and the pulse width (PW) was modulated within this basic pulse generation period. FIG. 10 shows a change in transmittance of the light modulation apparatus depending on a pulse width PW of each drive pulse applied to the liquid crystal device of the apparatus with a pulse height of the drive pulse set at a constant value, for example, each of 5 V and 10 V. In addition, the transmittance is expressed in percentage based on the total quantity of light passing through the liquid crystal cell and the polarizing plate upon application of no voltage applied to the liquid crystal device.

As is apparent from FIG. 10, the transmittance can be easily controlled by modulating the pulse width of each drive pulse within the pulse generation period of 100 μs under the condition that the pulse height of the drive pulse is set at each of 5 V and 10V. This is because directors of liquid crystal molecules are changed by an electric field energy corresponding to the pulse width of each drive pulse, and thereby the alignment of the liquid crystal molecules is controlled. From the result shown in FIG. 10, it is also found that the transmittance can be freely controlled by the combination of the pulse height and the pulse width of each drive pulse. This means that the limitation of gradation due to the limitation of minimum clock can be eliminated, that is, the resolution of the gradation control can be increased by controlling a pulse height in digital as a lower bit and simultaneously modulating the pulse width as an upper bit, or by controlling a pulse width in digital as a lower bit and simultaneously modulating the pulse height as an upper bit. The modulation of the pulse width of each drive pulse has a further merit in terms of cost because the pulse width of the basic waveform of the drive pulse can be modulated in synchronization of a clock generated by a peripheral circuit of an apparatus including the light modulation device.

FIGS. 11A and 11B show two waveforms of each drive pulse modulated in pulse width. In the waveform shown in FIG. 11A, the pulse is applied at the start of the basic pulse generation period, and in the waveform shown in FIG. 11B, the pulse is applied after an elapse of a specific delay time since the start of the basic pulse generation period. The effect of the drive pulse having the waveform in FIG. 11A is the same as that of the drive pulse having the waveform in FIG. 11B. With respect to the waveform in FIG. 11B, the pulse may be applied after an elapse of the delay time since each basic pulse generation period. Further, the waveform in FIG. 11B may be combined with the waveform in FIG. 11A. In addition, a necessary number of drive pulses may be applied within the basic pulse generation period. FIG. 11C also shows the modulation of the pulse density, in which the numerical density of pulses within the basic pulse generation period is modulated.

Figure 12:
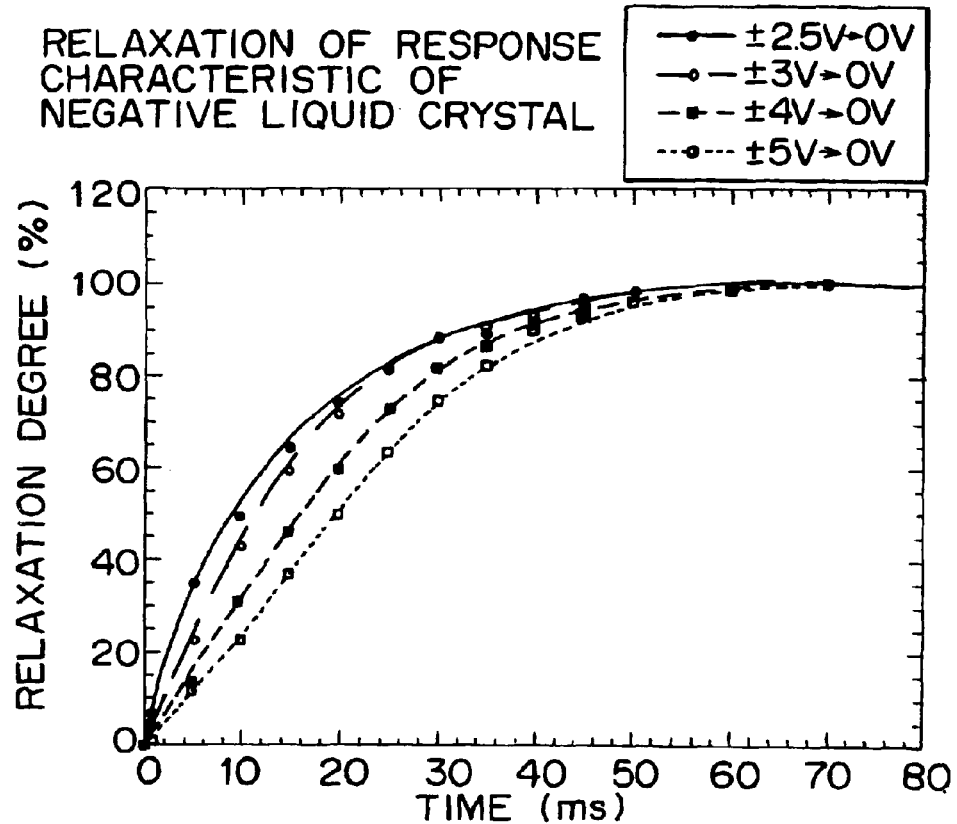
FIG. 12 is a graph illustrating a relaxation stage of a negative type liquid crystal of the light modulation apparatus shown in FIGS. 3A and 3C.

FIG. 12 shows a relaxation stage of a negative type liquid crystal used as a host material, for example, of the GH cell shown in FIGS. 3A to 3C.

The relaxation stage of a negative type liquid crystal system is expressed by the following equations:

$$R = R_1[1-\exp(-T/\tau_1)] + R_2[1-\exp(-(T/\tau_2)^2)]$$

Basic Period $\leq -$(Relaxation Time)$\times ln(0.98)$ $T = -\tau \times ln[1-2/100]$ Relaxation Stage at Relaxation Time $\tau_1 \to T = 300$ to $400$ $\mu s$ The values $R_1$, $\tau_1$, $R_2$, and $\tau_2$ are shown in FIG. 12, for example, $R_1 = 78\%$, $\tau_1 = 15.8$ ms, $R_2 = 22\%$, and $\tau_2 = 17.6$ ms at the relaxation state of 3 V→0 V.

From the result shown in FIG. 12, it becomes apparent that the relaxation time after a pulse voltage is applied and then turn off is changed depending on the pulse height, and more specifically, the relaxation time becomes longer as the pulse height becomes higher.

Figure 13A:
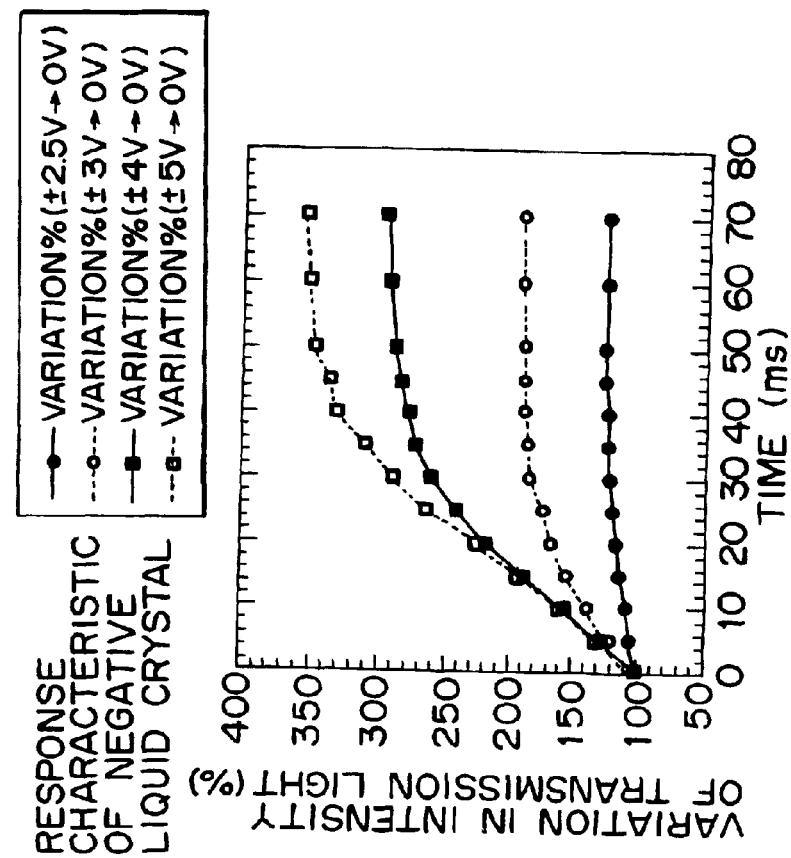
Figure 13B:
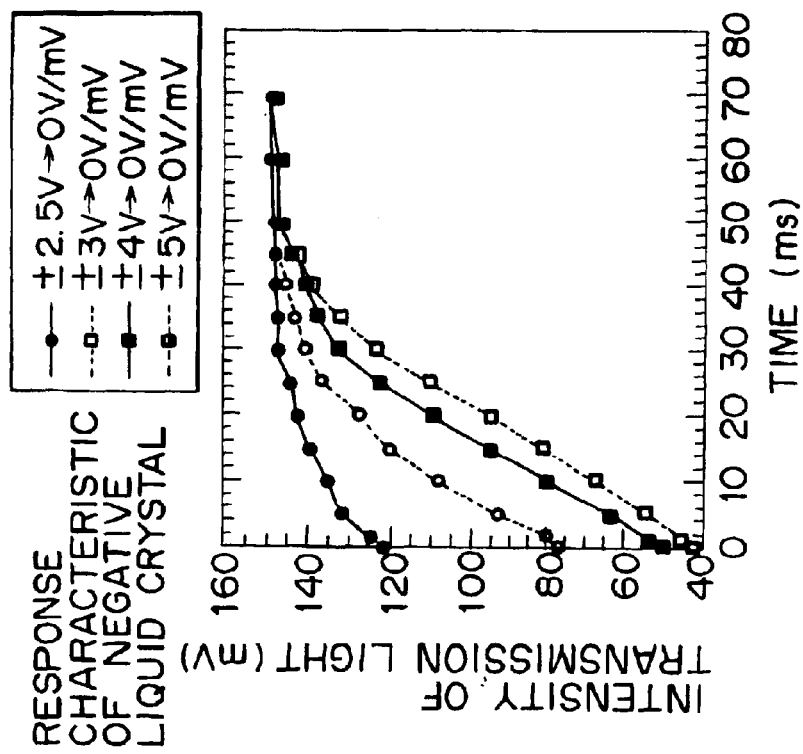

FIG. 13A shows the intensity of the transmission light of the light modulation apparatus in a relaxation stage similar to that shown in FIG. 12, and FIGS. 13B and 13C each show a variation in intensity of the transmission light of the light modulation apparatus in the relaxation stage. From the data on the variation in intensity of the transmission light in a region of 0 to 5 ms in which relaxation is linearly generated (FIG. 13B), it becomes apparent that the off time of 300 $\mu s$ or less is required to specify the variation in a range of 1% or less, and the off time of 420 $\mu s$ or less is required to specify a variation in a range of 2% or less.

The above off time corresponds to the resting pulse period for eliminating a flicker of transmittance shown in FIG. 9, so that the basic pulse generation period can be set at, for example, 100 $\mu s$ under the condition that a variation in intensity of the transmission light in the range of 2% or less is allowable.

The variation in intensity of the transmission light in the range of 2% or less is set on the basis of the image pickup specification of the existing CCD (which will be described later).

In the image pickup of the CCD, even if there occurs a variation in intensity of the transmission light in the range of more than 2%, it is estimated that flicker little appears upon usual operation of the CCD because the image pickup of the CCD is based on an average of light quantity accumulated in a field period; however, the dynamic range of the transmittance control is degraded, and if a shutter is used, the open time of the shutter is not proportional to the light quantity, to cause a problem in terms of control. As a result, in the image pickup of the CCD, it may be desirable to specify the variation in intensity of transmission light in the range of 2% or less.

If the basic pulse generation period exceeds the field period of the CCD, a flicker may appear upon usual operation of the CCD. Accordingly, to carry out the modulation of the pulse width of each drive pulse, it is essential to set the basic pulse generation period within the field period of the CCD.

(3) Comparison Between Modulation of Pulse Width and Modulation of Pulse Height

Figure 14:
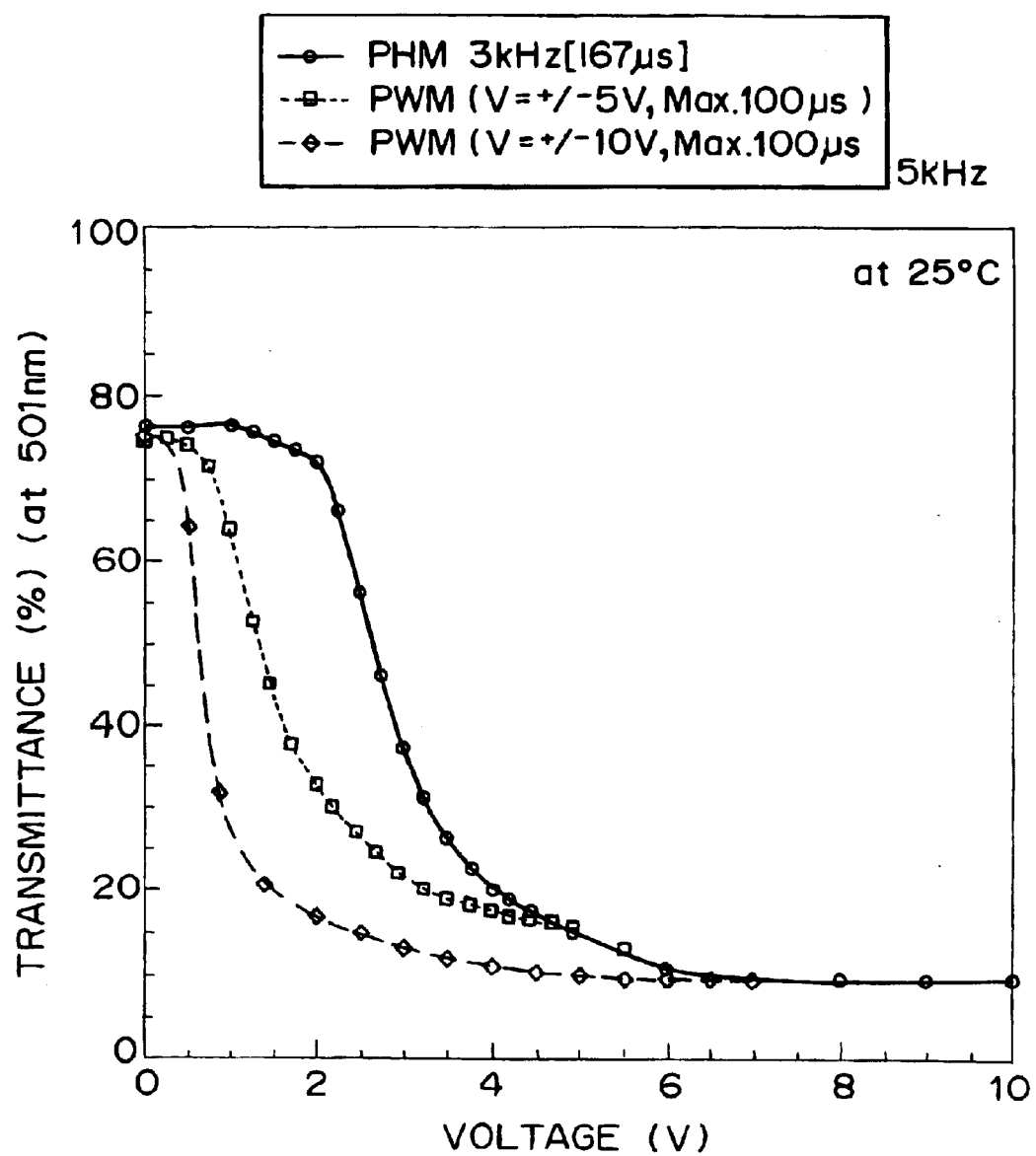
FIG. 14 is a graph showing a relationship between a transmittance of the light modulation apparatus shown in FIGS. 3A and 3C and each drive pulse modulated in each of pulse width and pulse height.

FIG. 14 shows a graph for comparing the characteristic of a conventional pulse height modulation (PHM) mode and the characteristic of a pulse width modulation (PWM) mode. In this graph, the abscissa indicates an average per unit time of absolute values of differential potentials applied between electrodes, which is taken as an equivalent voltage.

As is apparent from FIG. 14, as compared with the curve indicating the PHM mode, the curve indicating the PWM mode is lower in threshold voltage and is shifted on the lower voltage side as a whole. As a result, according to the PWM mode, the transmittance can be controlled by a lower voltage, to reduce the power consumption, and since the transmittance is relatively moderately changed depending on a voltage, it is easy to be controlled by the voltage, to improve the gradation.

In this way, the pulse width modulation (PWM) mode has the following advantages:

(1) to reduce a threshold voltage;
(2) to increase the number of gradation of the transmittance level, and highly accurately control a transmittance; and
(3) reduce a circuit cost because of no D/A conversion.

(4) Modulation of Pulse Width and Modulation of Pulse Density

A pulse density modulation (PDM) mode used in place of modulation of a pulse height of each drive pulse was compared with the above-described PWM mode. In the PDM mode, the number of pulses generated per unit time is modulated, and in general, the pulses, each having a very short width, are frequently generated per unit time.

As shown in FIG. 15, the drive characteristic of the PWM mode is very similar to that of the PDM mode; however, the PWM mode is superior in power consumption to the PDM mode because the PWM mode is smaller than the PDM mode in terms of the amount of a current charged in a liquid crystal cell per unit time. The PWM mode is also superior to the PDM mode in terms of impedance matching.

(5) Effect of Pulse Number

In the case of controlling a transmittance of a light modulation apparatus in the pulse width modulation mode, it is possible to eliminate the deviation of polarization of ions or the like in the light modulation apparatus by driving the apparatus in such a manner that an average per unit time of differential potentials (DC components) applied between electrodes of a liquid crystal device of the apparatus becomes nearly zero, and hence to highly accurately control the transmittance of the apparatus.

Figure 16A:
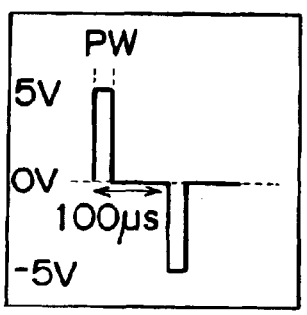
FIGS. 16A to 16D are diagrams showing waveforms of four kinds of drive pulses, whose pulse widths are differently modulated, to be applied to the light modulation apparatus shown in FIGS. 3A and 3C.
Figure 16B:
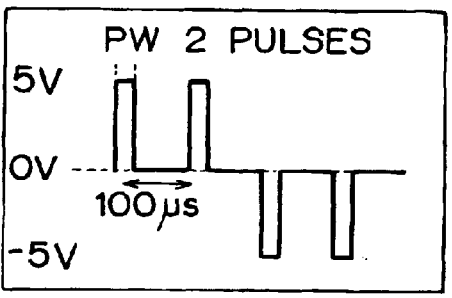

For example, when two positive pulses and two negative pulses are, as shown in FIG. 16B, alternately applied to a basic drive waveform of FIG. 16A, if an average per unit time of the number of the positive pulses is equal to that of the number of the negative pulses, it is possible to usually obtain the same drive characteristic of the transmittance.

Figure 16C:
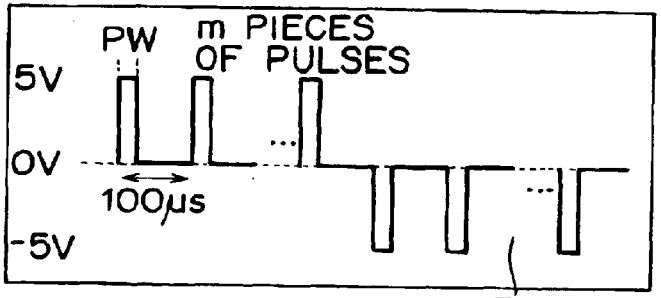

As shown in FIG. 16C, the relationship between a transmittance and a pulse width is not changed irrespective of the number (m=1, 2, ...) of positive pulses and the number (m=1, 2, ...) of negative pulses insofar as the number (m=1, 2, ...) of the positive pulses is equal to the number (m=1, 2, ...) of the negative pulses.

Figure 16D:
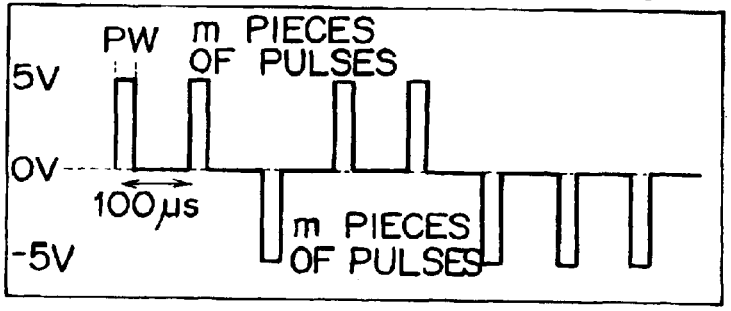
Figure 16E:
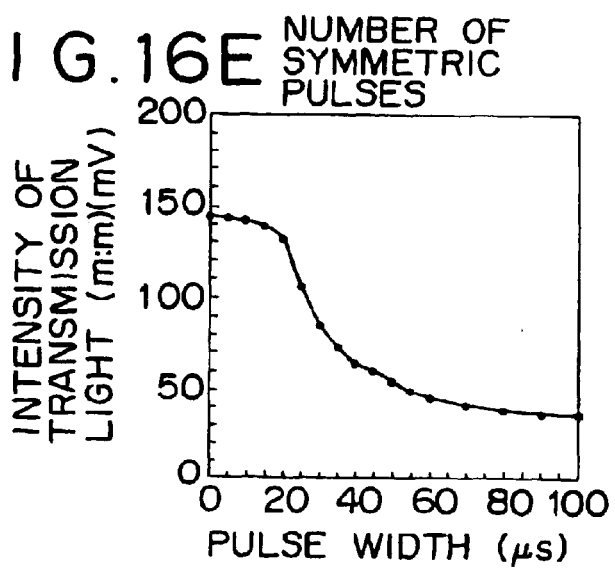
FIG. 16E is a graph showing a relationship between an intensity of the transmittance and a pulse width of each drive pulse.

As shown in FIG. 16D, the relationship between a transmittance and a pulse width is not changed irrespective of the generation order of pulses insofar as the number of the positive pulses is equal to that of the negative pulses. Further, it can be easily estimated that the relationship between a transmittance and a pulse width is not changed even if pulse widths are individually modulated, insofar as an average per unit time of the pulse widths is specified.

On the contrary, if the number of positive pulses is different from that of negative pulses, the relationship between a transmittance and a pulse width is changed. Now, it is assumed that the number of negative pulses is as large as k times the number of the positive pulses. If k=1, the drive pulses (positive and negative pulses) are symmetrically applied with respect to 0 V, and in this case, the relationship between a transmittance and a pulse width is not changed. On the other hand, if the value of k becomes larger than 1, the drive pulses (positive and negative pulses) are asymmetrically applied with respect to 0 V, and in this case, the relationship between a transmittance and a pulse width is changed, and more specifically, as shown in FIG. 17, the transmittance becomes larger than a specific transmittance, thereby degrading the controllability of the transmittance. That is to say, the transmittance is varied not depending on the value "m" but depending on the value "k".

If the polarities of asymmetric pulses are instantly reversed, the transmittance is temporarily reduced and is returned to the original transmittance after several seconds. Such a transient variation in the order of seconds, observed as a flicker with a long period, may be considered to occur due to a deviation of movable ions in a liquid crystal cell, which deviation may be caused by an average per unit time of bias voltages.

As described above, to stably control the transmittance, it may be desirable to symmetrically apply the drive pulses (positive and negative pulses) with respect to 0 V, that is , to make the number of the positive pulses equal to that of the negative pulses.

Fourth Embodiment

In this embodiment, the control of a transmittance of a light modulation apparatus by modulating stepwise the pulse width of each drive pulse applied to a liquid crystal device of the apparatus was examined.

Rubbing Effect and Defect in Alignment

A test for examining the rubbing effect and a defect in alignment of liquid crystal molecules was performed by using a light modulation apparatus including a liquid crystal cell shown in FIGS. 3A to 3C. The cell was produced by making glass substrates, each having a transparent electrode on the upper surface of which a liquid crystal alignment layer was provided, face to each other with a specific gap put therebetween and filling the gap with a guest-host liquid crystal in a reduced pressure. Each drive pulse having an AC rectangular waveform shown in FIG. 3C was applied to the cell of the apparatus, and a defect in alignment of liquid crystal molecules was observed.

Figure 18A:
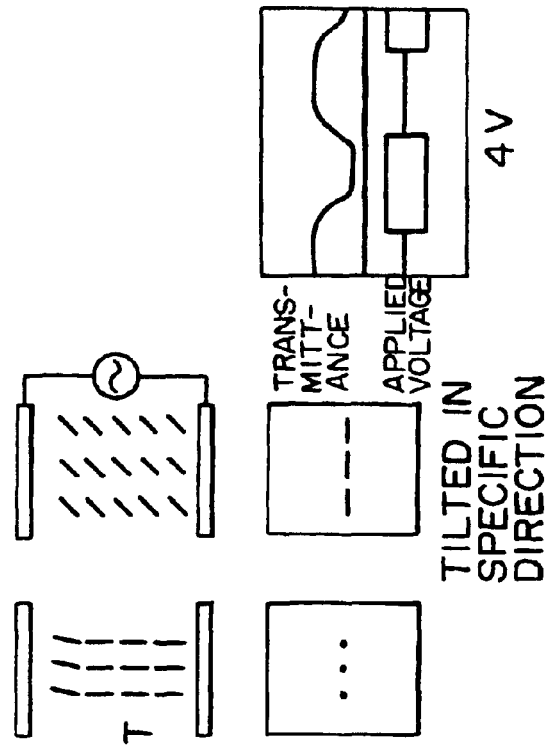
FIGS. 18A to 18D are schematic views each showing an alignment stage of directors of light crystal molecules of the light modulation apparatus shown in FIGS. 3A to 3C.
Figure 18B:
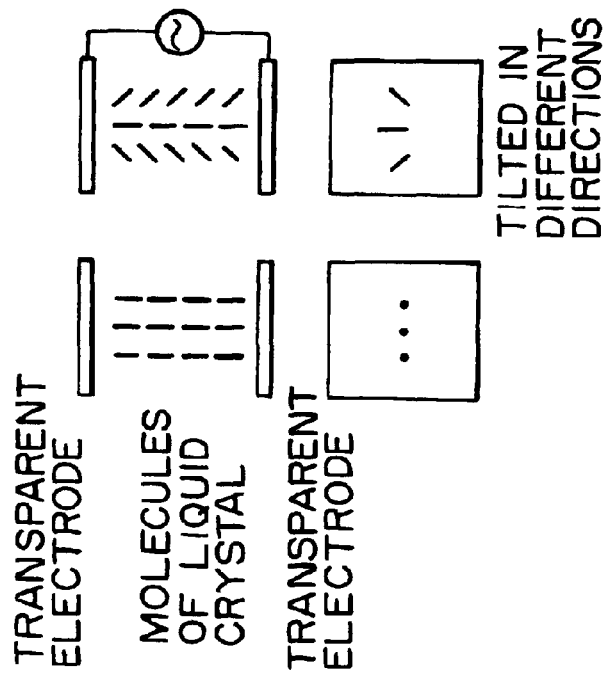

If the liquid crystal alignment layer (not shown) is not subjected to rubbing treatment, as shown in FIG. 18A, when a voltage is applied to the cell, light crystal molecules are tilted with respect to the substrate plane and simultaneously, liquid crystal molecules and pigment molecules in a plane parallel to the glass substrate plane were disturbed, with a result that non-uniformity of the transmittance occurs in the substrate plane. To solve such a problem, as a known technique, the tilting direction of the liquid crystal molecules is previously specified by rubbing the liquid crystal alignment layer as shown in FIG. 18B, to uniformly tilt the liquid crystal molecules, thereby improving the in-plane uniformity of the liquid crystal molecules.

However, if a large drive voltage is applied with a single step to the liquid crystal device rubbed as described above, there occurs a transient state in which liquid crystal molecules are aligned in different directions, and if such a transient state continues for a time being long enough to exert an effect on the transmittance, there appears in-plane non-uniformity in transmittance. In general, the transient state disappears after an elapse of a certain time required for re-alignment of liquid crystal molecules and pigment molecules; however, in the worst case, the transient state may partially remain even after an elapse of a long time.

Figure 18C:
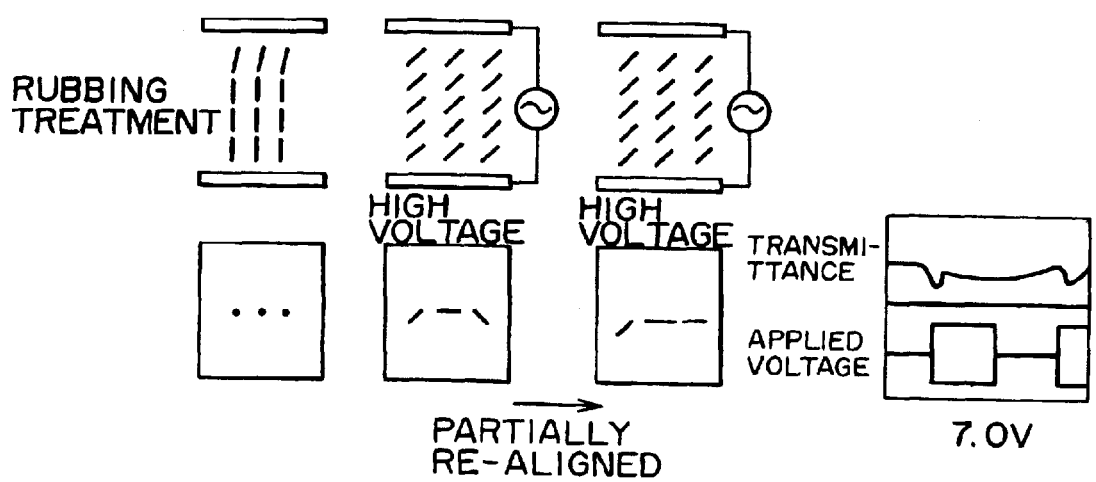
Figure 18D:
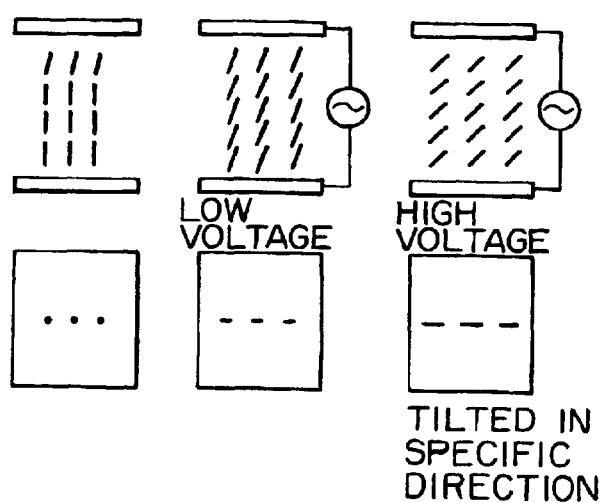

To solve such a problem, as shown in FIG. 18D, a preparation voltage being low enough not to cause a defect in alignment of liquid crystal molecules is applied to the liquid crystal device to tilt the liquid crystal molecules to some extent, and then a final voltage being high enough to achieve a desired transmittance is applied to the liquid crystal device, to control the transmittance in an in-plane uniform state.

Transmittance and Defect in Alignment in One-step Drive Mode (1)

As shown in FIG. 19, in the case of applying a voltage (based on 0 V) with a single step for achieving the transmittance of 15% or less by each of the pulse width modulation (PWM) or pulse height modulation (PHM) mode, there occur defects in alignment of liquid crystal molecules and pigment molecules as described with reference to FIG. 18C. It should be noted that, in the case of applying a voltage with a single step for achieve the transmittance of 15% or more by each of the PWM or PHM mode, there do not occur defects in alignment of liquid crystal molecules and pigment molecules.

Figure 20:
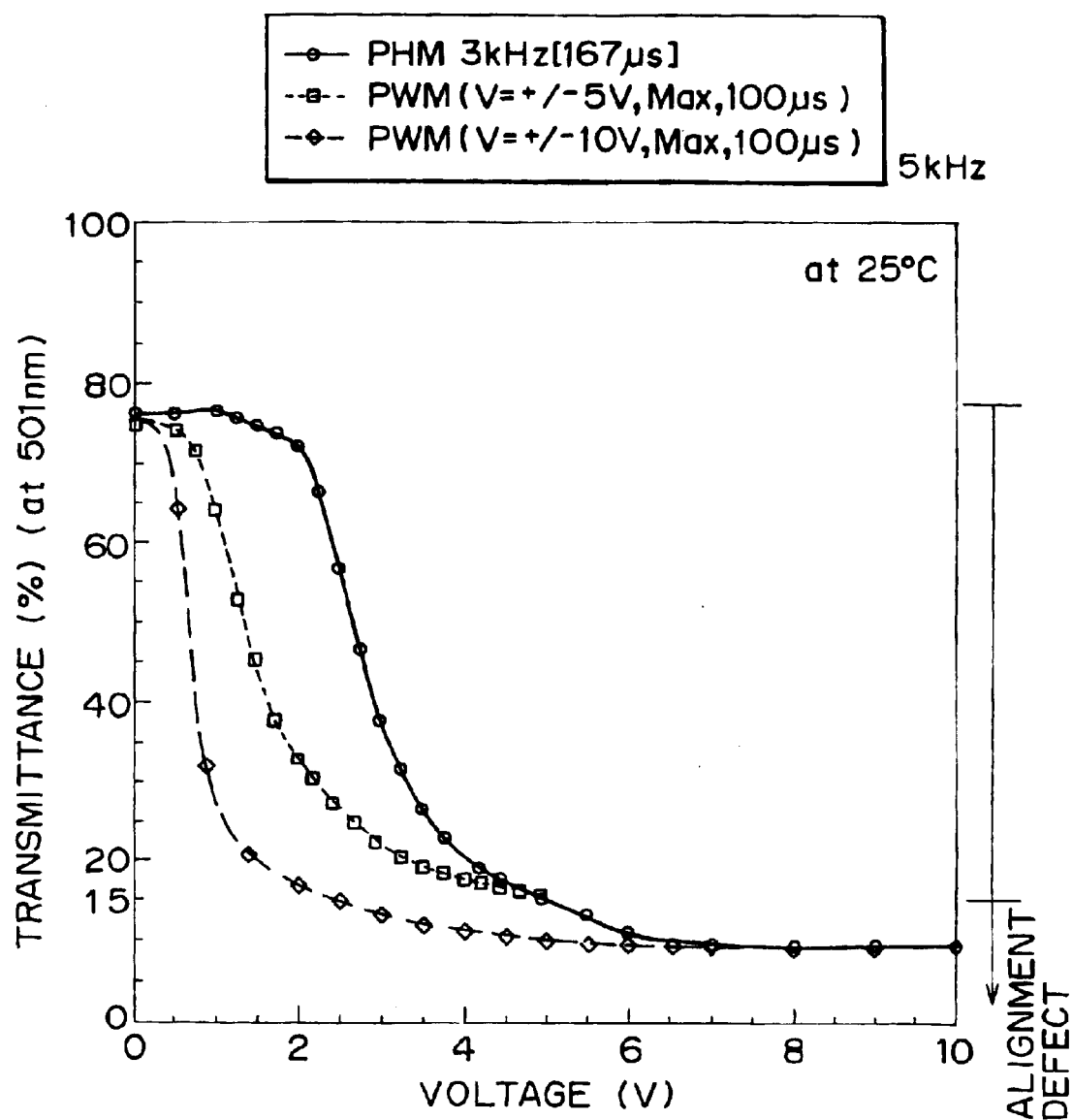
FIG. 20 is a graph showing comparative data on a change in transmittance of the light modulation apparatus shown in FIGS. 3A to 3C depending on a voltage applied thereto.

FIG. 20 shows a change in transmittance of a light modulation apparatus and a frequency of defects of alignment depending on a pulse voltage applied to a liquid crystal device of the apparatus in each of the PWM mode and PHM mode. As is apparent from this graph, the change in transmittance and the frequency of defects of alignment are dependent on the pulse voltage, and in particular, as the pulse voltage is increased up to 5 V or more (that is, the transmittance becomes 15% or less), the defect in alignment of liquid crystal molecules is liable to occur.

Change in Transmittance in Two-step Drive Mode (1)

A method of driving a liquid crystal device by modulating the pulse height of each AC pulse with two-steps according to the present invention will be described.

Figure 21A:
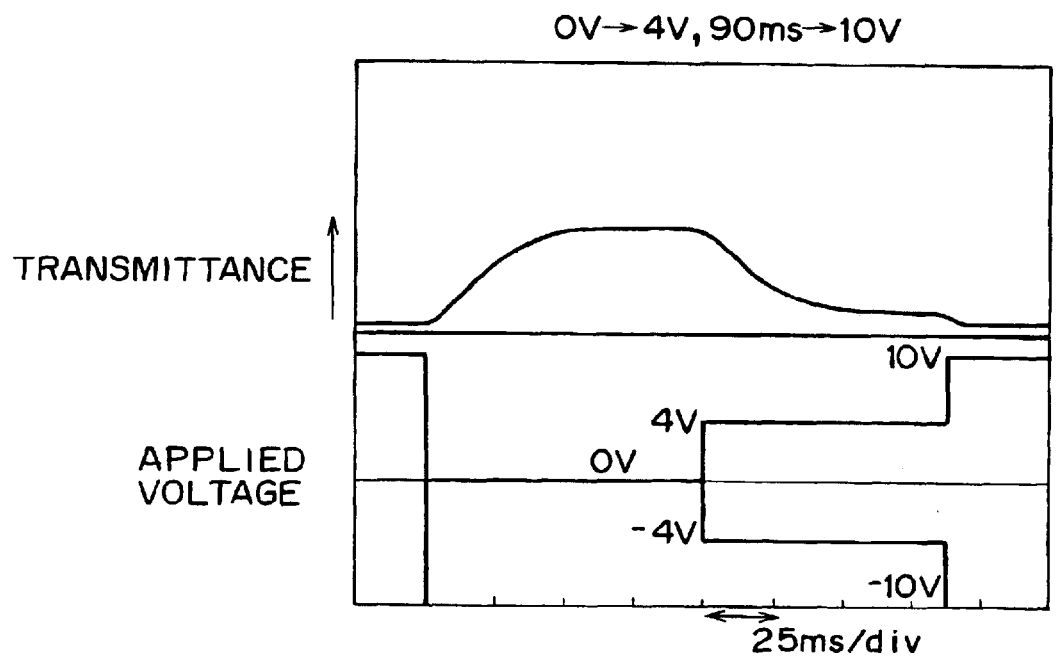
FIGS. 21A and 21B are graphs each showing a relationship between a transmittance of the light modulation apparatus shown in FIGS. 3A to 3C and each drive pulse whose pulse height is modulated in two-steps, wherein a waveform of the drive pulse is shown on the lower side of the figure.

In an example shown in FIG. 21A, a two-step drive mode in which a preparation voltage of 4 V was first applied for 90 ms and then a final voltage of 10 V was applied is performed in place of a single step drive mode of 0 V→10 V. With this two-step drive mode, the unstable change in transmittance as shown in FIG. 20 does not appear and instead a stable change in transmittance appears. In an example shown in FIG. 21B, a two-step drive mode, in which a preparation voltage of 4 V was first applied for 15 ms and then a final voltage of 10 V was applied, is performed. Even in this example, the change in transmittance is stabilized. As described in the above examples, the pulse time width at each step can be freely selected. In addition, the two-step drive mode shown in FIG. 21B may be suitable for quick response.

Figure 21B:
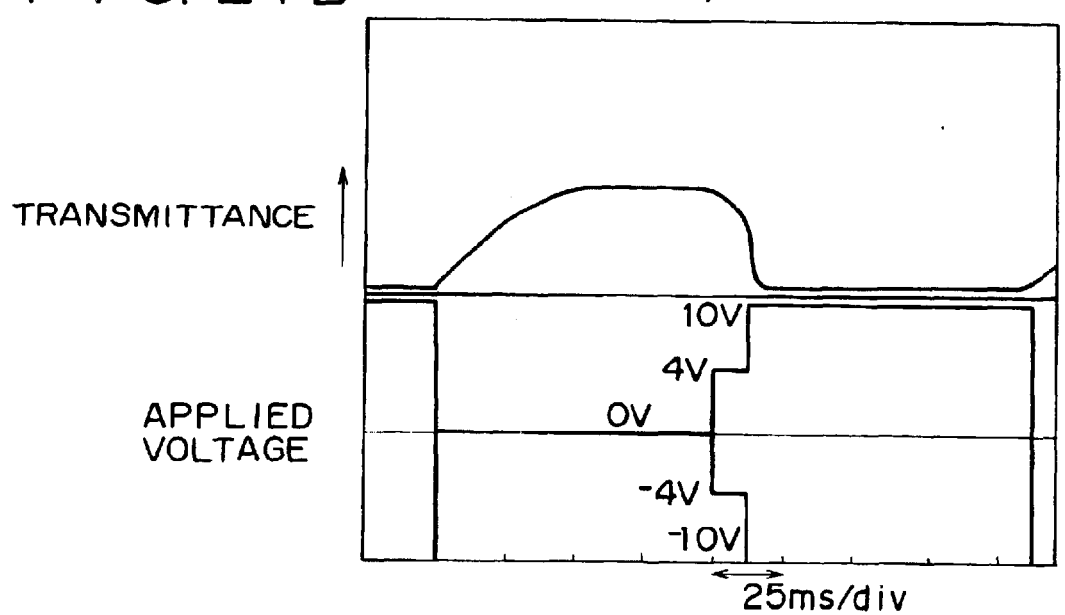
Figure 22:
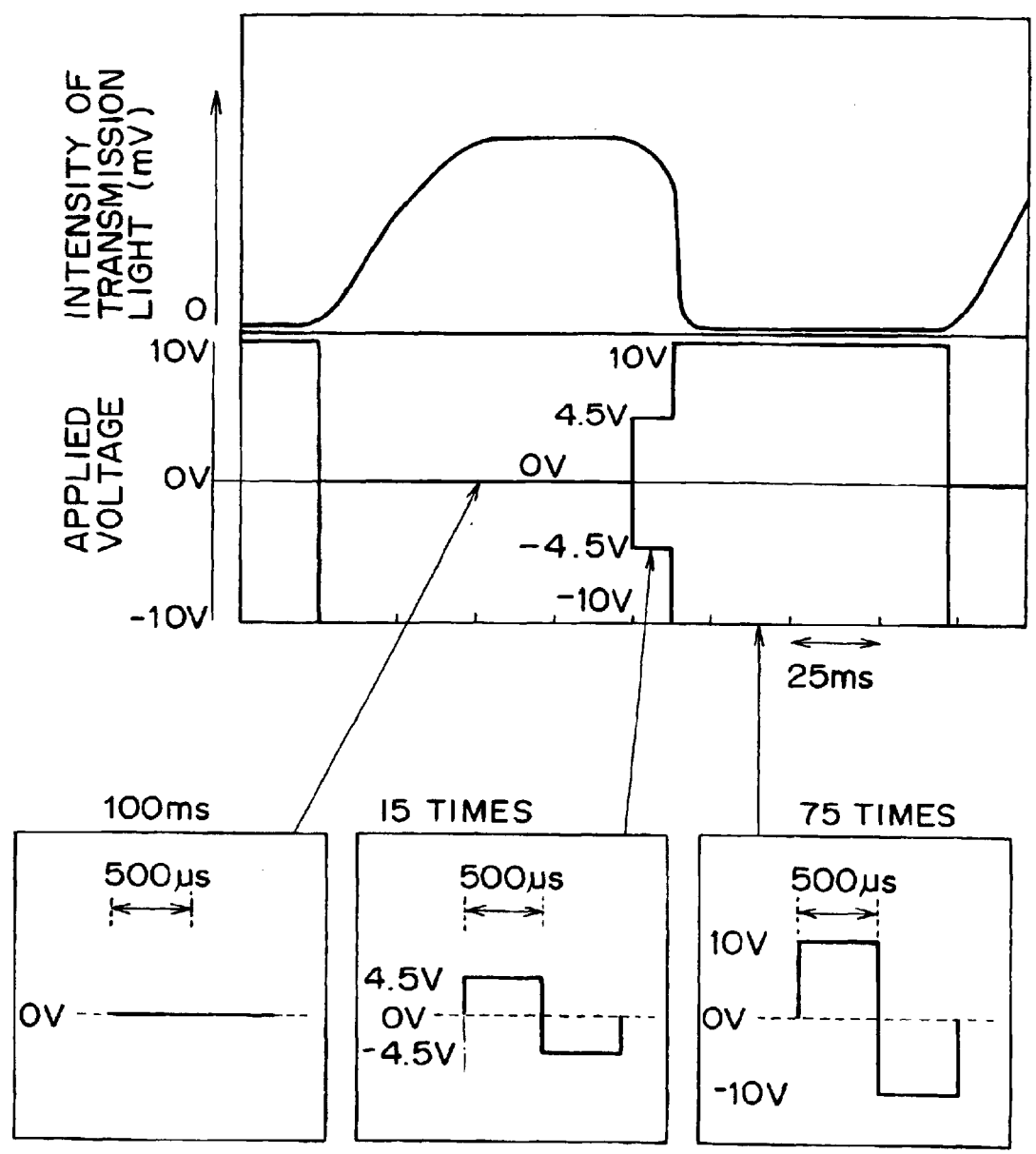
FIG. 22 is a graph showing a relationship between a transmittance of the light modulation apparatus shown in FIGS. 3A to 3C and each drive pulse whose pulse height is modulated in two-steps, wherein a waveform of the drive pulse is shown on the lower side of the figure.
Figures 23A, 23B, 23C, 23D, 23E:
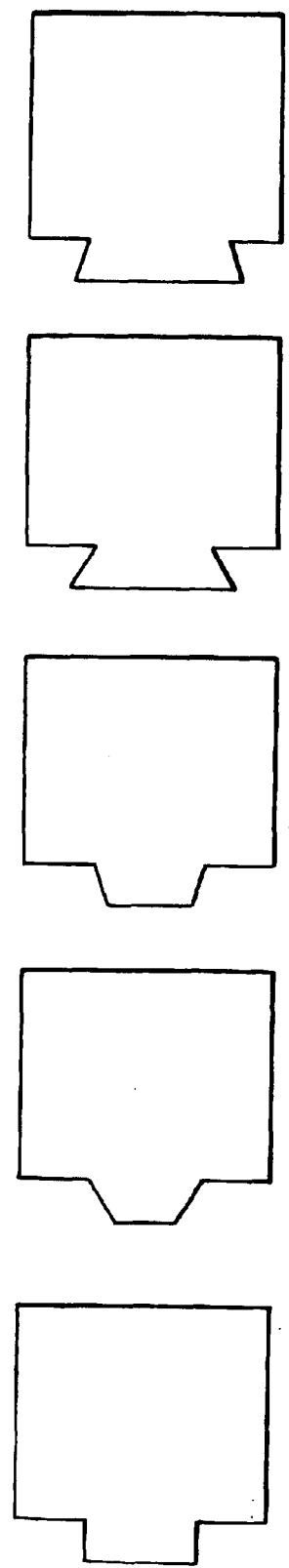
FIG. 23 is a diagram showing a waveform of each of various kinds of drive pulses applied to the light modulation apparatus shown in FIGS. 3A to 3C.

FIG. 22 shows a drive waveform similar to that shown in FIG. 21B in detail. In the two-step drive mode shown in this graph, at the first step, positive and negative pulses (pulse height: 4.5 V, pulse width: 500 $\mu$s) are alternately repeated by 15 times, and at the second step, positive and negative pulses (pulse height: 10 V, pulse width: 500 $\mu$s) are alternately repeated by 75 times. As a result, it becomes apparent that if the positive and negative pulses (pulse height: 4.5 V, pulse width: 500 $\mu$s) are previously applied to the liquid crystal device for 15 ms or more, there does not occur a defect in alignment even if a drive pulse (pulse height: 5 V or more) is then applied to the liquid crystal device.

In this way, as the drive of the light modulation apparatus by applying two-step pulses in accordance with the present invention, it is possible to obtain the change in transmittance having a desired profile, to improve the control accuracy of the transmittance, and to enhance the in-plane uniformity of the transmittance of the apparatus.

In this two-step drive mode, the pulse width and pulse height of a preparation pulse can be freely specified, and each of patterns shown in FIGS. 23A to 23E can be selected as the combination of preparation and final pulses. The drive pulse may be modulated in multi-steps more than two-steps in accordance with the need of the light modulation apparatus, and further a method of modulating only the pulse width with the pulse height kept constant, for example, pulse width modulation mode, can be applied as will be described later.

Transmittance and Defect in Alignment in One-step Drive Mode (2)

Figure 24A:
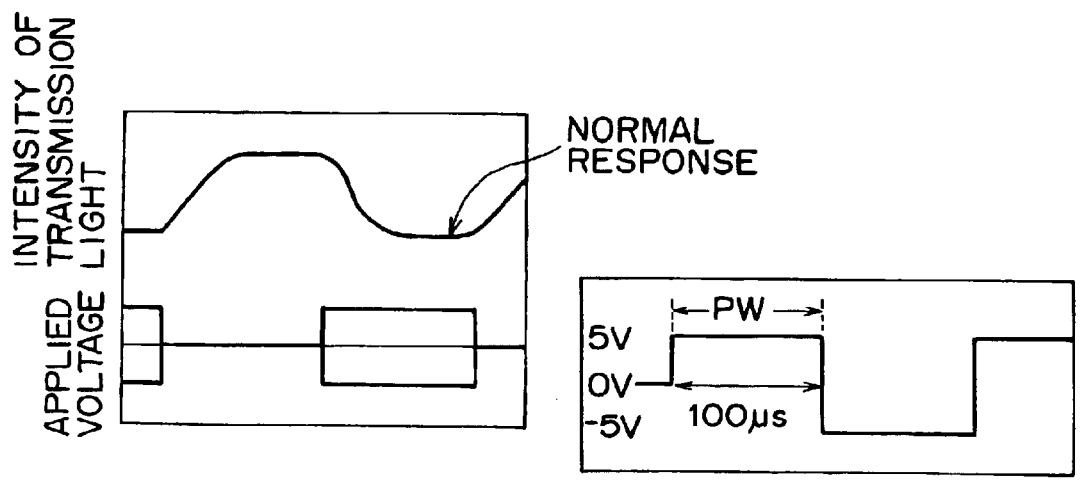
FIG. 24 is a graph showing comparative data on a change in a transmittance of the light modulation apparatus shown in FIGS. 3A to 3C and each drive pulse whose pulse height is modulated in a single step.
Figure 24B:
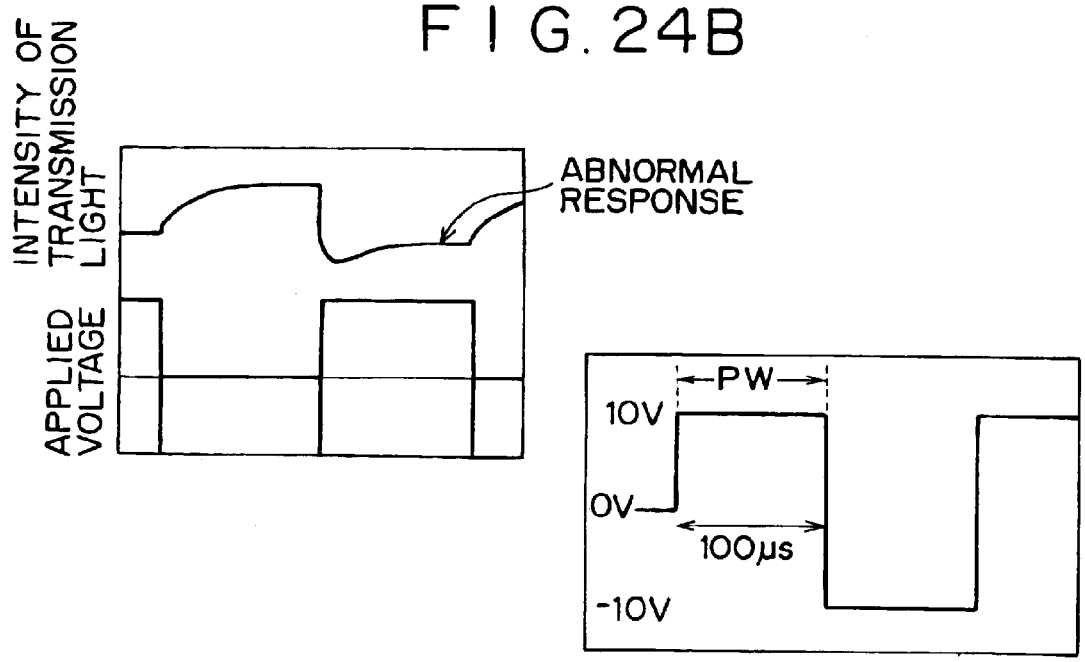

In the case of achieving the transmittance of 15% or less by applying a drive pulse modulated in pulse width with a pulse height is kept constant, as described with reference to FIG. 18C, the change in transmittance is changed depending on the pulse height of the drive pulse. As shown in FIG. 24A, if the pulse height is set at 5 V, there does not occur an unstable change in transmittance due to a defect in alignment, and as shown in FIG. 24B, if the pulse height is set at 10 V, an unstable change (abnormal response) in transmittance due to a defect in alignment is liable to occur.

Change in Transmittance in Two-step Drive Mode (2)

Figure 25:
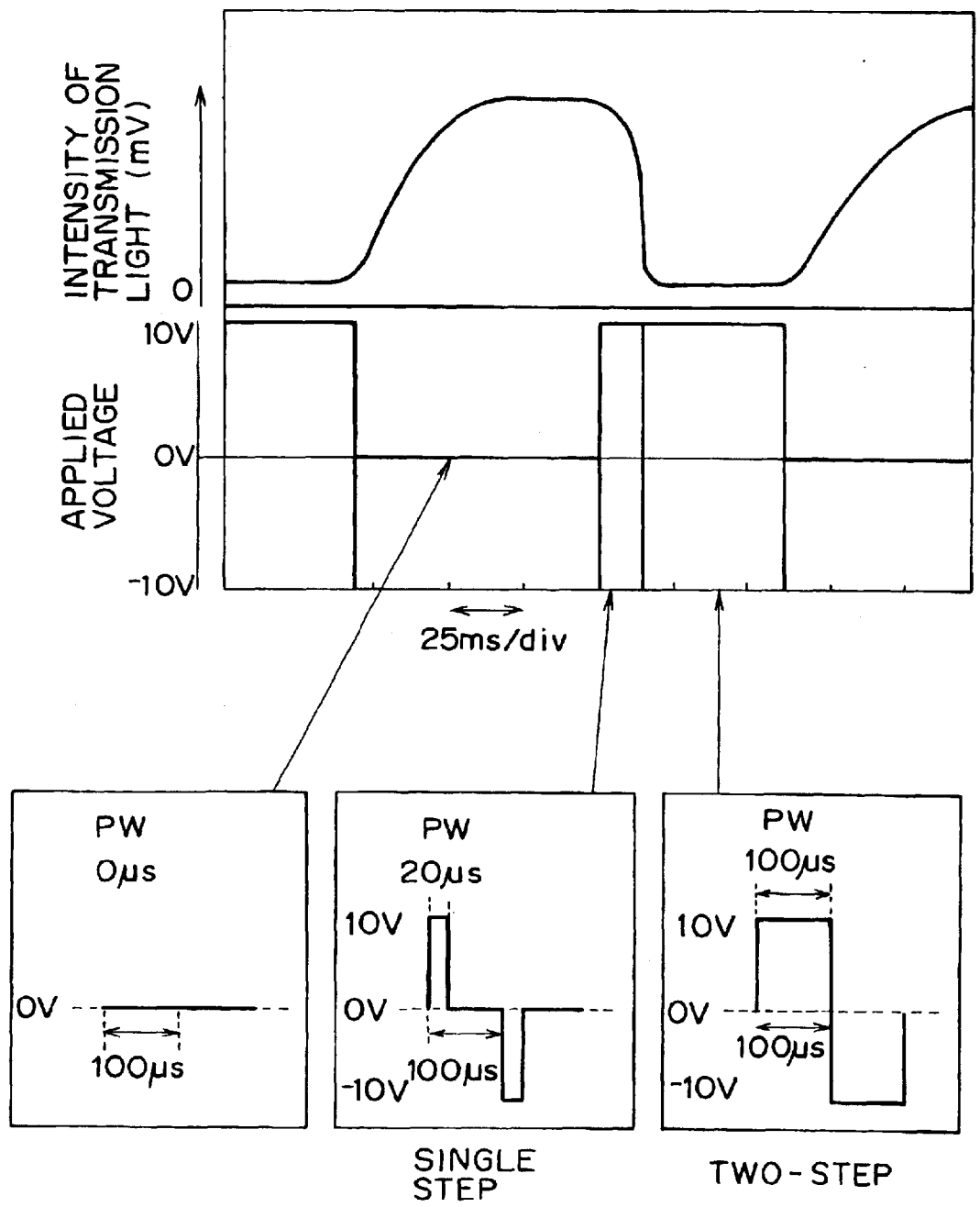
FIG. 25 is a graph showing a relationship between a transmittance of the light modulation apparatus shown in FIGS. 3A to 3C and each drive pulse whose pulse width is modulated in two-steps, wherein a waveform of the drive pulse is shown on the lower side of the figure.

To prevent the occurrence of a defect in alignment of liquid crystal molecules, in particular, in the case where the pulse height of each drive pulse applied to the liquid crystal device is high, according to the present invention, a pulse width of the above drive pulse is modulated with two-steps. For example, in the case of applying a drive pulse whose pulse height of 10 V (based on 0 V), as shown in FIG. 25, positive and negative preparation pulses (pulse height: 10 V, pulse width: 20 $\mu$s) are applied for 15 ms, and then positive and negative pulses (pulse height: 10 V, pulse width: 100 $\mu$s) are applied. In this case, as shown in FIG. 25, the change in transmittance becomes stable. The combination of pulses different in pulse width is not limited to that described above. The pulse width of each drive pulse may be modulated in two or more steps, and the pulse height of the drive pulse may be variously changed.

Fifth Embodiment

In this embodiment, a temperature dependence on a transmittance-applied voltage characteristic of a light modulation apparatus was examined.

Figure 26:
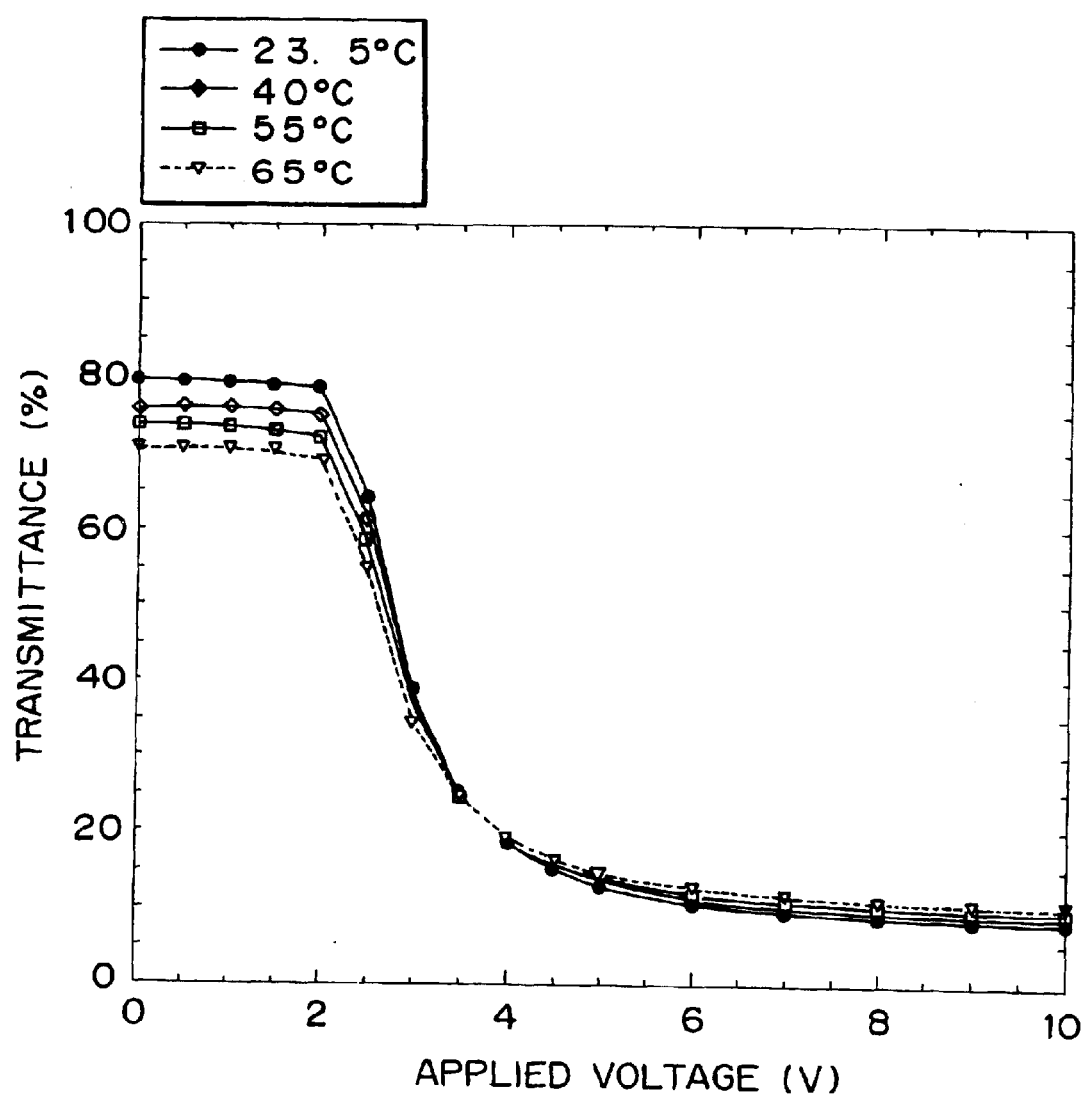
FIG. 26 is a graph showing a relationship between a transmittance at each of different temperatures of a light modulation apparatus shown in FIGS. 3A to 3C and a pulse height of each drive pulse applied thereto.

Temperature Dependence on Transmittance-applied Voltage Characteristic of negative Type Liquid Crystal Device A GH liquid crystal device 12 using a negative type nematic liquid crystal, disposed at each of environmental temperatures (23.5° C., 40° C., 55° C., and 65° C.), was driven by applying a drive voltage having an AC waveform (1 kHz) shown in FIG. 3C thereto, and a transmittance-applied voltage characteristic (V-T characteristic) of the GH liquid crystal device 12 was measured. The results are shown in FIG. 26. At 23.5° C., the transmittance of the device is as bright as about 80% in a range of 0 to 1.5 V, being reduced with an increase in applied voltage in a range of 2 V or more, and is gradually saturated in a range of 5 V or more.

Such a V-T characteristic has a temperature dependence shown in FIG. 26, in which the transmittance is decreased with an increase in environmental temperature in a range of 0 to about 4 V, and is raised with an increase in environmental temperature in a range of more than about 4 V. The change in transmittance caused by temperature change occurs due to thermal fluctuation of molecules of the liquid crystal as the host-material and molecules of the pigment as the guest material of the GH liquid crystal device 12. To be more specific, if the molecules of the liquid crystal and pigment are aligned in the direction perpendicular to a substrate plane, the components, projected on the substrate plane, of the absorption axes of the pigment molecules (in parallel to the major axes of the pigment molecules) are increased due to the fluctuation of the molecules, with a result that the absorption of light by the pigment molecules is increased, that is, the light shielding characteristic is raised. On the contrary, if the molecules of the liquid crystal and pigment are aligned in the direction parallel to the substrate plane, the components, projected on the substrate plane, of the absorption axes of the pigment molecules are decreased due to the fluctuation of the molecules, with a result that the absorption of light by the pigment molecules is decreased, that is, the light shielding characteristic is reduced.

Feedback Control Based on Monitored Light Detection Signal

To avoid a variation in transmittance depending on an environmental temperature, according to this embodiment, there was adopted a method of monitoring the controlled quantity of transmission light (that is, the controlled transmittance), comparing it with a setting transmittance predetermined on the basis of an environmental temperature, and feeding back correction information to a control unit, thereby correcting the waveform of the voltage applied to the liquid crystal device so as to make constant the transmittance. With this method, the effect of an environmental temperature exerted on the transmittance can be eliminated without directly monitoring the environmental temperature. For example, if an actual transmittance becomes larger than the setting transmittance by the effect of temperature rise, the pulse height of each drive pulse may be increased so that the actual transmittance corresponds to the setting transmittance (see FIG. 26). The means for monitoring light may be configured as a detector such as a photodiode, or an image pickup device, typically, a CCD (charge Coupled Device)

Control Method Based on Temperature Detection Signal

As shown in FIG. 26, the transmittance of the liquid crystal device driven by the same applied voltage differs depending on temperature change. The repeatability of the V-T characteristic of the liquid crystal device, varied depending on an environmental temperature, however, is desirable. For example, as shown in FIG. 27, there can be obtained a substantially linear conversion relationship between a voltage applied to the liquid crystal for obtaining a transmittance at 23.5° C. and a voltage applied to the liquid crystal device at 65° C. for obtaining the same transmittance.

Figure 27:
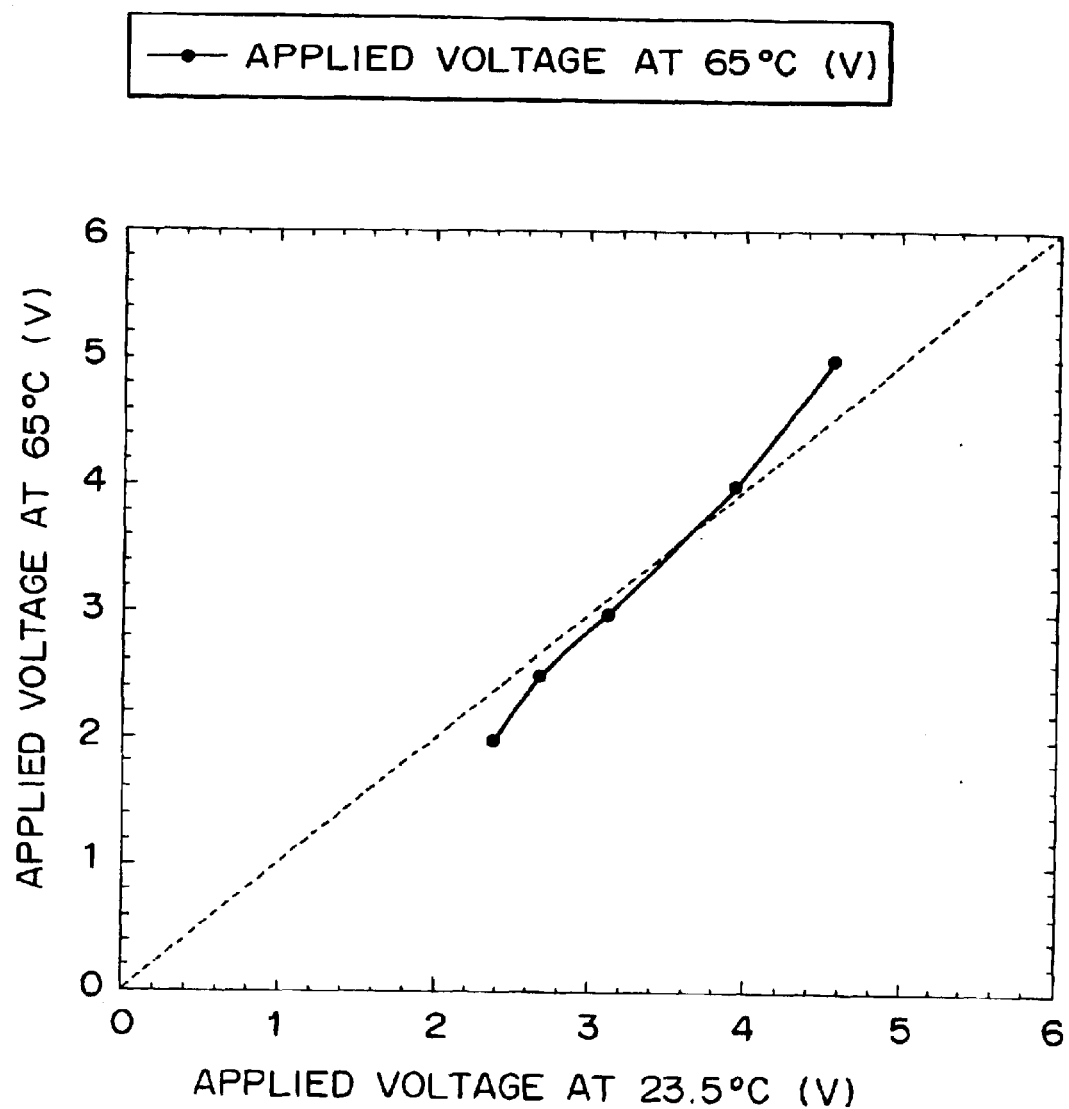
FIG. 27 is a graph showing a relationship between pulse heights of drive pulses at different temperatures applied to the light modulation apparatus shown in FIGS. 3A to 3C.
Figure 28:
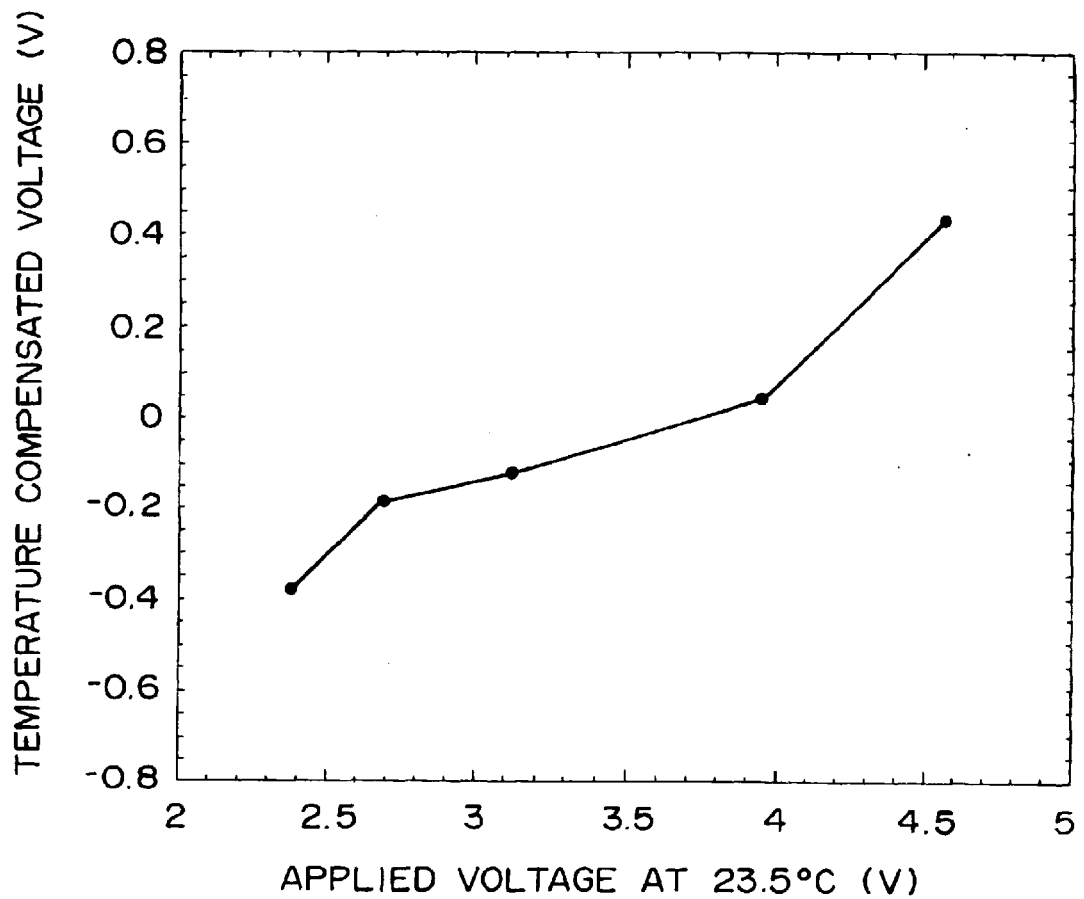
FIG. 28 is a graph showing a compensation difference between voltages at 65° C. and 23.5° C. applied to the light modulation apparatus shown in FIGS. 3A to 3C for obtaining the same transmittance.

Accordingly, a transmittance of the liquid crystal device can be usually kept constant without effect of temperature change by monitoring an environmental temperature of the device, correcting the present voltage into a new voltage corresponding to the monitored environmental temperature on the basis of the conversion relationship shown in FIG. 27, or adding or subtracting a voltage difference (shown in FIG. 28) corresponding to a voltage at the monitored environmental temperature (shown in FIG. 27), which voltage difference is read out from a look-up table, to or from the present voltage. In this way, according to the present invention, the transmittance characteristic of the liquid crystal device less affected by an environmental temperature can be obtained by controlling the present pulse voltage into a voltage corresponding to the monitored environmental temperature.

Temperature Dependence on Transmittance-Applied Voltage Characteristic of Positive Type Liquid Crystal Device The same GH cell as that described above except that a positive type liquid crystal (trade name: MLC-6849, produced by Merck) was used as the host material was prepared, and the temperature dependence on the transmittance-applied voltage characteristic of the GH cell was examined.

Figure 30:
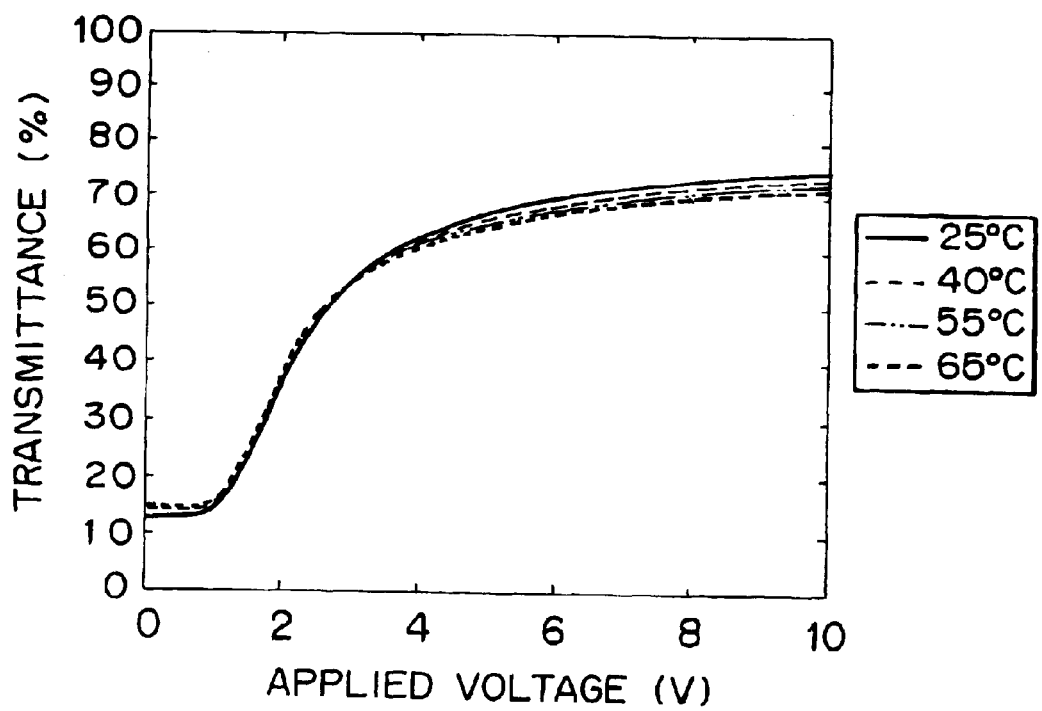
FIG. 30 is a graph showing a relationship between a transmittance at each of different temperatures of the light modulation apparatus shown in FIGS. 3A to 3C and a pulse height of each drive pulse applied thereto.
Figure 31:
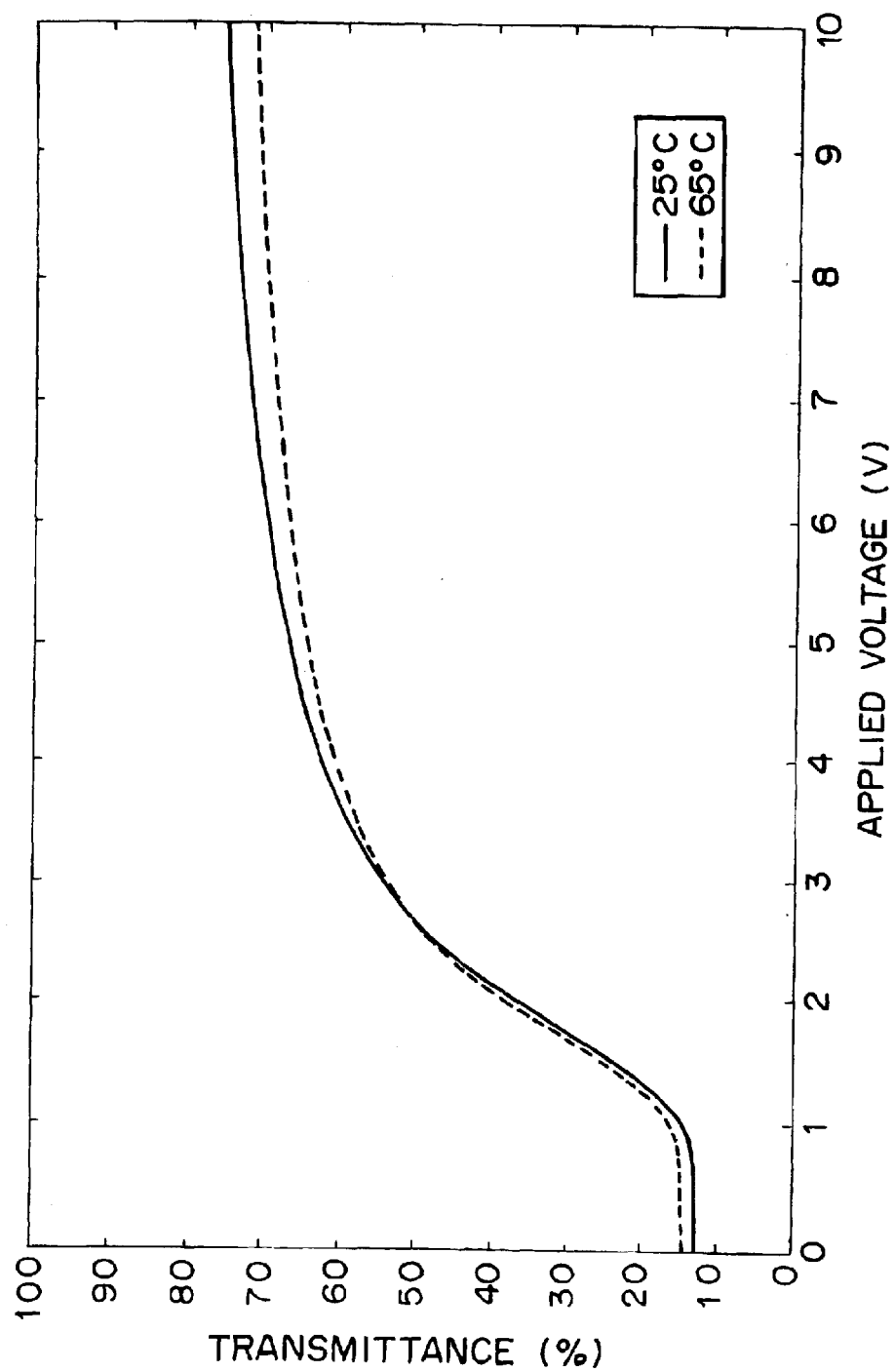
FIG. 31 is a graph showing a relationship between a transmittance at each of two temperatures of the light modulation apparatus shown in FIGS. 3A to 3C and a pulse height of each drive pulse applied thereto.

As the result of the drive of the GH liquid crystal cell using such a positive type nematic liquid crystal by using an applied voltage having an AC waveform (1 kHz) shown in FIG. 3C, it was found, as in the case of FIG. 2, that on the low voltage side, the light absorption by the liquid crystal was increased because of alignment of liquid crystal molecules in the horizontal direction, and as shown in FIGS. 30 and 31, such light absorption was decreased with a temperature rise, and that on the high voltage side, the light absorption by the liquid crystal was decreased, and as shown in FIGS. 30 and 31, such light absorption was increased with a temperature rise. Accordingly, even in this case, the transmittance of the GH cell varied depending on the environmental temperature can be kept constant by the same manner as that described above.

Examples of positive type host materials (Δε>0) usable for the light modulation apparatus according to the present invention may include compounds having the following molecular structures:

[Example 1]

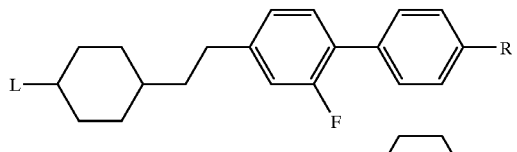

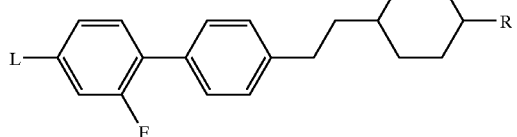

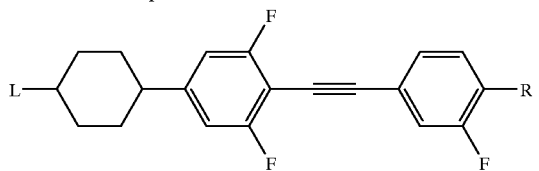

[Example 2]

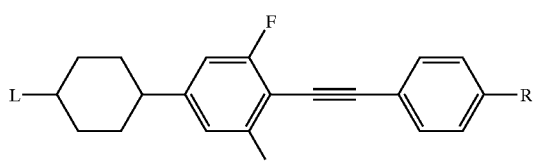

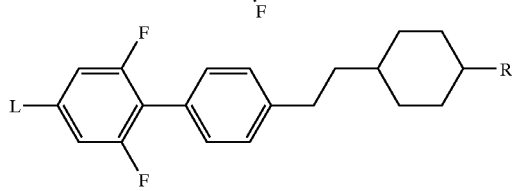

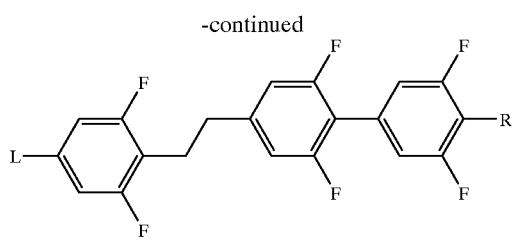

[Example 3]

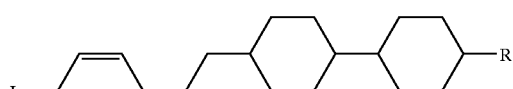

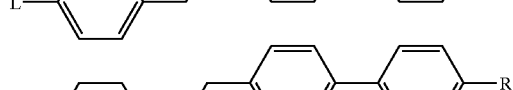

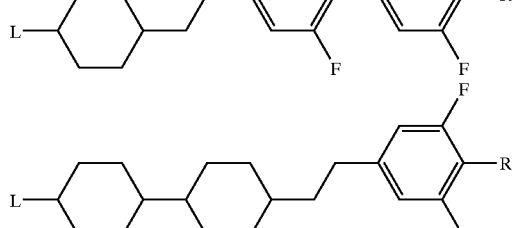

[Example 4]

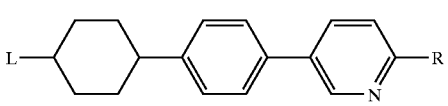

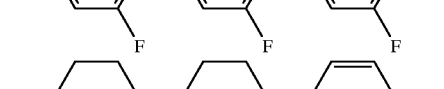

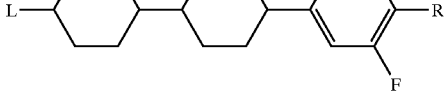

[Example 5]

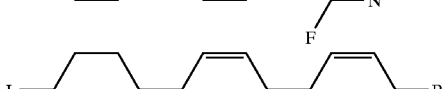

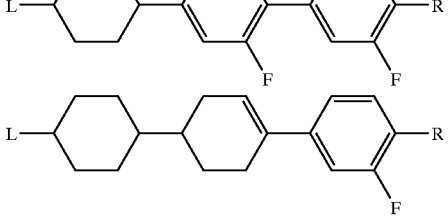

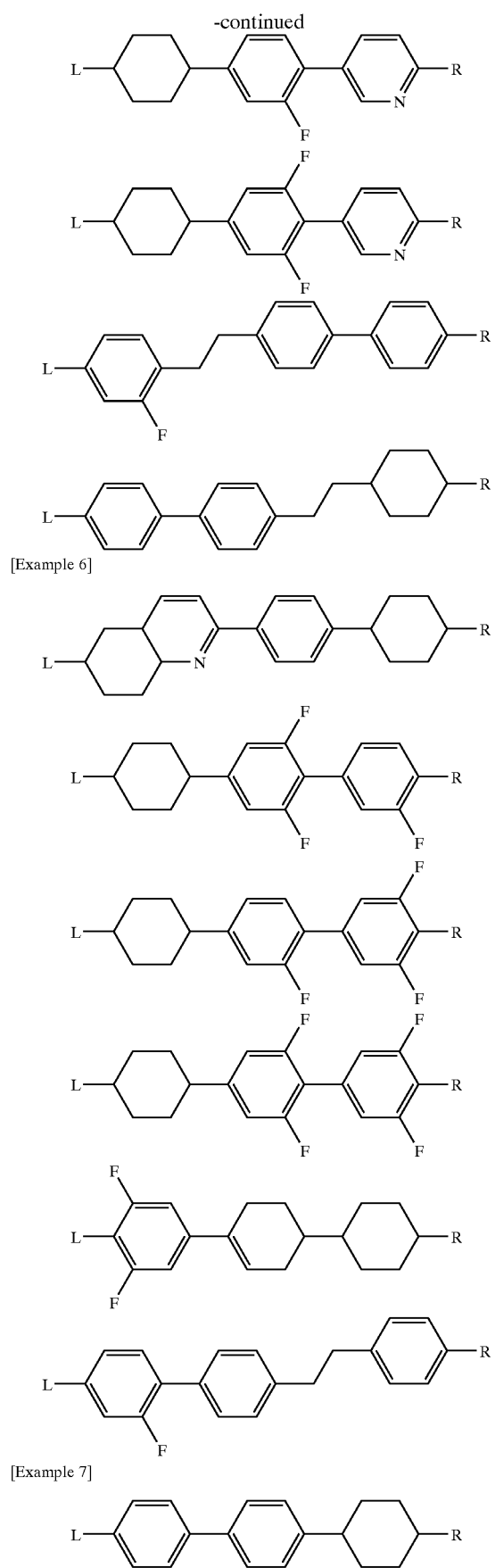
[Example 6]
[Example 7]
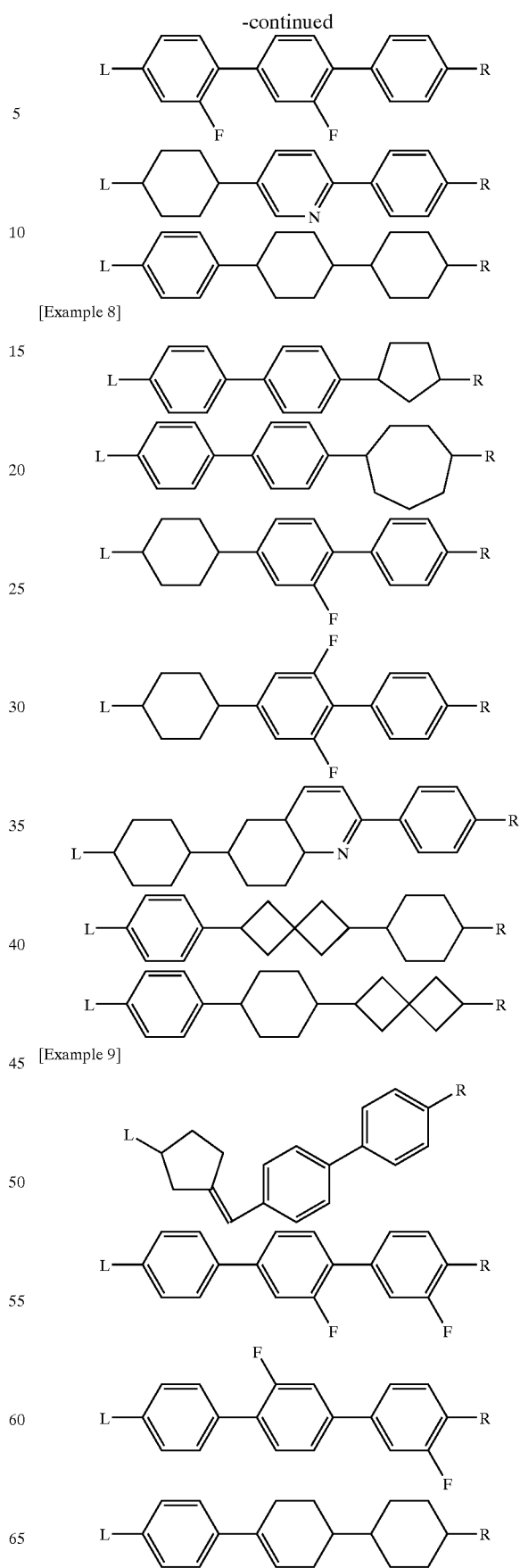
[Example 8]
[Example 9]

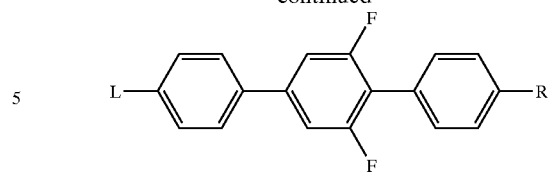
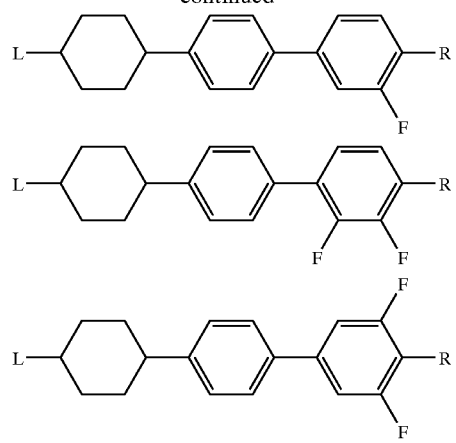
[Example 10]
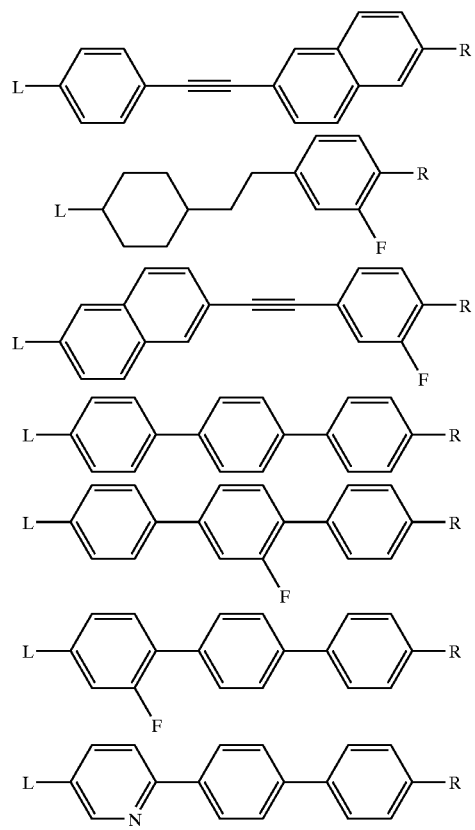
[Example 11]
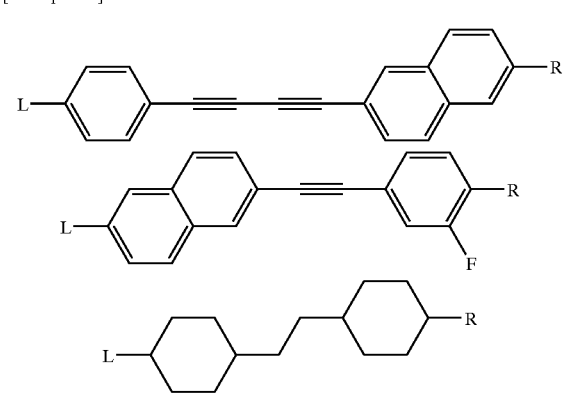
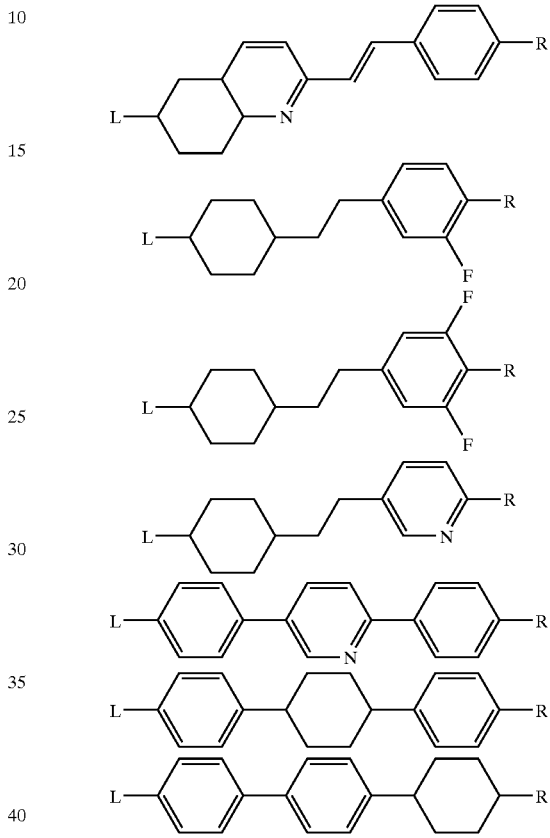
[Example 12]
[Example 13]
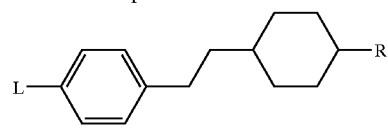

[Example 14]

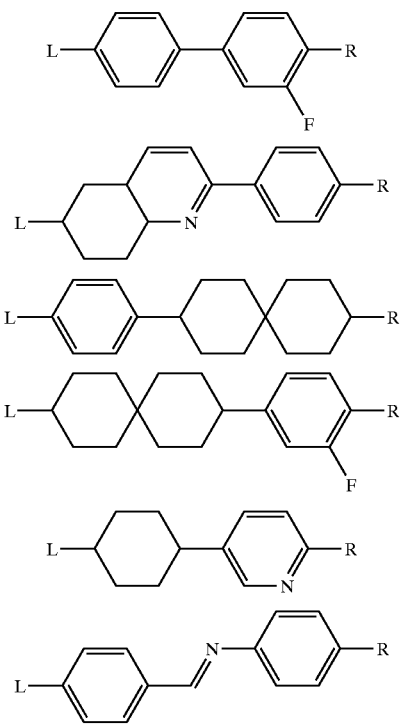

[Example 15]

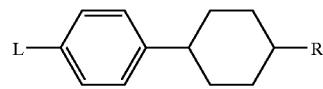

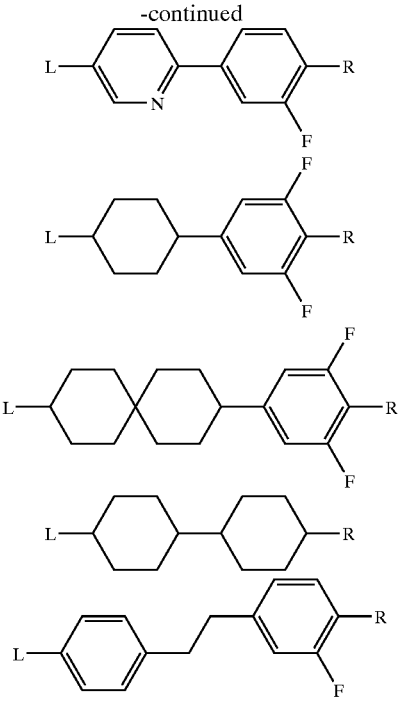

Examples of positive type host materials usable for the light modulation apparatus according to the present invention may include the following commercially available compounds:

[First Examples (trade names) of compounds produced by Merck]

|  | Phase transistion temperature (N →1) (° C.) | Δn Index of birefringence | V10 (V) | V90 (V) | Viscosity at 20° C. (mm²/s) | Viscosity at −30° C. (mm²/s) | Rotational viscosity at 20° C. (mPa·s) |
|---|---|---|---|---|---|---|---|
| ZLI-4792 | 93.0 | 0.0969 | 2.14 | 3.21 | 15 | 420 | 134 |
| ZLI-5080 | 103.0 | 0.0864 | 1.91 | 2.89 | 21 | 870 | 220 |
| ZLI-5091 | 99.5 | 0.1064 | 1.77 | 2.85 | 23 | 1200 | 220 |
| MLC-6043-000 | 110.0 | 0.0894 | 1.76 | 2.78 | 24 | 1300 | 259 |
| MLC-6043-100 | 111.5 | 0.0997 | 1.82 | 2.80 | 25 | 1300 | 264 |
| MLC-6219-000 | 98.0 | 0.0899 | 2.04 | 3.09 | 17 | 580 |  |
| MLC-6219-100 | 97.5 | 0.1115 | 2.11 | 3.16 | 18 | 650 |  |
| MLC-6222 | 98.5 | 0.0925 | 1.60 | 2.47 | 24 | 1220 |  |
| MLC-6225-000 | 82.0 | 0.0966 | 2.10 | 3.17 | 17 | 630 | 119 |
| MLC-6225-100 | 83.0 | 0.1058 | 2.11 | 3.13 | 19 | 810 |  |
| MLC-6241-000 | 100.0 | 0.0875 | 1.82 | 2.95 | 19 | 740 |  |
| MLC-6241-100 | 100.0 | 0.0923 | 1.87 | 3.00 | 19 | 740 |  |
| MLC-6252 | 98.0 | 0.0790 | 1.93 | 2.99 | 21 | 850 | 193 |
| MLC-6256 | 98.5 | 0.1005 | 1.45 | 2.28 | 26 | 1640 |  |
| MLC-6292-000 | 120.0 | 0.0903 | 1.80 | 2.85 | 28 | 1450 |  |
| MLC-6292-100 | 120.0 | 0.1146 | 1.83 | 2.83 | 25 | 1450 |  |
| MLC-6625 | 83.5 | 0.0747 | 1.77 | 2.74 | 15 | 390 | 110 |
| MLC-6628 | 88.0 | 0.0883 | 1.65 | 2.53 | 19 | 680 | 149 |
| MLC-6694-000 | 112.5 | 0.0838 | 1.88 | 2.93 | 21 | 920 | 194 |
| MLC-6694-100 | 110.0 | 0.1060 | 1.88 | 2.86 | 21 | 1070 | 190 |
| MLC-6846-000 | 80.0 | 0.0897 | 1.30 | 2.01 |  |  | 172 |
| MLC-6846-100 | 80.0 | 0.1083 | 1.27 | 1.95 |  |  | 195 |
| MLC-6847-000 | 90.5 | 0.0923 | 1.40 | 2.14 |  |  | 197 |
| MLC-6847-100 | 90.5 | 0.1084 | 1.38 | 2.11 |  |  | 204 |
| MLC-6848-000 | 70.5 | 0.0903 | 1.04 | 1.64 |  |  | 178 |
| MLC-6848-100 | 70.5 | 0.1077 | 1.03 | 1.62 |  |  | 205 |
| MLC-6849-000 | 91.0 | 0.0921 | 1.28 | 1.98 |  |  | 186 |
| MLC-6849-100 | 90.0 | 0.1138 | 1.26 | 1.93 |  |  | 206 |

-continued

| | Phase transistion temperature (N →1) (° C.) | Δn Index of birefringence | V10 (V) | V90 (V) | Viscosity at 20° C. (mm²/s) | Viscosity at −30° C. (mm²/s) | Rotational viscosity at 20° C. (mPa·s) |
|---|---|---|---|---|---|---|---|
| MLC-7700-000 | 98.0 | 0.0870 | 1.66 | 2.63 | 23 | 1000 | |
| MLC-7700-100 | 100.0 | 0.1146 | 1.65 | 2.57 | 24 | 1300 | 205 |
| MLC-7800-000 | 100.0 | 0.0854 | 2.11 | 3.21 | 19 | 700 | |
| MLC-7800-100 | 100.0 | 0.1149 | 2.13 | 3.24 | 19 | 870 | |
| MLC-9000-000 | 88.0 | 0.0874 | 1.42 | 2.24 | 27 | 1500 | 244 |
| MLC-9000-100 | 90.5 | 0.1137 | 1.41 | 2.22 | 30 | 2400 | 238 |
| MLC-9100-000 | 91.0 | 0.0852 | 1.67 | 2.60 | 23 | 1030 | 193 |
| MLC-9100-100 | 89.0 | 0.1134 | 1.68 | 2.59 | 22 | 1100 | 166 |
| MLC-9200-000 | 89.0 | 0.0848 | 2.13 | 3.22 | 18 | 590 | |
| MLC-9200-100 | 90.0 | 0.1146 | 2.18 | 3.24 | 19 | 880 | |
| MLC-9300-000 | 110.0 | 0.0904 | 1.68 | 2.68 | 28 | 1500 | 284 |
| MLC-9300-100 | 109.0 | 0.1154 | 1.71 | 2.64 | 25 | 1550 | 237 |
| MLC-9400-000 | 108.0 | 0.0892 | 2.25 | 3.44 | 20 | 780 | 188 |
| MLC-9400-100 | 110.0 | 0.1150 | 2.27 | 3.45 | 20 | 970 | 180 |
| MLC-12000-000 | 90.0 | 0.0876 | 1.42 | 2.22 | 22 | 1100 | 186 |
| MLC-12000-100 | 92.0 | 0.0860 | 1.68 | 2.65 | 18 | 700 | 148 |
| MLC-12100-000 | 92.0 | 0.1128 | 1.47 | 2.22 | 24 | 1350 | 183 |
| MLC-12100-100 | 92.0 | 0.1105 | 1.74 | 2.59 | 19 | 820 | 149 |
| MLC-13200-000 | 90.0 | 0.0871 | 1.48 | 2.30 | 23 | 1140 | 186 |
| MLC-13200-100 | 94.5 | 0.0860 | 1.77 | 2.76 | 19 | 890 | 145 |
| MLC-13300-000 | 91.5 | 0.1093 | 1.47 | 2.29 | 24 | 1600 | 201 |
| MLC-13300-100 | 91.0 | 0.1078 | 1.77 | 2.68 | 20 | 870 | 155 |
| MLC-13800-000 | 110.0 | 0.0902 | 1.69 | 2.61 | | | 228 |
| MLC-13800-100 | 111.0 | 0.0903 | 2.15 | 3.32 | | | 151 |
| MLC-13900-000 | 110.5 | 0.1070 | 1.63 | 2.50 | | | 235 |
| MLC-13900-100 | 110.5 | 0.1081 | 2.15 | 3.27 | | | 167 |

[Second Examples (trade names) of Compounds Produced by Chisso]

EXAMPLE 1

LIXON 5035XX
S-N transition   <−30.0° C.
Cleaning temperature   82.2° C.

| Viscosity | η | at 20° C. | 24.3 | mPa·s |
|---|---|---|---|---|
| | | at 0° C. | 70.8 | mPa·s |
| | | at −20° C. | 287.9 | mPa·s |
| Resistivity | ρ | at 25° C. | >1 × 10$^{18}$ | Ω-cm |
| Optical anisotropy | Δn | at 25° C., 589 nm | 0.0749 | |
| | $n_e$ | | 1.5582 | |
| | $n_o$ | | 1.4833 | |
| Dielectric anisotropy | Δε | at 25° C., 1 kHz | 4.4 | |
| | ε// | | 8.1 | |
| | ε⊥ | | 3.7 | |

EXAMPLE 2

LIXON 5036XX
S-N transition   <−30.0° C.
Cleaning temperature   91.8° C.

| Viscosity | η | at 20° C. | 26.0 | mPa·s |
|---|---|---|---|---|
| | | at 0° C. | 79.3 | mPa·s |
| | | at −20° C. | 324.1 | mPa·s |
| Resistivity | ρ | at 25° C. | >1 × 10$^{18}$ | Ω-cm |
| Optical anisotropy | Δn | at 25° C., 589 nm | 0.0754 | |
| | $n_e$ | | 1.5586 | |
| | $n_o$ | | 1.4832 | |
| Dielectric anisotropy | Δε | at 25° C., 1 kHz | 4.5 | |
| | ε// | | 8.1 | |
| | ε⊥ | | 3.6 | |

EXAMPLE 3

LIXON 5037XX
S-N transition   <−20.0° C.
Cleaning temperature   101.4° C.

| Viscosity | η | at 20° C. | 28.9 | mPa·s |
|---|---|---|---|---|
| | | at 0° C. | 93.5 | mPa·s |
| | | at −20° C. | 370.6 | mPa·s |
| Resistivity | ρ | at 25° C. | >1 × 10$^{18}$ | Ω-cm |
| Optical anisotropy | Δn | at 25° C., 589 nm | 0.0752 | |
| | $n_e$ | | 1.5584 | |
| | $n_o$ | | 1.4832 | |
| Dielectric anisotropy | Δε | at 25° C., 1 kHz | 4.5 | |
| | ε// | | 8.1 | |
| | ε⊥ | | 3.6 | |

EXAMPLE 4

LIXON 5038XX
S-N transition   <−30.0° C.
Cleaning temperature   81.6° C.

| Viscosity | η | at 20° C. | 25.0 | mPa·s |
|---|---|---|---|---|
| | | at 0° C. | 71.1 | mPa·s |
| | | at −20° C. | 291.0 | mPa·s |
| Resistivity | ρ | at 25° C. | >1 × 10$^{18}$ | Ω-cm |
| Optical anisotropy | Δn | at 25° C., 589 nm | 0.0813 | |
| | $n_e$ | | 1.5671 | |
| | $n_o$ | | 1.4858 | |
| Dielectric anisotropy | Δε | at 25° C., 1 kHz | 4.6 | |
| | ε// | | 8.3 | |
| | ε⊥ | | 3.7 | |

EXAMPLE 5

LIXON 5039XX
S-N transition <-30.0° C.
Cleaning temperature 91.1° C.

| | | | | |
|---|---|---|---|---|
| Viscosity | η | at 20° C. | 25.2 | mPa·s |
| | | at 0° C. | 77.6 | mPa·s |
| | | at -20° C. | 317.2 | mPa·s |
| Resistivity | ρ | at 25° C. | >1 × 10$^{18}$ | Ω-cm |
| Optimal anisotropy | Δn | at 25° C., | 589 nm | 0.0806 |
| | $n_e$ | | | 1.5858 |
| | $n_o$ | | | 1.4852 |
| Dielectric | Δε | at 25° C., | 1 kHz | 4.7 |
| anisotropy | ε// | | | 8.4 |
| | ε⊥ | | | 3.7 |

EXAMPLE 6

LIXON 5040XX
S-N transition <-30.0° C.
Cleaning temperature 101.8° C.

| | | | | |
|---|---|---|---|---|
| Viscosity | η | at 20° C. | 28.4 | mPa·s |
| | | at 0° C. | 93.5 | mPa·s |
| | | at -20° C. | 363.0 | mPa·s |
| Resistivity | ρ | at 25 C. | >1 × 10$^{18}$ | Ω-cm |
| Optical anisotropy | Δn | at 25° C., | 589 nm | 0.0794 |
| | $n_e$ | | | 1.5649 |
| | $n_o$ | | | 1.4855 |
| Dielectric | Δε | at 25° C., | 1 kHz | 4.7 |
| anisotropy | ε// | | | 8.3 |
| | ε⊥ | | | 3.6 |

EXAMPLE 7

LIXON 5041XX
S-N transition <-30.0° C.
Cleaning temperature 81.7° C.

| | | | | |
|---|---|---|---|---|
| Viscosity | η | at 20° C. | 25.4 | mPa·s |
| | | at 0° C. | 74.8 | mPa·s |
| | | at -20° C. | 302.0 | mPa·s |
| Resistivity | ρ | at 25° C. | >1 × 10$^{18}$ | Ω-cm |
| Optical anisotropy | Δn | at 25° C., | 589 nm | 0.0847 |
| | $n_e$ | | | 1.5715 |
| | $n_o$ | | | 1.4868 |
| Dielectric | Δε | at 25° C., | 1 kHz | 4.7 |
| anisotropy | ε// | | | 8.4 |
| | ε⊥ | | | 3.7 |

EXAMPLE 8

LIXON 5043XX
S-N transition <-30.0° C.
Cleaning temperature 101.9° C.

| | | | | |
|---|---|---|---|---|
| Viscosity | η | at 20° C. | 28.7 | mPa·s |
| | | at 0° C. | 92.5 | mPa·s |
| | | at -20° C. | 354.6 | mPa·s |
| Resistivity | ρ | at 25° C. | >1 × 10$^{18}$ | Ω-cm |
| Optical anisotropy | Δn | at 25° C., | 589 nm | 0.0850 |
| | $n_e$ | | | 1.5713 |
| | $n_o$ | | | 1.4863 |
| Dielectric | Δε | at 25° C., | 1 kHz | 4.9 |
| anisotropy | ε// | | | 8.5 |
| | ε⊥ | | | 3.6 |

EXAMPLE 9

LIXON 5044XX
S-N transition <-30.0° C.
Cleaning temperature 81.0° C.

| | | | | |
|---|---|---|---|---|
| Viscosity | η | at 20° C. | 24.4 | mPa·s |
| | | at 0° C. | 71.3 | mPa·s |
| | | at -20° C. | 293.1 | mPa·s |
| Resistivity | ρ | at 25° C. | >1 × 10$^{18}$ | Ω-cm |
| Optical anisotropy | Δn | at 25° C., | 589 nm | 0.0895 |
| | $n_e$ | | | 1.5784 |
| | $n_o$ | | | 1.4889 |
| Dielectric | Δε | at 25° C., | 1 kHz | 4.9 |
| anisotropy | ε// | | | 8.7 |
| | ε⊥ | | | 3.8 |

EXAMPLE 10

LIXON 5046XX
S-N transition <-30.0° C.
Cleaning temperature 100.3° C.

| | | | | |
|---|---|---|---|---|
| Viscosity | η | at 20° C. | 30.2 | mPa·s |
| | | at 0° C. | 92.8 | mPa·s |
| | | at -20° C. | 372.9 | mPa·s |
| Resistivity | ρ | at 25° C. | >1 × 10$^{18}$ | Ω-cm |
| Optical anisotropy | Δn | at 25° C., | 589 nm | 0.0895 |
| | $n_e$ | | | 1.5776 |
| | $n_o$ | | | 1.4881 |
| Dielectric | Δε | at 25° C., | 1 kHz | 4.9 |
| anisotropy | ε// | | | 8.6 |
| | ε⊥ | | | 3.7 |

EXAMPLE 11

LIXON 5047XX
S-N transition <-30.0° C.
Cleaning temperature 80.3° C.

| | | | | |
|---|---|---|---|---|
| Viscosity | η | at 20° C. | 25.0 | mPa·s |
| | | at 0° C. | 74.0 | mPa·s |
| | | at -20° C. | 306.8 | mPa·s |
| Resistivity | ρ | at 25° C. | >1 × 10$^{18}$ | Ω-cm |
| Optical anisotropy | Δn | at 25° C., | 589 nm | 0.0997 |
| | $n_e$ | | | 1.5922 |
| | $n_o$ | | | 1.4925 |
| Dielectric | Δε | at 25° C., | 1 kHz | 5.1 |
| anisotropy | ε// | | | 8.9 |
| | ε⊥ | | | 3.8 |

EXAMPLE 12

LIXON 5049XX
S-N transition <-30.0° C.
Cleaning temperature 101.0° C.

| | | | | |
|---|---|---|---|---|
| Viscsity | η | at 20° C. | 30.4 | mPa·s |
| | | at 0° C. | 92.8 | mPa·s |
| | | at -20° C. | 429.3 | mPa·s |
| Resistivity | ρ | at 25° C. | >1 × 10$^{18}$ | Ω-cm |
| Optical anisotropy | Δn | at 25° C., | 589 nm | 0.1015 |
| | $n_e$ | | | 1.5935 |
| | $n_o$ | | | 1.4920 |
| Dielectric | Δε | at 25° C., | 1 kHz | 5.1 |
| anisotropy | ε// | | | 8.8 |
| | ε⊥ | | | 3.7 |

EXAMPLE 13

LIXON 5050XX
S-N transition <-30.0° C.
Cleaning temperature 100.2° C.

| | | | | |
|---|---|---|---|---|
| Viscosity | $\eta$ | at 20° C. | 23.5 | mPa·s |
| | | at 0° C. | 69.1 | mPa·s |
| | | at -20° C. | 291.3 | mPa·s |
| Resistivity | $\rho$ | at 25° C. | >1 × 10$^{18}$ | $\Omega$-cm |
| Optical anisotropy | $\Delta n$ | at 25° C., | 589 nm | 0.0855 |
| | $n_e$ | | | 1.5732 |
| | $n_o$ | | | 1.4877 |
| Dielectric anisotropy | $\Delta\epsilon$ | at 25° C. | 1 kHz | 3.1 |
| | $\epsilon//$ | | | 6.5 |
| | $\epsilon\perp$ | | | 3.4 |

EXAMPLE 14

LIXON 5051XX
S-N transition <-20.0° C.
Cleaning temperature 101.5° C.

| | | | | |
|---|---|---|---|---|
| Viscosity | $\eta$ | at 20° C. | 23.9 | mPa·s |
| | | at 0° C. | 69.1 | mPa·s |
| | | at -20° C. | 295.1 | mPa·s |
| Resistivity | $\rho$ | at 25° C. | >1 × 10$^{18}$ | $\Omega$-cm |
| optical anisotropy | $\Delta n$ | at 25° C., | 539 nm | 0.0803 |
| | $n_e$ | | | 1.5794 |
| | $n_v$ | | | 1.4891 |
| Dielectric anisotropy | $\Delta\epsilon$ | at 25° C., | 1 kHz | 3.1 |
| | $\epsilon//$ | | | 6.5 |
| | $\epsilon\perp$ | | | 3.4 |

Control Method Based on Temperature Detection Signal

As shown in FIGS. 30 and 31, the transmittance of the positive type liquid crystal device driven by the same applied voltage differs depending on temperature change. The repeatability of the V-T characteristic of the liquid crystal device, varied depending on an environmental temperature, however, is desirable. For example, as shown in FIG. 32, there can be obtained a substantially linear conversion relationship between a voltage applied to the liquid crystal for obtaining a transmittance at 25° C. and a voltage applied to the liquid crystal device at 65° C. for obtaining the same transmittance.

Figure 29:
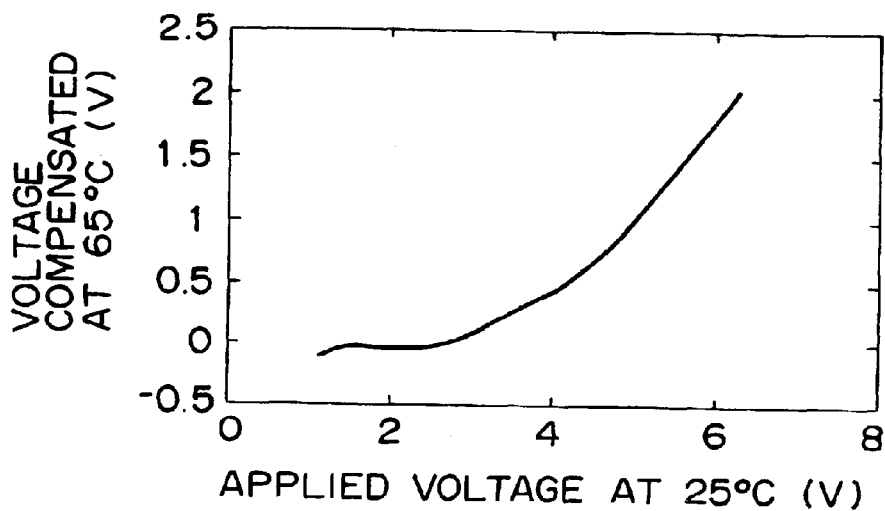
FIG. 29 is a graph showing a compensation difference between voltages at 65° C. and 25° C. applied to the light modulation apparatus shown in FIGS. 3A to 3C for obtaining the same transmittance.
Figure 32:
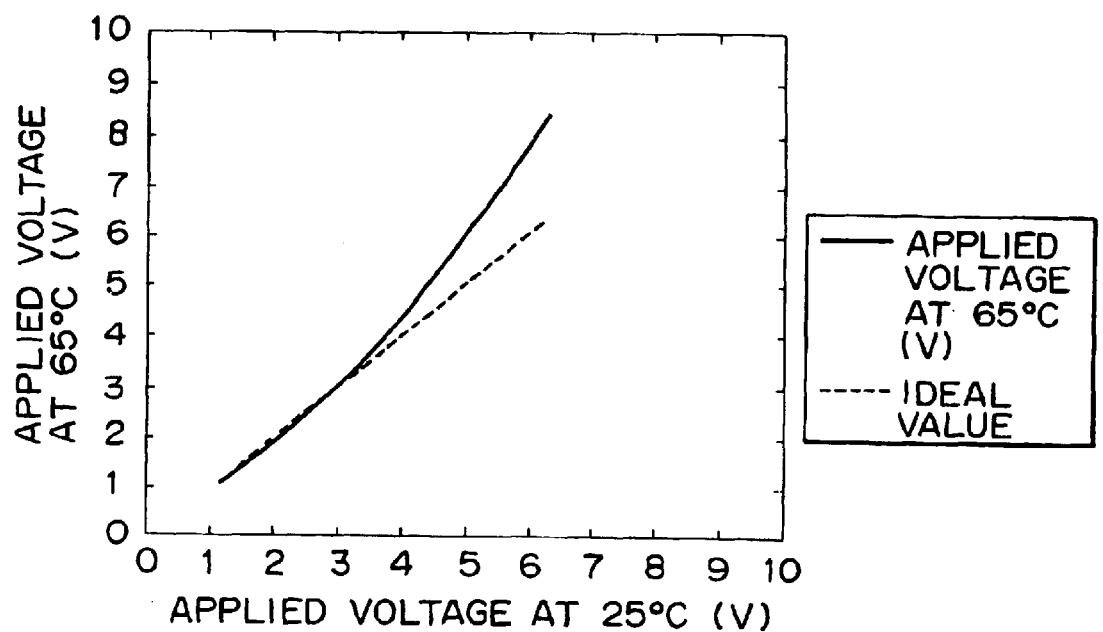
FIG. 32 is a graph showing a relationship between pulse heights of drive pulses at different temperatures applied to the light modulation apparatus shown in FIGS. 3A to 3C.

Accordingly, a transmittance of the liquid crystal device can be usually kept constant without effect of temperature change by monitoring an environmental temperature of the device, correcting the present voltage into a new voltage corresponding to the monitored environmental temperature on the basis of the conversion relationship shown in FIG. 32, or adding or subtracting a voltage difference (shown in FIG. 29) corresponding to a voltage at the monitored environmental temperature (shown in FIG. 32), which voltage difference is read out from a look-up table, to or from the present voltage. In this way, according to the present invention, the transmittance characteristic of the liquid crystal device less affected by an environmental temperature can be obtained by controlling the present pulse voltage into a voltage corresponding to the monitored environmental temperature.

Sixth Embodiment

One configuration example of a light modulation apparatus using the GH cell shown in FIGS. 3A to 3C will be described with reference to FIGS. 33, 34, and 35A to 35C.

Figure 33:
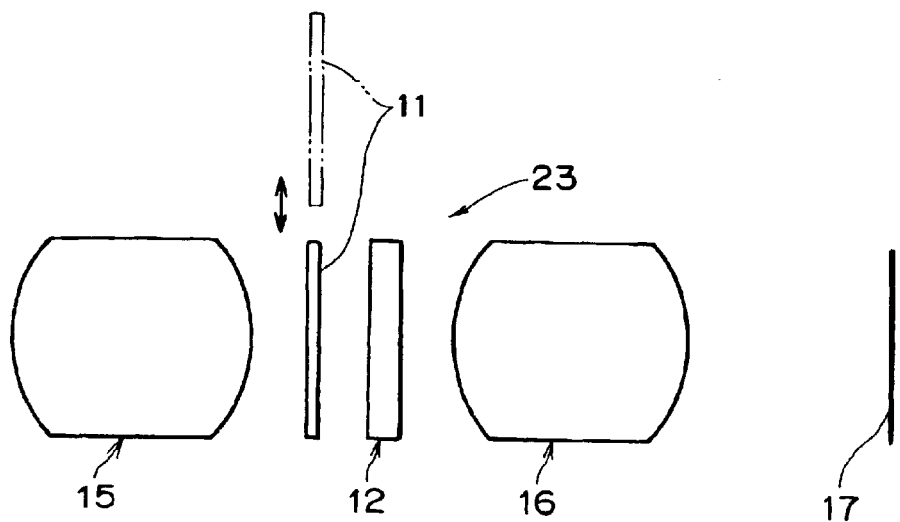
FIG. 33 is a schematic side view showing a configuration of a light modulation apparatus of the present invention.

Referring to FIG. 33, there is shown a light modulation apparatus 23 including a GH cell 12 and a polarizing plate 11. The GH cell 12, which is enclosed between two glass substrates (not shown), contains negative type liquid crystal molecules as a host material, and positive or negative type dichroic dye molecules as a guest material. The negative type liquid crystal molecules have a negative type dielectric constant anisotropy, and the dichroic dye molecules have a positive type light absorption anisotropy capable of absorbing light in the alignment direction of major axes of the molecules. The light absorption axis of the polarizing plate 11 is set in such a manner as to be made perpendicular to the light absorption axis of the GH cell when a voltage is applied to the GH cell.

The light modulation apparatus 23 is disposed between a front lens group 15 and a rear lens group 16 each of which is composed of a plurality of lenses such as zoom lenses. Light which has passed through the front lens group 15 is linearly polarized via the polarizing plate 11 and is made incident on the GH cell 12. The light emerged from the GH cell 12 is collected by the rear lens group 16 and is projected as an image on an image pickup screen 17.

The polarizing plate 11 constituting part of the light modulation apparatus 23 is movable in or from an effective optical path of light made incident on the GH cell 12. To be more specific, the polarizing plate 11 can be moved to a position shown by a virtual line, to be thus moved out of the effective path of light. A mechanical iris shown in FIG. 34 may be used as the means for moving the polarizing plate 11 in or from the effective optical path of light.

Figure 34:
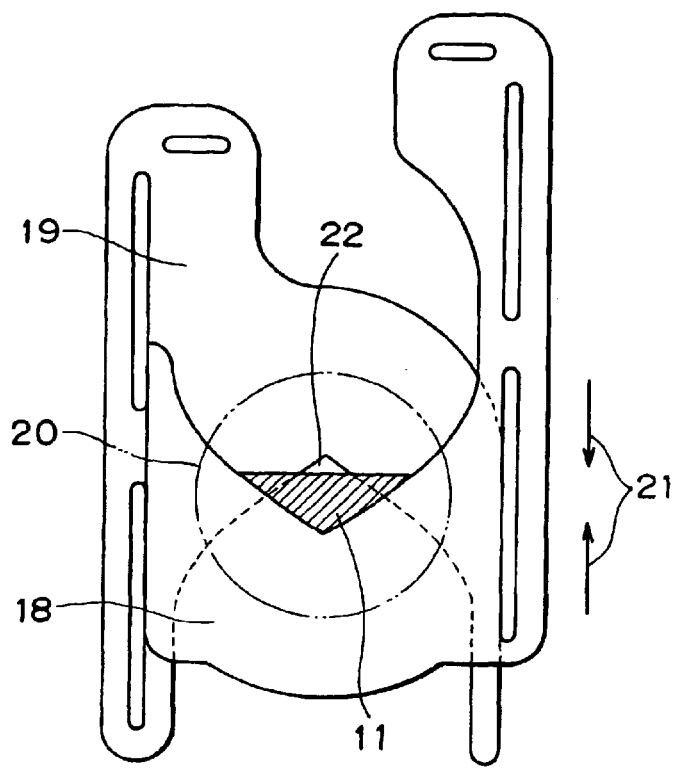
FIG. 34 is a front view of a mechanical iris provided in the light modulation apparatus shown in FIG. 33.

The mechanical iris, which is a mechanical diaphragm device generally used for a digital still camera or a video camera, mainly includes two iris blades 18 and 19, and a polarizing plate 11 stuck on the iris blade 18. The iris blades 18 and 19 are movable in the vertical direction. As shown in FIG. 34, the iris blades 18 and 19 are relatively moved in the directions shown by arrows 21 by a drive motor (not shown).

With the relative movement of the iris blades 18 and 19, the iris blades 18 and 19 are partially overlapped to each other as shown in FIG. 34, and as the overlapped area becomes larger, an opening 22 on an effective optical path 20 positioned near a center portion between the iris blades 18 and 19 comes to be covered with the polarizing plate 11.

Figure 35A:
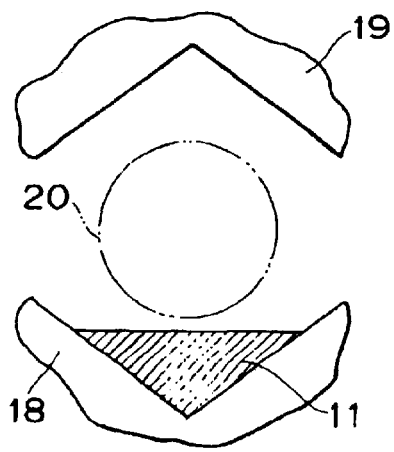
FIGS. 35A to 35C are schematic partial enlarged views illustrating an operation of the mechanical iris near an effective optical path of the light modulation apparatus shown in FIG. 33.
Figures 35B, 35C:
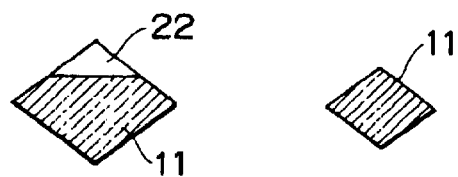

FIGS. 35A to 35C are partial enlarged views of a portion, near the effective optical path 20, of the mechanical iris. When the iris blade 18 is moved down and simultaneously the iris blade 19 is moved up, the polarizing plate 11 stuck on the iris blade 18 is also moved out of the effective optical path 20 as shown in FIG. 35A. On the contrary, when the iris blade 18 is moved up and simultaneously the iris blade 19 is moved down, the iris blades 18 and 19 are overlapped to each other, and as shown in FIG. 35B, the polarizing plate 11 is moved on the effective optical path 20, to gradually cover the opening 22. As shown in FIG. 35C, the overlapped area of the iris blades 18 and 19 becomes larger, the polarizing plate 11 comes to perfectly cover the opening 20.

The operation of the light modulation apparatus 23 using the mechanical iris will be described below.

As an object (not shown) becomes bright, the iris blades 18 and 19, which are opened in the upward and downward directions as shown in FIG. 35A, are driven by the motor (not shown) to be gradually overlapped to each other. Along with such movement of the iris blades 18 and 19, the polarizing plate 11 stuck on the iris blade 18 starts to enter the effective optical path 20, thereby partially covering the opening 22 as shown in FIG. 35B.

At this time, the GH cell 12 is in a state not allowed to absorb light except for slight light absorption due to thermal fluctuation or surface reflection. Accordingly, the intensity distribution of the light having passed through the polarizing plate 11 is nearly equal to that of the light having passed through the opening 22.

The polarizing plate 11 is then put in a state in which it perfectly covers the opening 22 as shown in FIG. 35C. In such a state, if the brightness of the object becomes stronger, the voltage applied to the GH cell 12 is increased to modulate the light by absorbing the light in the GH cell 12.

On the contrary, in the above state, if the object becomes dark, the voltage applied to the GH cell 12 is reduced or cut off to eliminate the light absorption effect by the GH cell 12. If the object becomes darker, the iris blade 18 is moved down and the iris blade 19 is moved up by the motor (not shown), to move the polarizing plate 11 out of the effective optical path 20 as shown in FIG. 35A.

According to this embodiment, since the polarizing plate 11 whose transmittance is typically in a range of 40 to 50% can be moved out of the effective optical path 20 of light, the light is not absorbed in the polarizing plate 11, with a result that the maximum transmittance of the light modulation apparatus of the present invention can be increased up to a value being as high as twice or more the maximum transmittance of the related art light modulation apparatus including the GH cell and the fixed polarizing plate. It should be noted that the minimum transmittance of the light modulation apparatus of the present invention is equal to that of the related art light modulation apparatus.

Since the polarizing plate 11 is moved in or from the effective optical path of light by using the mechanical iris practically used for a digital still camera, the light modulation apparatus having the above configuration can be easily realized.

Since the light modulation apparatus in this embodiment uses the GH cell 12, the light modulation can be effectively performed by the combination of the light modulation by the polarizing plate 11 and light absorption of the GH cell 12.

In this way, according to the light modulation apparatus in this embodiment, it is possible to enhance the bright-dark contrast ratio and to keep the light quantity distribution at a nearly constant value.

With respect to the GH cell 12 used in this embodiment, if the light crystal molecules having a negative dielectric constant anisotropy is used as the host material, a negative type (n-type) dichroic dye molecules may be used as the guest material.

The related art light modulation apparatus shown in FIGS. 1A to 1C has a problem. Since the polarizing plate 1 is fixed in an effective optical path of light, part of light, for example, 50% of light is usually absorbed in the polarizing plate 1, and further light may be reflected from the surface of the polarizing plate 1. As a result, the maximum transmittance of light passing through the polarizing plate 1 cannot exceed a certain value, for example, 50%, and accordingly, the quantity of light passing through the light modulation apparatus is significantly reduced by light absorption of the polarizing plate 1. This problem is one of the factors which make it difficult to put a light modulation apparatus using a liquid crystal cell into practical use.

On the other hand, various kinds of light modulation apparatuses using no polarizing plate have been proposed. Examples of these apparatuses include a type using a stack of two GH cells in which the GH cell at the first layer absorbs a polarization component in the direction identical to that of polarized light and the GH cell at the second layer absorbs a polarization component in the direction perpendicular to the polarized light; a type making use of a phase transition between a cholesteric phase and a nematic phase of a liquid crystal cell; and a high polymer scattering type making use of scattering of liquid crystal.

These light modulation apparatuses using no polarizing plate have a problem. Since the optical density (absorbance) ratio between upon application of no voltage and upon application of a voltage is, as described above, as small as only 5, the contrast ratio of the apparatus is too small to normally carry out modulation of light at any location in a wide range from a bright location to a dark location. The light modulation apparatus of the high polymer scattering type has another problem in significantly degrading, when the apparatus is used for an image pickup apparatus, the image formation performance of an optical system of the image pickup apparatus.

The related art light modulation apparatus presents a further problem. Since the transmittance in a transparent state may become dark depending on the kind of a liquid crystal device used for the apparatus, if an image pickup apparatus provided with the light modulation apparatus is intended to pickup image with a sufficient light quantity in such a transparent state, the light modulation apparatus is required to be removed from an optical system of the image pickup apparatus.

On the contrary, according to this embodiment, since the polarizing plate 11 is movable in or from the effective optical path of light, it is possible to increase the quantity of light, enhance the contrast ratio, and keep constant the quantity of light.

Seventh Embodiment

One example in which the light modulation apparatus 23 described in the sixth embodiment is assembled in a CCD (Charge Coupled Device) camera will be described with reference to FIGS. 36 to 38.

Figure 36:
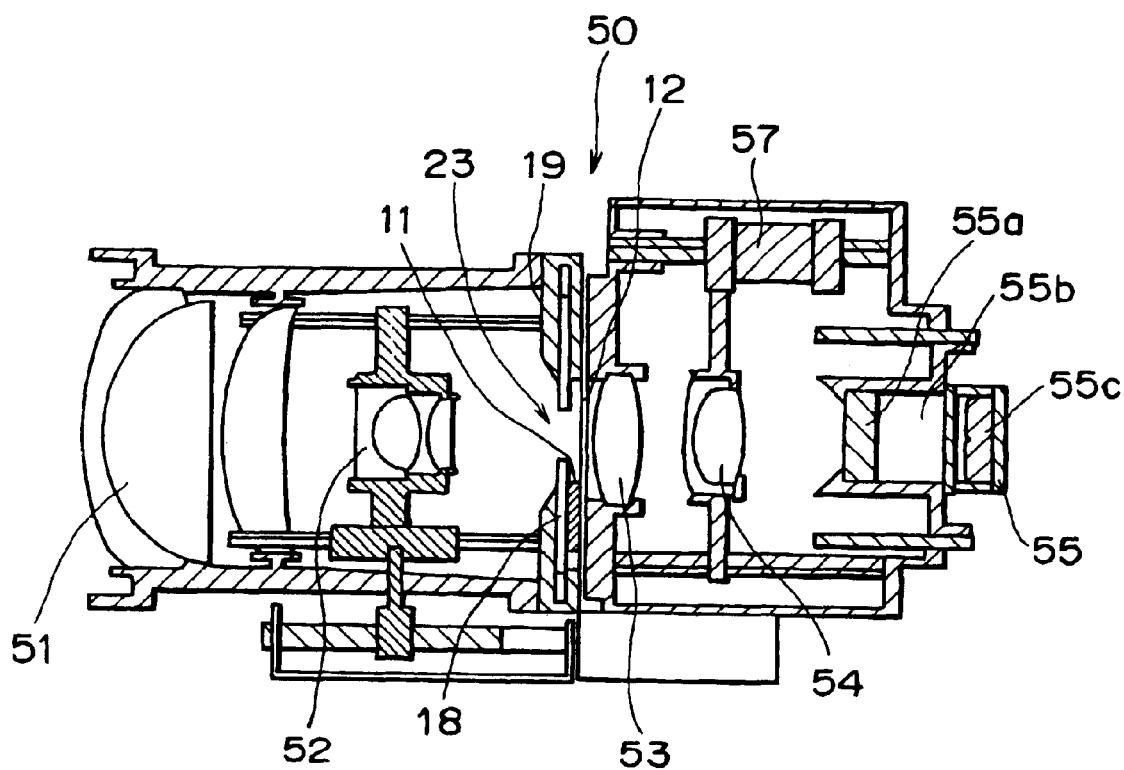
FIG. 36 is a schematic sectional view of a camera system in which the light modulation apparatus shown in FIG. 33 is assembled.

Referring to FIG. 36, there is shown a CCD camera 50 including a first lens group 51 and a second lens group (for zooming) 52, which are equivalent to the above-described front lens group 15; a third lens group 53 and a fourth lens group (for focusing) 54, which are equivalent to the above-described rear lens group 16; and a CCD package 55. These components of the CCD camera 50 are spaced in this order at suitable intervals along an optical axis shown by a dashed line. An infrared ray cutoff filter 55a, an optical low pass filter system 55b, and a CCD image pickup device 55c are contained in the CCD package 55. The light modulation apparatus 23 including the GH cell 12 and the polarizing plate 11 according to the present invention for adjusting or restricting the quantity of light is mounted on the same optical path at a position which is located between the second lens group 52 and the third lens group 53 while being offset toward the third lens group 53. The fourth lens group 54 for focussing is movable along the optical path in a range between the third lens group 53 and the CCD package 55 by a linear motor 57, and the second lens group 52 for zooming is movable along the optical path in a range between the first lens group 51 and the light modulation apparatus 23.

Figure 37:
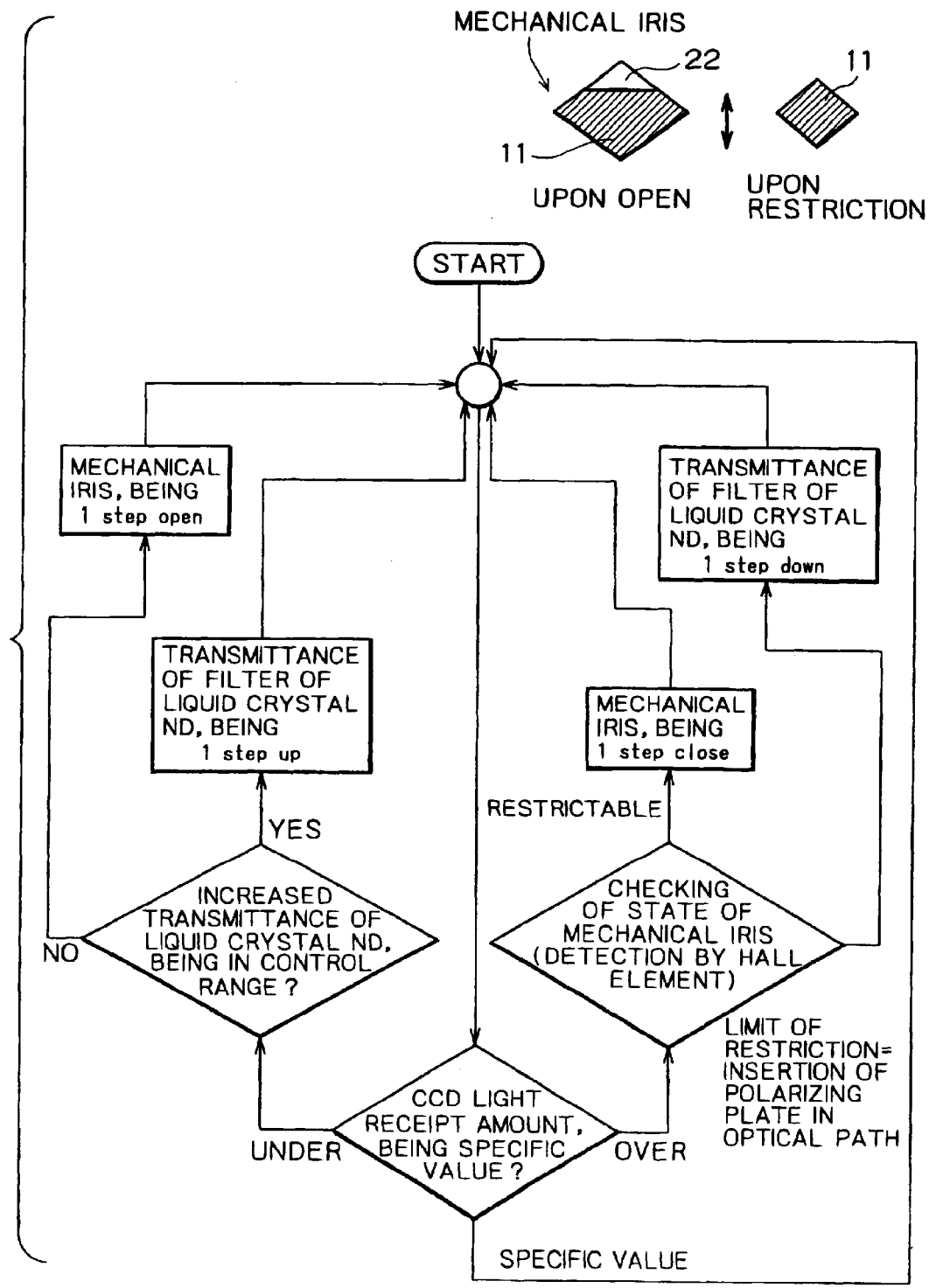
FIG. 37 is a diagram showing an algorithm for controlling a transmittance of the camera system shown in FIG. 36.

FIG. 37 shows an algorithm of a control sequence of a transmittance of the cameral system by the light modulation apparatus 23.

According to this embodiment, since the light modulation apparatus 23 of the present invention set between the second lens group 52 and the third lens group 53 can adjust the quantity of light by an electric field applied thereto, it is possible to miniaturize the system and substantially reduce an effective range of an optical path, and hence to miniaturize the CCD camera. Since the quantity of light can be suitably controlled by the value of a voltage applied to patterned electrodes, it is possible to prevent a conventional diffraction phenomenon and to eliminate the dimming of an image by making a sufficient quantity of light incident on the image pickup device.

Drive Circuit of Camera System

Figure 38:
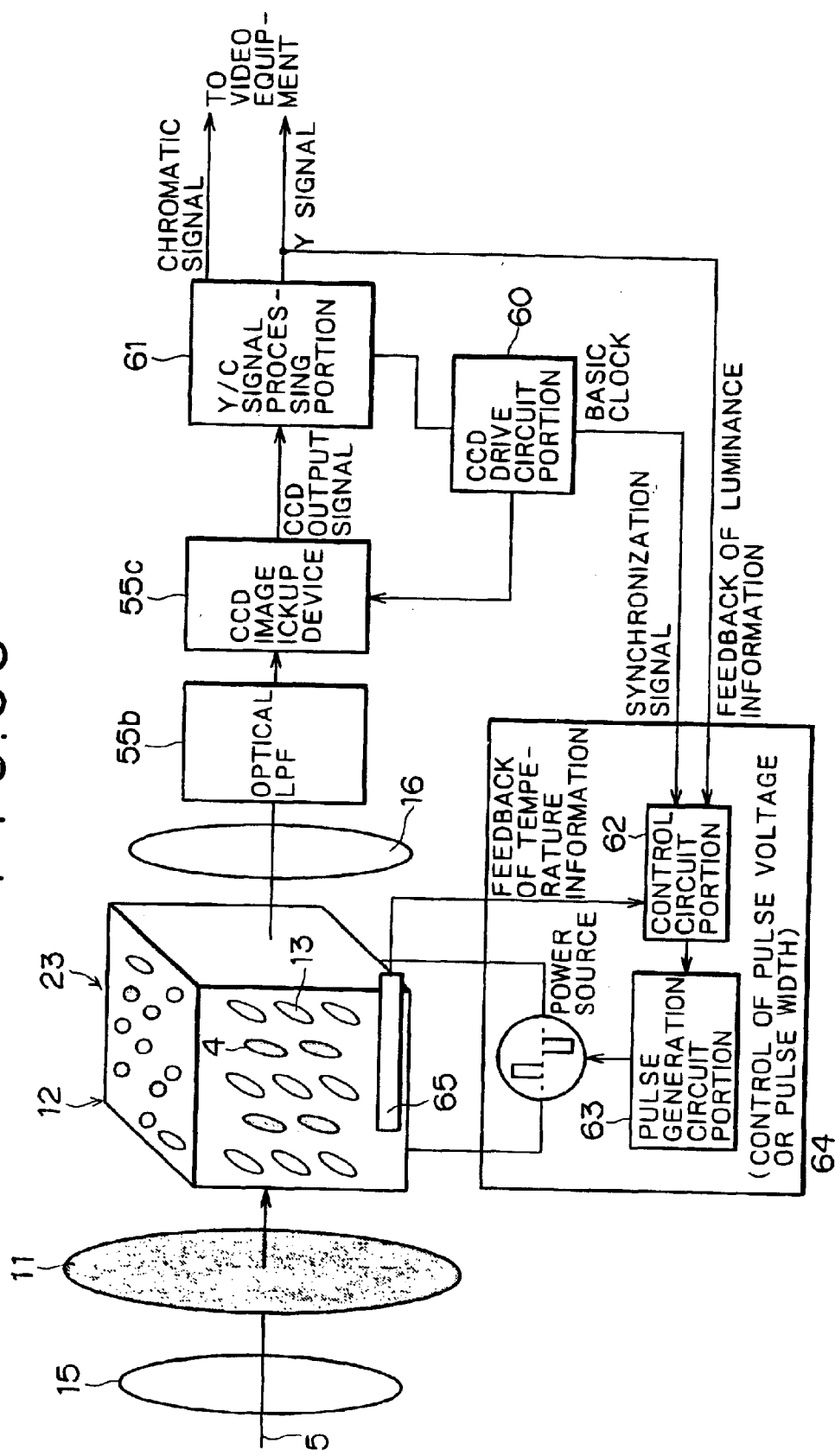
FIG. 38 is a block diagram of the camera system including a drive circuit shown in FIG. 36.

FIG. 38 is a block diagram showing a drive circuit of the CCD camera. Referring to FIG. 38, the CCD camera includes a drive circuit unit 60 of the CCD image pickup device 55c disposed in the light outgoing side of the light modulation apparatus 23. An output signal from the CCD image pickup device 55c is processed by an Y/C signal processing unit 61 and is fed back as luminance information (Y signal) to a GH cell drive control circuit unit 62. An environmental temperature of the GH cell 12 is detected by a thermistor 65 and the detection temperature information is fed back to the control circuit unit 62. Each drive pulse, whose pulse height or pulse width is modulated in synchronization with a basic clock generated from the drive circuit unit 60 on the basis of a control signal from the control circuit unit 62, is generated from a pulse generation circuit unit 63. The control circuit unit 62 and the pulse generation circuit unit 63 constitute a GH liquid crystal drive circuit unit 64 for modulating the pulse height or pulse width of each drive pulse.

The above-described camera system may be replaced with another system in which light emerged from the light modulation apparatus 23 is detected by a photodetector (or photomultiplier tube); luminance information of the light detected by the photodetector is fed back, together with temperature information detected by the thermistor 65, to the control circuit unit 62; and each drive pulse, whose pulse height or pulse width is modulated in synchronization with a clock generated by a GH cell drive circuit unit (not shown) on the basis of the above luminance information and temperature information, is generated by the pulse generation circuit unit.

Additionally, a basic clock such as a field decision signal, a vertical synchronization signal, or a blacking signal, or a reset gate signal can be used as a synchronization signal for changing the GH control waveform in a period other than a CCD image pickup accumulation time. Further, the luminance information and temperature information can be independently or simultaneously fed back.

Although the preferred embodiments of the present invention have been described, such description is for illustrative purposes only, and it is to be understood that many changes and variations may be made without departing from the technical thought of the present invention.

For example, the structure and material of each of the liquid crystal device and polarizing plate, its drive mechanism, and the configuration of each of the drive circuit and control circuit may be variously changed. The drive waveform of each drive pulse applied between electrodes may be a rectangular, trapezoidal or sine waveform insofar as it allows changes in directors of liquid crystal molecules, to control the transmittance of the light modulation apparatus. The means for detecting the temperature of the light modulation apparatus is not limited to the thermistor but may be another sensor.

The GH cell is not limited to that described in the embodiments but may be a GH cell having a double-layer structure. Although the position of the polarizing plate 11 relative to the GH cell 12 is located between the front lens group 15 and the rear lens group 16 in the embodiment, it is not limited thereto but may be suitably determined in consideration of the setting conditions of the image pickup lenses. To be more specific, the polarizing plate 11 may be freely located on the object side or image pickup device side, for example, at a position between the image pickup screen 17 and the rear lens group 16. Further, the polarizing plate 11 may be disposed in front of or at the back of a single lens changed from the front lens group 15 or rear lens group 16.

The number of the iris blades 18 and 19 is not limited to two, but may be one or two or more. The iris blades 18 and 19 may be moved in the direction other than the vertical direction to be overlapped to each other, or may be spirally moved in the direction from the periphery to the center.

While the polarizing plate 11 is stuck on the iris blade 18 in the embodiment, it may be stuck on the iris blade 19.

In the embodiment, as the object becomes bright, the light modulation by movement of the polarizing plate 11 is first performed and then the light absorption by the GH cell 12 is performed; however, as the object becomes bright, the light absorption by the GH cell 12 may be first performed until the transmittance of the GH cell 12 is reduced to a specific value and then the light modulation by movement of the polarizing plate 11 be performed.

The means of moving the polarizing plate 11 in or from the effective optical path 20 is not limited to the mechanical iris. For example, the movement of the polarizing plate 11 in or from the effective optical path 20 may be performed by directly providing a film, on which the polarizing plate 11 is stuck, on a drive motor and operating the drive motor.

In the embodiment, the polarizing plate 11 is moved in or from the effective optical path 20; however, it may be of course fixed on the effective optical path.

The light modulation apparatus may be used in combination with any one of known filter materials such as an organic electrochromic material, liquid crystal, or electroluminescence material or the like.

The light modulation apparatus of the present invention may be used not only for an optical diaphragm of an image pickup apparatus such as a CCD camera but also for other optical systems such as a light quantity adjustment device for an electrophotographic reproduction machine or optical communication equipment. The light modulation apparatus may be used not only for an optical filter but also for other image display devices for displaying characters or images.

What is claimed is:

1. An image pickup apparatus comprising:

a liquid crystal device;

a drive pulse generation unit for driving said liquid crystal device;

a pulse width control unit for modulating a pulse width of each drive pulse to be applied to said liquid crystal device, thereby controlling a transmittance of light made incident on said liquid crystal device;

a drive circuit unit; and a control circuit unit, wherein the modulation of the pulse width of each drive pulse is performed in a manner whereby the waveform of each drive pulse is present in a period of a basic frequency, each drive pulse whose waveform is present in the period of the basic frequency is generated in synchronization with a clock generated by said drive circuit unit, and luminance information of the light emerged from said liquid crystal device is fed back to said control circuit unit, and the pulse width of each drive pulse is modulated in synchronization with a clock generated by said drive circuit unit on the basis of a control signal supplied from said control circuit unit.

2. A light modulation apparatus according to claim 1, wherein the pulse width of each drive pulse is modulated with its pulse height kept constant.

3. A light modulation apparatus according to claim 1, wherein an average per unit time of positive and negative pulse heights of drive pulses applied between drive electrodes of said liquid crystal device upon modulation of the pulse width of each drive pulse is preferably nearly zero.

4. A light modulation apparatus according to claim 1, wherein the basic frequency and the modulated pulse width are adjusted in such a manner as to prevent the occurrence of flicker in stationary drive of said light modulation apparatus.

5. A light modulation apparatus according to claim 1, wherein said liquid crystal device is a guest-host type liquid crystal device.

6. A light modulation apparatus according to claim 5, wherein a host material is a negative or positive type liquid crystal having a negative or positive type dielectric constant anisotropy.

7. A light modulation apparatus according to claim 5, wherein a guest material of said liquid crystal device is a positive or negative type dichroic dye molecular material having a positive or negative type light absorption anisotropy.

8. A light modulation apparatus according to claim 1, wherein a drive electrode of said liquid crystal device is formed at least over the entire region of an effective light transmission portion.

9. An image pickup apparatus comprising:
a light modulation apparatus including a liquid crystal device, a drive pulse generation unit for driving said liquid crystal device, and a pulse width control unit for modulating a pulse width of each drive pulse to be applied to said liquid crystal device, thereby controlling a transmittance of light made incident on said liquid crystal device;
wherein said light modulation apparatus is disposed in an optical path of an optical system of said image pickup apparatus; and
wherein the pulse width of each drive pulse is modulated with its pulse height kept constant.

10. An image pickup apparatus comprising:
a light modulation apparatus including a liquid crystal device, a drive pulse generation unit for driving said liquid crystal device, and a pulse width control unit for modulating a pulse width of each drive pulse to be applied to said liquid crystal device, thereby controlling a transmittance of light made incident on said liquid crystal device;
wherein said light modulation apparatus is disposed in an optical path of an optical system of said image pickup apparatus; and
wherein an average per unit time of positive and negative pulse heights of drive pulses applied between drive electrodes of said liquid crystal device upon modulation of the pulse width of each drive pulse is preferably nearly zero.

11. An image pickup apparatus comprising:
a light modulation apparatus including a liquid crystal device, a drive pulse generation unit for driving said liquid crystal device, and a pulse width control unit for modulating a pulse width of each drive pulse to be applied to said liquid crystal device, thereby controlling a transmittance of light made incident on said liquid crystal device;
wherein said light modulation apparatus is disposed in an optical path of an optical system of said image pickup apparatus; and
wherein the modulation of the pulse width of each drive pulse is performed in such a manner that the waveform of each drive pulse is present in a period of a basic frequency.

12. An image pickup apparatus according to claim 11, wherein the basic frequency and the modulated pulse width are adjusted in such a manner as to prevent the occurrence of flicker in stationary drive of said light modulation apparatus.

13. An image pickup apparatus according to claim 11, further comprising a drive circuit unit, wherein each drive pulse whose waveform is present in the period of the basic frequency is generated in synchronization with a clock generated by said drive circuit unit.

14. An image pickup apparatus according to claim 12, further comprising a control circuit unit, wherein luminance information of the light emerged from said liquid crystal device is fed back to said control circuit unit, and the pulse width of each drive pulse is modulated in synchronization with a clock generated by said drive circuit unit on the basis of a control signal supplied from said control circuit unit.

15. An image pickup apparatus comprising:
a light modulation apparatus including a liquid crystal device, a drive pulse generation unit for driving said liquid crystal device, and a pulse width control unit for modulating a pulse width of each drive pulse to be applied to said liquid crystal device, thereby controlling a transmittance of light made incident on said liquid crystal device;
wherein said light modulation apparatus is disposed in an optical path of an optical system of said image pickup apparatus; and
wherein said liquid crystal device is a guest-host type liquid crystal device.

16. An image pickup apparatus according to claim 15, wherein a host material is a negative or positive type liquid crystal having a negative or positive type dielectric constant anisotropy.

17. An image pickup apparatus according to claim 15, wherein a guest material of said liquid crystal device is a positive or negative type dichroic dye molecular material having a positive or negative type light absorption anisotropy.

18. An image pickup apparatus comprising:
a light modulation apparatus including a liquid crystal device, a drive pulse generation unit for driving said liquid crystal device, and a pulse width control unit for modulating a pulse width of each drive pulse to be applied to said liquid crystal device, thereby controlling a transmittance of light made incident on said liquid crystal device; and
a polarizing plate disposed in an optical path of light made incident on said liquid crystal device;
wherein said light modulation apparatus is disposed in an optical path of an optical system of said image pickup apparatus.

19. An image pickup apparatus according to claim 18, wherein said polarizing plate is movable in or from the optical path.

20. An image pickup apparatus according to claim 19, wherein said polarizing plate is disposed in a movable portion of a mechanical iris in such a manner as to be movable in or from the optical path by operation of said movable portion of said mechanical iris.

21. A method of driving an image pickup apparatus including a liquid crystal device, comprising the step of:
modulating a pulse width of each drive pulse to be applied to said liquid crystal device, thereby controlling a transmittance of light made incident on said liquid crystal device,
wherein the modulation of the pulse width of each drive pulse is performed in a manner whereby the waveform of each drive pulse is present in a period of a basic frequency,
each drive pulse whose waveform is present in the period of the basic frequency is generated in synchronization with a clock generated by a drive circuit unit provided in said light modulation apparatus, and
luminance information of the light emerged from said liquid crystal device is fed back to a control circuit unit provided in said light modulation apparatus, and the pulse width of each drive pulse is modulated in synchronization with a clock generated by said drive circuit unit on the basis of a control signal supplied from said control circuit unit.

22. A method of driving a light modulation apparatus according to claim 21, wherein the pulse width of each drive pulse is modulated with its pulse height kept constant.

23. A method of driving a light modulation apparatus according to claim 21, wherein an average per unit time of positive and negative pulse heights of drive pulses applied between drive electrodes of said liquid crystal device upon modulation of the pulse width of each drive pulse is preferably nearly zero.

24. A method of driving a light modulation apparatus according to claim 21, wherein the basic frequency and the modulated pulse width adjusted in such a manner as to prevent the occurrence of flicker in stationary drive of said light modulation apparatus.

25. A method of driving a light modulation apparatus according to claim 21, wherein said liquid crystal device is a guest-host type liquid crystal device.

26. A method of driving a light modulation apparatus according to claim 25, wherein a host material of said liquid crystal device is a negative or positive type liquid crystal having a negative or positive type dielectric constant anisotropy.

27. A method of driving a light modulation apparatus according to claim 25, wherein a guest material of said liquid crystal device is a positive or negative type dichroic dye molecular material having a positive or negative type light absorption anisotropy.

28. A method of driving a light modulation apparatus according to claim 21, wherein a drive electrode of said liquid crystal device is formed at least over the entire region of an effective light transmission portion.

29. A method of driving an image pickup apparatus in which a liquid crystal device is disposed in an optical path of an optical system of said image pickup apparatus, comprising the step of:
modulating a pulse width of each drive pulse to be applied to said liquid crystal device, thereby controlling a transmittance of light made incident on said liquid crystal device;
wherein the pulse width of each drive pulse is modulated with its pulse height kept constant.

30. A method of driving an image pickup apparatus in which a liquid crystal device is disposed in an optical path of an optical system of said image pickup apparatus, comprising the step of:
modulating a pulse width of each drive pulse to be applied to said liquid crystal device, thereby controlling a transmittance of light made incident on said liquid crystal device;
wherein an average per unit time of positive and negative pulse heights of drive pulses applied between drive electrodes of said liquid crystal device upon modulation of the pulse width of each drive pulse is preferably nearly zero.

31. A method of driving an image pickup apparatus in which a liquid crystal device is disposed in an optical path of an optical system of said image pickup apparatus, comprising the step of:
modulating a pulse width of each drive pulse to be applied to said liquid crystal device, thereby controlling a transmittance of light made incident on said liquid crystal device;
wherein the modulation of the pulse width of each drive pulse is performed in such a manner that the waveform of each drive pulse is present in a period of a basic frequency.

32. A method of driving an image pickup apparatus according to claim 31, wherein the basic frequency and the modulated pulse width are adjusted in such a manner as to prevent the occurrence of flicker in stationary drive of said light modulation apparatus.

33. A method of driving an image pickup apparatus according to claim 31, wherein each drive pulse whose waveform is present in the period of the basic frequency is generated in synchronization with a clock generated by a drive circuit unit provided in said light modulation apparatus.

34. A method of driving an image pickup apparatus in which a liquid crystal device is disposed in an optical path of an optical system of said image pickup apparatus, comprising the step of:
modulating a pulse width of each drive pulse to be applied to said liquid crystal device, thereby controlling a transmittance of light made incident on said liquid crystal device;
wherein luminance information of the light emerged from said liquid crystal device is fed back to a control circuit unit provided in said light modulation apparatus, and the pulse width of each drive pulse is modulated in synchronization with a clock generated by said drive circuit unit on the basis of a control signal supplied from said control circuit unit.

35. A method of driving an image pickup apparatus in which a liquid crystal device is disposed in an optical path of an optical system of said image pickup apparatus, comprising the step of:
modulating a pulse width of each drive pulse to be applied to said liquid crystal device, thereby controlling a transmittance of light made incident on said liquid crystal device;
wherein said liquid crystal device is a guest-host type liquid crystal device.

36. A method of driving an image pickup apparatus according to claim 35, wherein a host material of said liquid crystal device is a negative or positive type liquid crystal having a negative or positive type dielectric constant anisotropy.

37. A method of driving an image pickup apparatus according to claim 35, wherein a guest material of said liquid crystal device is a positive or negative type dichroic dye molecular material having a positive or negative type light absorption anisotropy.

38. A method of driving an image pickup apparatus in which a liquid crystal device is disposed in an optical path of an optical system of said image pickup apparatus, comprising the step of:

modulating a pulse width of each drive pulse to be applied to said liquid crystal device, thereby controlling a transmittance of light made incident on said liquid crystal device;

wherein a polarizing plate is disposed in an optical path of light made incident on said liquid crystal device.

39. A method of driving an image pickup apparatus according to claim 38, wherein said polarizing plate is movable in or from the optical path.

40. A method of driving an image pickup apparatus according to claim 39, wherein said polarizing plate is disposed in a movable portion of a mechanical iris in such a manner as to be movable in or from the optical path by operation of said movable portion of said mechanical iris.

41. A method of driving an image pickup apparatus in which a liquid crystal device is disposed in an optical path of an optical system of said image pickup apparatus, comprising the step of:

modulating a pulse width of each drive pulse to be applied to said liquid crystal device, thereby controlling a transmittance of light made incident on said liquid crystal device;

wherein a drive electrode of said liquid crystal device is formed at least over the entire region of an effective light transmission portion.

42. A light modulation apparatus comprising:

a liquid crystal device;

a drive pulse generation unit for driving said liquid crystal device;

a pulse width control unit for modulating a pulse width of each drive pulse to be applied to said liquid crystal device, thereby controlling a transmittance of light made incident on said liquid crystal device; and a polarizing plate disposed in an optical path of light made incident on said liquid crystal device, wherein said polarizing plate is movable in or from the optical path, and said polarizing plate is disposed in a movable portion of a mechanical iris in a manner whereby it is movable in or from the optical path by operation of said movable portion of said mechanical iris.

43. A method of driving a light modulation apparatus including a liquid crystal device, comprising the step of:

modulating a pulse width of each drive pulse to be applied to said liquid crystal device, thereby controlling a transmittance of light made incident on said liquid crystal device, wherein a polarizing plate is disposed in an optical path of light made incident on said liquid crystal device, said polarizing plate is movable in or from the optical path, and said polarizing plate is disposed in a movable portion of a mechanical iris in a manner whereby it is movable in or from the optical path by operation of said movable portion of said mechanical iris.

* * * * *